(12) United States Patent
Goto et al.

(10) Patent No.: US 10,135,327 B2
(45) Date of Patent: Nov. 20, 2018

(54) POWER SUPPLY SYSTEM

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Shigeaki Goto, Nagakute (JP); Shuji Tomura, Nagakute (JP); Naoki Yanagizawa, Nagakute (JP); Masaki Okamura, Toyota (JP); Naoyoshi Takamatsu, Sunto-gun (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/754,168

(22) PCT Filed: Aug. 31, 2016

(86) PCT No.: PCT/JP2016/075392
§ 371 (c)(1),
(2) Date: Feb. 21, 2018

(87) PCT Pub. No.: WO2017/038841
PCT Pub. Date: Mar. 9, 2017

(65) Prior Publication Data
US 2018/0269774 A1  Sep. 20, 2018

(30) Foreign Application Priority Data
Sep. 1, 2015 (JP) .................................. 2015-172048

(51) Int. Cl.
H02M 3/158 (2006.01)
H02M 1/08 (2006.01)
H02M 1/00 (2006.01)

(52) U.S. Cl.
CPC ........... *H02M 1/083* (2013.01); *H02M 3/158* (2013.01); *H02M 2001/0058* (2013.01)

(58) Field of Classification Search
CPC ................. H02M 3/158; H02M 1/083; H02M 2001/0058
See application file for complete search history.

(56) References Cited

U.S. PATENT DOCUMENTS 9,849,789 B2 * 12/2017 Tomura ..................... H02J 1/00
9,895,980 B2 * 2/2018 Ishigaki .................. B60L 11/02
(Continued)

FOREIGN PATENT DOCUMENTS

JP 2013-013234 A 1/2013
JP 2013-046446 A 3/2013
(Continued)

*Primary Examiner* — Kyle J Moody
(74) *Attorney, Agent, or Firm* — Oliff PLC

(57) ABSTRACT

Outputs from first and second DC power supplies are controlled based on a first reactor current and a second reactor current. For controlling an output from a corresponding DC power supply, a relative maximum point and a relative minimum point as two inflection points are provided in a high current of the first and second reactor currents in one control cycle, by controlling on and off of switching elements. In a low current of the first and second reactor currents, inflection points more than in the high current are provided. Each of the inflection points on a side of the high current is provided at timing identical to the inflection point on a side of the low current.

9 Claims, 34 Drawing Sheets

(56) References Cited

U.S. PATENT DOCUMENTS

| | | | |
|---|---|---|---|
| 9,935,548 B2* | 4/2018 | Goto | B60L 11/1855 |
| 9,941,694 B2* | 4/2018 | Tomura | H02J 1/00 |
| 2010/0219801 A1* | 9/2010 | Yonezawa | H02M 3/156 323/282 |
| 2013/0134786 A1* | 5/2013 | Ishigaki | H02M 3/158 307/71 |
| 2014/0145694 A1 | 5/2014 | Ishigaki et al. | |
| 2014/0361622 A1* | 12/2014 | Ohnuki | H02M 3/158 307/52 |
| 2016/0006377 A1* | 1/2016 | Hashimoto | B60L 3/12 290/31 |
| 2017/0018921 A1 | 1/2017 | Tomura et al. | |
| 2017/0077810 A1 | 3/2017 | Goto et al. | |

FOREIGN PATENT DOCUMENTS

| | | |
|---|---|---|
| JP | 2015-165759 A | 9/2015 |
| JP | 2016-178812 A | 10/2016 |

* cited by examiner

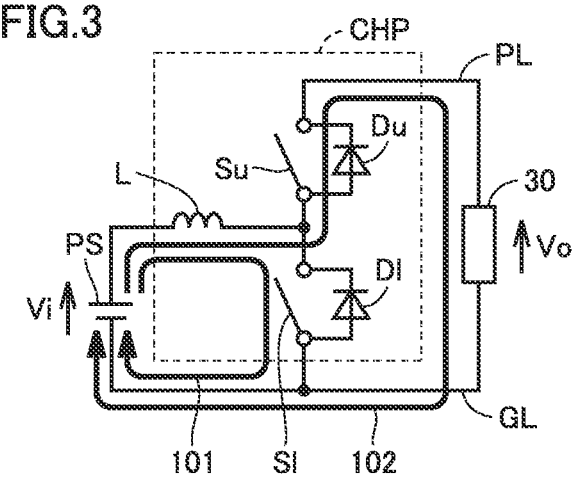
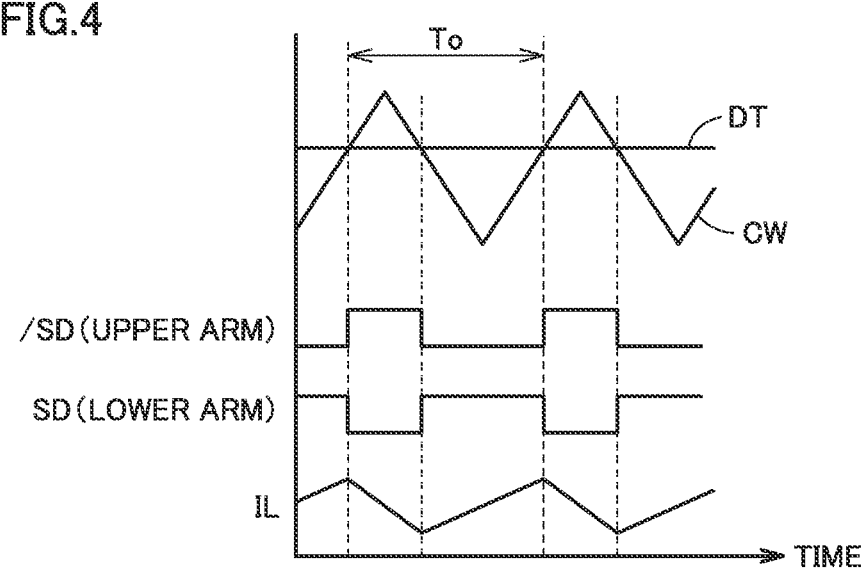

FIG.9
(a)
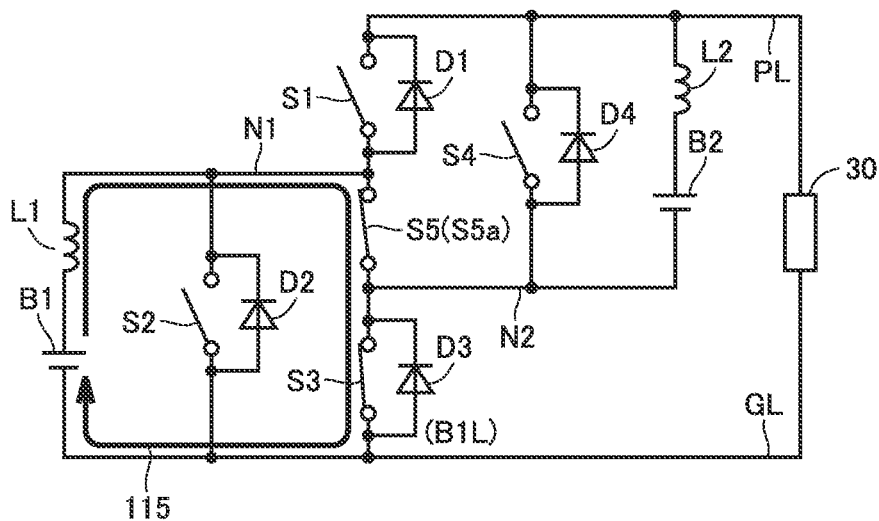
(b)
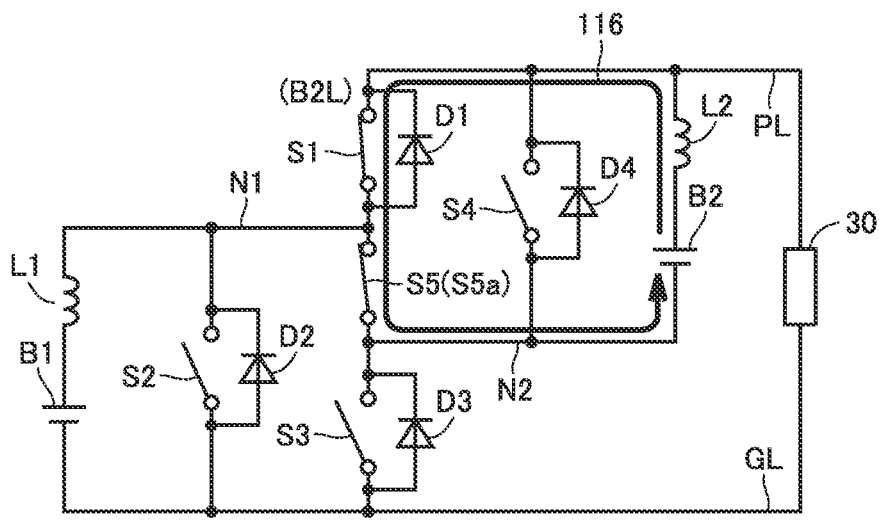

FIG.10
(a)
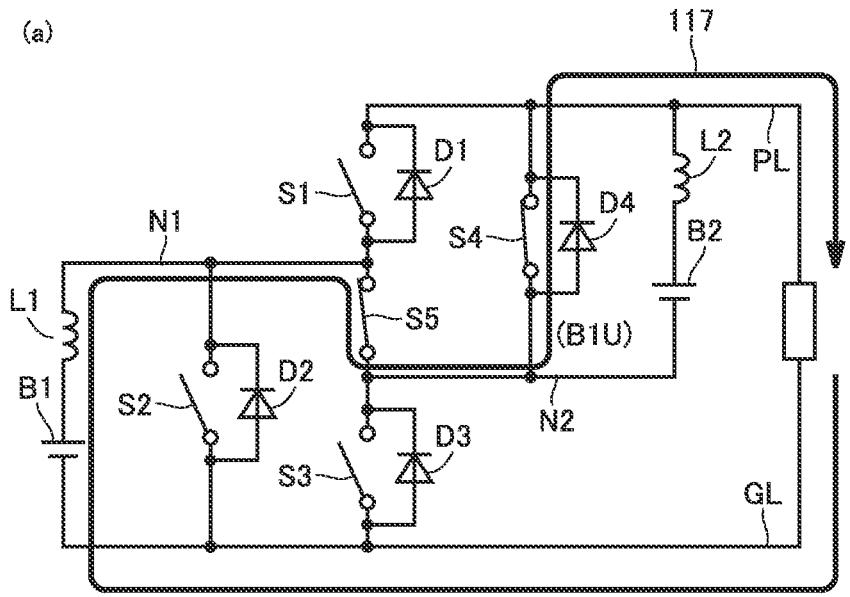
(b)
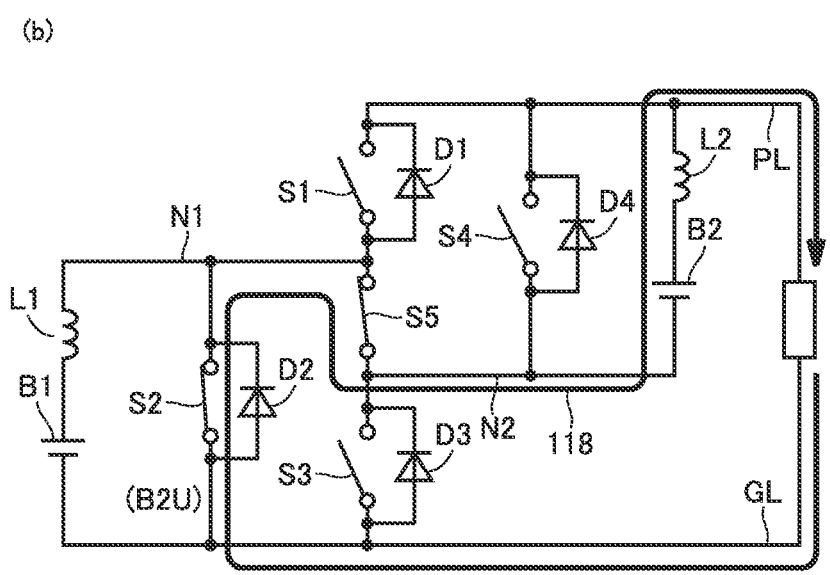

FIG.11

|  |  | S1 | S2 | S3 | S4 | S5 |
|---|---|---|---|---|---|---|
| FIRST ARM (S5:OFF) | B1 UPPER(B1U)ON | ON | (OFF) | — | — | — |
|  | B1 LOWER(B1L)ON | (OFF) | ON | — | — | — |
|  | B2 UPPER(B2U)ON | — | — | ON | (OFF) | — |
|  | B2 LOWER(B2L)ON | — | — | (OFF) | ON | — |
| SECOND ARM (S5:ON) | B1 UPPER(B1U)ON | — | — | (OFF) | ON | ON |
|  | B1 LOWER(B1L)ON | — | — | ON | (OFF) | ON |
|  | B2 UPPER(B2U)ON | (OFF) | ON | — | — | ON |
|  | B2 LOWER(B2L)ON | ON | (OFF) | — | — | ON |

FIG.12

| SWITCH | GATE BOOLEAN EXPRESSION |
|---|---|
| S1 | /SD1 |
| S2 | SD1 |
| S3 | /SD2 |
| S4 | SD2 |
| S5a | SD1 OR SD2 (SD1 XOR SD2) |
| S5b | /SD1 OR /SD2 (SD1 XOR SD2) |

| SD1 | SD2 | S1 | S2 | S3 | S4 | S5a | S5b |
|---|---|---|---|---|---|---|---|
| H (I[1]INCREASE) | L (I[2]DECREASE) | OFF | ON | ON | OFF | ON | ON |
| H (I[1]INCREASE) | H (I[2]INCREASE) | OFF | ON | OFF | ON | ON | OFF |
| L (I[1]DECREASE) | H (I[2]INCREASE) | ON | OFF | OFF | ON | ON | ON |
| L (I[1]DECREASE) | L (I[2]DECREASE) | ON | OFF | ON | OFF | OFF | ON |

FIG.17
(a)
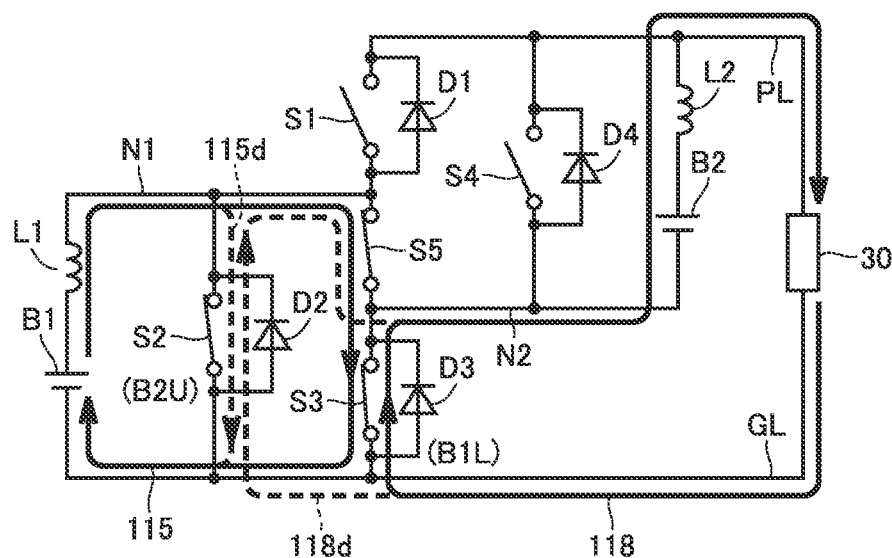
(b)
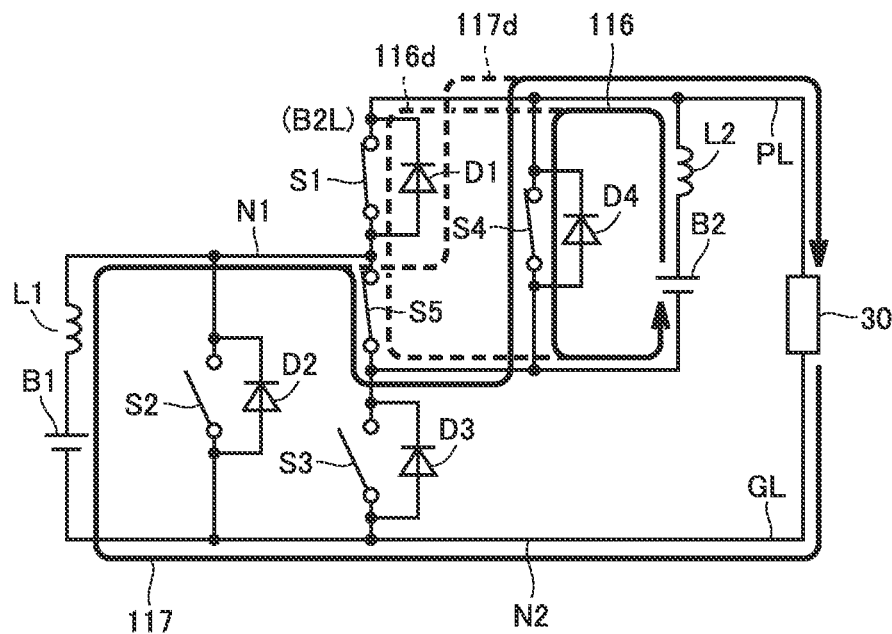

FIG.21
(a) WITHOUT ADDITION OF INFLECTION POINT (FIG. 19)
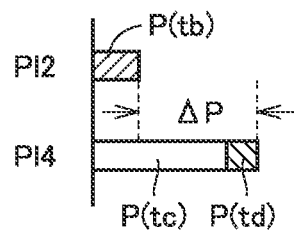
(b) WITH ADDITION OF INFLECTION POINT (FIG. 20)
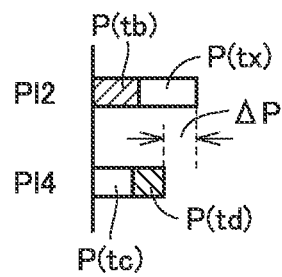

FIG.25
(a)
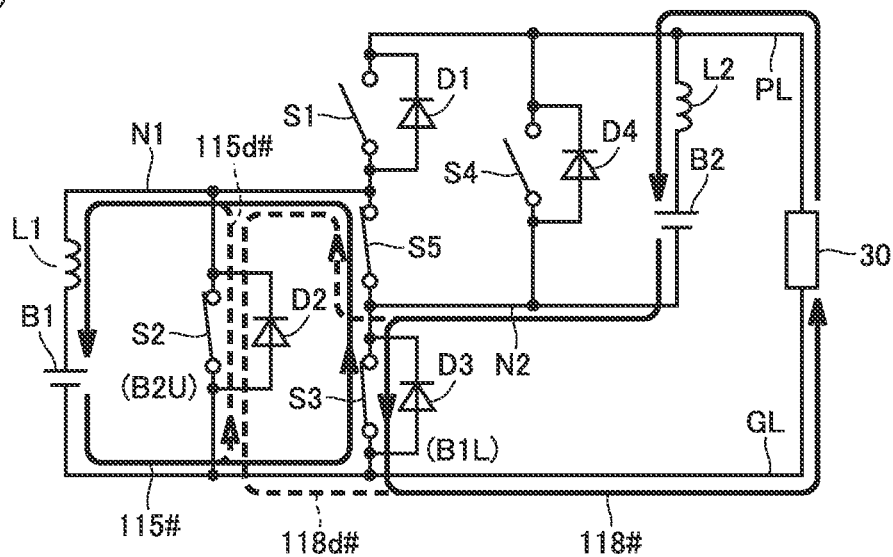
(b)
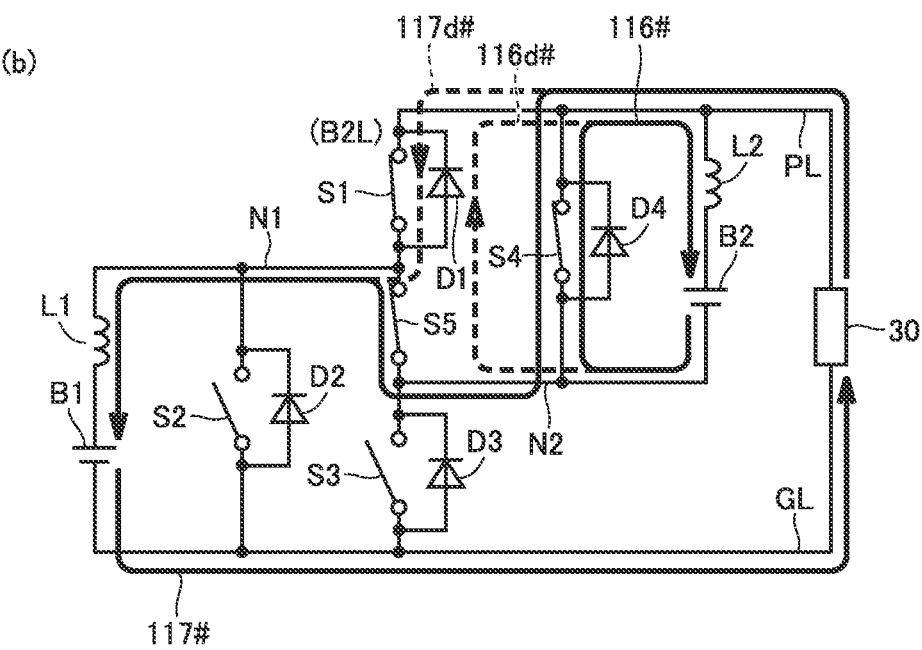

| SWITCH | BOOLEAN EXPRESSION |
|---|---|
| S1 | /SD1 |
| S2 | SD1 |
| S3 | /SD2 |
| S4 | SD2 |
| S5 | SD1 xor SD2 |

| SWITCH | GATE BOOLEAN EXPRESSION |
|---|---|
| S1 | FIXED TO L(OFF) |
| S2 | SD |
| S3 | FIXED TO L(OFF) |
| S4 | SD |
| S5a | FIXED TO H(ON) |
| S5b | /SD |

| SWITCH | GATE BOOLEAN EXPRESSION |
|---|---|
| S1 | FIXED TO L(OFF) |
| S2 | SD |
| S3 | FIXED TO L(OFF) |
| S4 | SD |
| S5 | /SD |

FIG. 42

| MODE | POWER SUPPLY | OUTPUT VOLTAGE | S1 | S2 | S3 | S4 | S5 (S5a,S5b) |
|---|---|---|---|---|---|---|---|
| PARALLEL BOOST | B1, B2 | VH → VH* | ON/OFF CONTROL IN ACCORDANCE WITH FIG. 12 (FIG. 31) | | | | |
| SERIES BOOST | B1, B2 | VH → VH* | ON/OFF CONTROL IN ACCORDANCE WITH FIG. 38 (FIG. 41) | | | | |
| B1 BOOST | ONLY B1 | VH → VH* | /SD1 | SD1 | FIX TO OFF | FIX TO OFF | FIX TO OFF |
| B2 BOOST | ONLY B2 | VH → VH* | FIX TO OFF | FIX TO OFF | /SD2 | SD2 | FIX TO OFF |
| B1 DIRECT COUPLING | ONLY B1 | V[1] (>V[2]) | FIX TO ON | FIX TO OFF | FIX TO OFF | FIX TO OFF | FIX TO OFF |
| B2 DIRECT COUPLING | ONLY B2 | V[2] (>V[1]) | FIX TO OFF | FIX TO OFF | FIX TO ON | FIX TO OFF | FIX TO OFF |
| SERIES DIRECT COUPLING | B1, B2 | V[1] + V[2] | FIX TO OFF | FIX TO OFF | FIX TO ON | FIX TO OFF | FIX TO ON |
| PARALLEL DIRECT COUPLING | B1, B2 | max(V[1],V[2]) | FIX TO ON | FIX TO OFF | FIX TO ON | FIX TO OFF | FIX TO OFF |

SG2,SG4,SG5a(FROM 100)

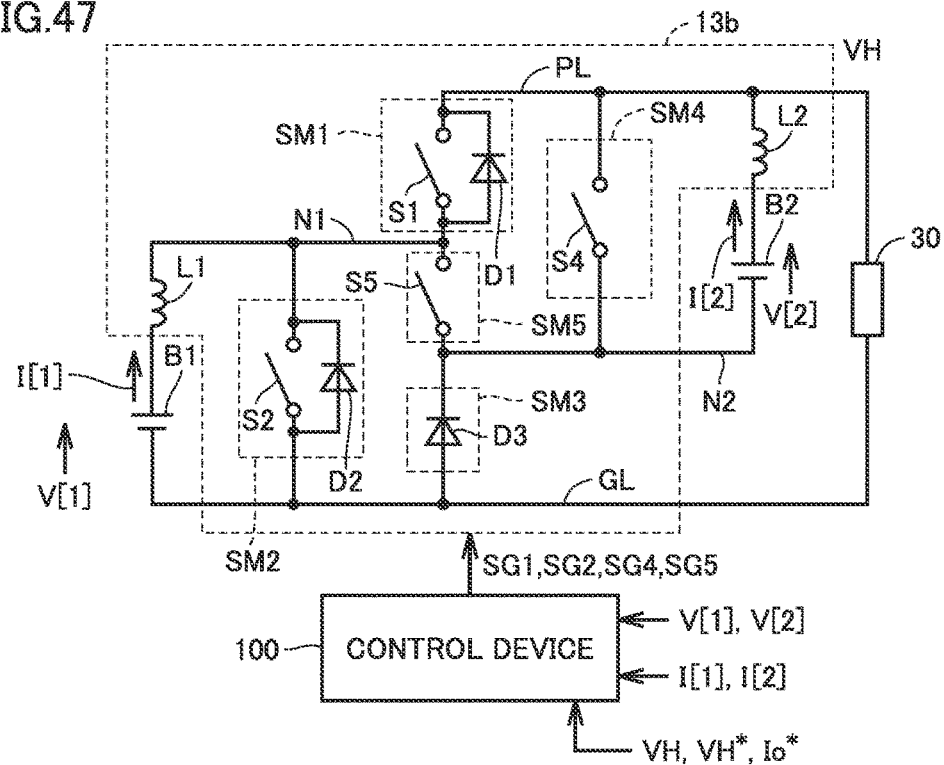
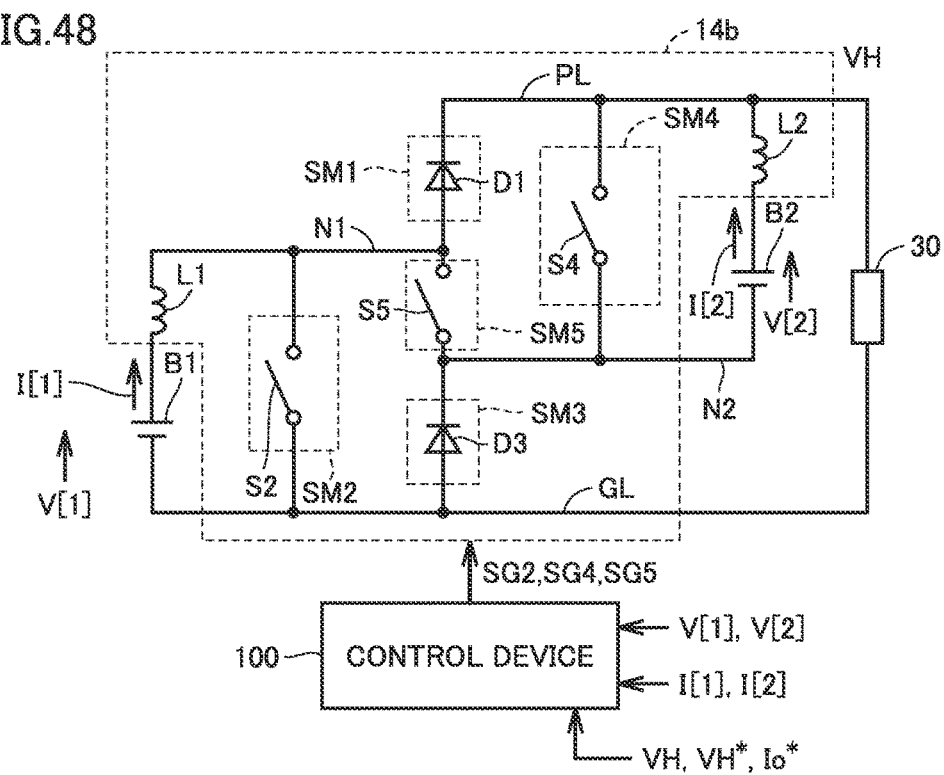

POWER SUPPLY SYSTEM

TECHNICAL FIELD

This invention relates to a power supply system, and more particularly to control of a power supply system configured to include a power converter connected between two direct-current (DC) power supplies and a common power line.

BACKGROUND ART

A hybrid power supply system supplying, by using a power converter connected between a plurality of power supplies and a load, power supply to the load with the plurality of power supplies being combined, has been employed.

For example, Japanese Patent Laying-Open No. 2013-46446 (PTD 1) describes a power supply system for a vehicle in which boost choppers (power converters) provided for each of a secondary battery and an auxiliary power supply which can be charged and discharge are connected in parallel.

Japanese Patent Laying-Open No. 2013-13234 (PTD 2) describes a configuration of a power converter capable of switching between an operation mode in which DC/DC conversion is carried out while two DC power supplies are connected in series (a series connection mode) and an operation mode in which DC/DC conversion is carried out while two DC power supplies are used in parallel (a parallel connection mode) by switching a switching pattern of a plurality of power semiconductor switching elements (which are hereinafter also simply referred to as "switching elements").

CITATION LIST

Patent Document

PTD 1: Japanese Patent Laying-Open No. 2013-46446
PTD 2: Japanese Patent Laying-Open No. 2013-13234

SUMMARY OF INVENTION

Technical Problem

In the power converter described in PTD 2, by suppressing a boost ratio by selecting the series connection mode, a power loss during output of a high voltage can be suppressed as compared with the configuration in PTD 1. In the circuit configuration in PTD 2, such a phenomenon further occurs that a current for electric power conversion for a first DC power supply and a current for electric power conversion for a second DC power supply flow through a common switching element as being superimposed on each other.

Therefore, PTD 2 describes control of relation of a phase (specifically, relation between timing of rise and timing of fall) between a current which flows through the first DC power supply and a first reactor and a current which flows through the second DC power supply and a second reactor so as to reduce a power loss in a specific switching element.

Though reduction in power loss in a specific switching element contributes to improvement in efficiency in a power converter as a whole, it is not much effective for lessening unevenness in amount of heat generation among elements. In general, the switching element is modularized by connecting transistor chips in parallel, and thermal rating is designed based on the number of transistor chips connected in parallel. Therefore, when an amount of heat generation in at least one of the switching elements relatively increases, a greater number of chips connected in parallel are required in that switching element than in other switching elements and an effect of reduction in manufacturing cost in mass production is less.

In a power converter having an operation mode in which two DC power supplies are used in parallel, switching control for electric power conversion is preferably carried out not only to reduce the total sum of power losses in the switching elements but also to lessen unevenness in loss among the switching elements.

This invention was made to solve such problems, and an object thereof is to lessen unevenness in power loss among a plurality of switching elements in electric power conversion in a power supply system including two DC power supplies.

Solution to Problem

In one aspect of the present disclosure, a power supply system which controls a DC voltage between a first power line on a high voltage side and a second power line on a low voltage side includes a first DC power supply, a second DC power supply, a power converter which carries out DC voltage conversion between the first and second DC power supplies and the first and second power lines, and a control device which controls an operation of the power converter. The power converter includes first to fifth semiconductor elements and first and second reactors. The first semiconductor element is electrically connected between the first power line and a first node. The first reactor is electrically connected in series with the first DC power supply, between the first node and the second power line. The second semiconductor element is electrically connected between the second power line and the first node. The second reactor is electrically connected in series with the second DC power supply, between a second node and the first power line. The third semiconductor element is electrically connected between the second node and the second power line. The fourth semiconductor element is electrically connected between the first power line and the second node. The fifth semiconductor element is electrically connected between the first node and the second node. At least some of the first to fifth semiconductor elements each include a switching element configured to control formation and cut-off of a current path in response to a signal from the control device. Each of a first reactor current which flows through the first reactor and a second reactor current which flows through the second reactor is controlled to have a plurality of inflection points in each control cycle as a result of control of on and off of the switching element in response to a control signal from the control device. The control device includes a first switching control mode. In the first switching control mode, the control signal for the switching element is generated such that a first current greater in absolute value of the first and second reactor currents has first and second inflection points representing any one and the other of a relative maximum point and a relative minimum point, respectively, in each control cycle and a second current smaller in absolute value of the first and second reactor currents further has third and fourth inflection points representing any one and the other of the relative maximum point and the relative minimum point, respectively, in addition to the first and second inflection points representing any one and the other of the relative maximum point and the relative minimum point, respectively, in each control cycle. In the first switching control mode, the first inflection points of the first current and the second current appear at identical timing, and the second inflection point of the first current and the third inflection point of the second current appear at identical timing.

According to the power supply system, unevenness in power loss among a plurality of switching elements for electric power conversion can be lessened in a power supply system including two DC power supplies. Consequently, an amount of heat generation can be equal among the plurality of switching elements.

BRIEF DESCRIPTION OF DRAWINGS

FIG. 3 is a circuit diagram showing a configuration of a basic boost chopper circuit.

FIG. 4 is an operation waveform diagram of the boost chopper circuit shown in FIG. 3.

FIG. 9 is a circuit diagram showing a current path when the lower arm of each DC power supply is turned on in the equivalent circuit diagram shown in FIG. 8.

FIG. 10 is a circuit diagram showing a current path when the upper arm of each DC power supply is turned on in the equivalent circuit diagram shown in FIG. 8.

FIG. 11 shows correspondence between on and off of each arm of the boost chopper circuit including a first arm and a second arm and on and off of a switching element.

FIG. 12 is a chart showing a list of gate Boolean expressions for controlling on and off of each switching element in the parallel boost mode of the power converter according to the first embodiment.

FIG. 17 is a circuit diagram illustrating a behavior of a current in formation of the second arm.

FIG. 21 is a conceptual diagram for comparing a switching loss between application and non-application of switching control according to the present embodiment.

FIG. 25 is a circuit diagram for illustrating a behavior of a current in formation of the second arm in a power converter 10 during a regeneration operation.

FIG. 42 is a chart for showing a list of a plurality of operation modes which can selectively be applied to the power converter according to the first and third embodiments.

FIG. 47 is a circuit diagram showing a modification of the configuration of the power converter shown in FIG. 30 when the second DC power supply is not regeneratively charged.

FIG. 48 is a circuit diagram showing a modification of the configuration of the power converter shown in FIG. 30 when the first and second DC power supplies are not regeneratively charged.

DESCRIPTION OF EMBODIMENTS

[First Embodiment]
(Circuit Configuration)

Figure 1:
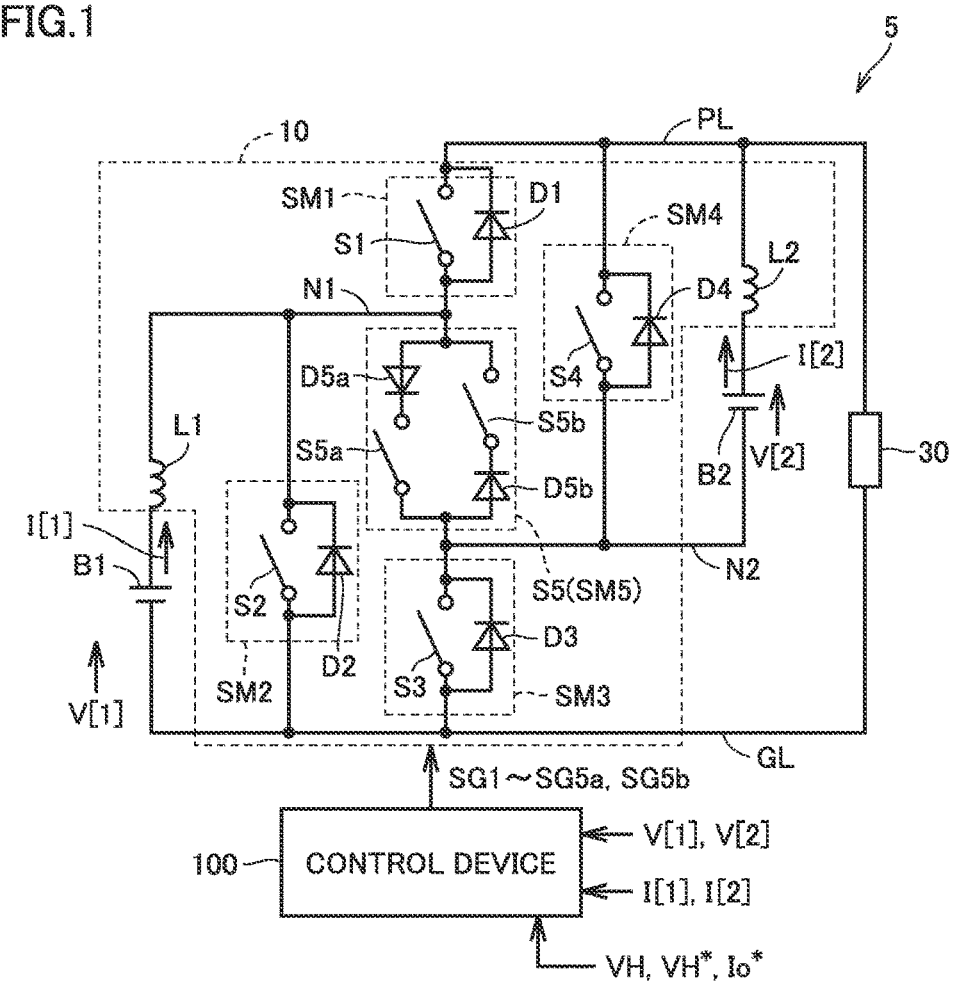
FIG. 1 is a circuit diagram showing a configuration of a power supply system according to a first embodiment of the present invention.

FIG. 1 is a circuit diagram showing a configuration of a power supply system according to an embodiment of the present invention.

Referring to FIG. 1, a power supply system 5 includes a DC power supply B1, a DC power supply B2, a power converter 10, and a control device 100.

In the present embodiment, DC power supplies B1 and B2 are implemented by such a power storage device as a secondary battery or an electric double layer capacitor. For example, DC power supply B1 is implemented by such a secondary battery as a lithium ion secondary battery or a nickel metal hydride battery. DC power supply B2 is implemented by a DC voltage source element excellent in output characteristics, such as an electric double layer capacitor or a lithium ion capacitor. DC power supply B1 and DC power supply B2 correspond to the "first DC power supply" and the "second DC power supply," respectively.

DC power supplies B1 and B2 may also be implemented by power storage devices of the same type. A capacity of DC power supplies B1 and B2 is not particularly limited either. DC power supplies B1 and B2 may be implemented to be equal in capacity to each other, or one DC power supply may be higher in capacity than the other DC power supply.

Power converter 10 is configured to control a DC voltage VH (hereinafter also referred to as an output voltage VH) between a power line PL on a high voltage side and a power line GL on a low voltage side. Power line GL is representatively implemented by a ground line.

A load 30 operates as it receives output voltage VH from power converter 10. A voltage command value VH* of output voltage VH is set to a voltage suitable for an operation of load 30. Voltage command value VH* may variably be set depending on a state of load 30. Alternatively, load 30 may be configured to be able to generate charging power for DC power supply (power supplies) B1 and/or B2 through regenerative power generation.

Power converter 10 includes switching elements (power semiconductor switching elements) S1 to S5 and reactors L1 and L2. In the present embodiment, an insulated gate bipolar transistor (IGBT), a power metal oxide semiconductor (MOS) transistor, or a power bipolar transistor can be employed as the power semiconductor switching element.

Switching element S1 is electrically connected between power line PL and a node N1. Reactor L1 and DC power supply B1 are electrically connected in series between node N1 and power line GL. For example, reactor L1 is electrically connected between a positive electrode terminal of DC power supply B1 and node N1, and a negative electrode terminal of DC power supply B1 is electrically connected to power line GL. Switching element S2 is electrically connected between node N1 and power line GL. Even when an order of connection of reactor L1 and DC power supply B1 is interchanged, an electrically equivalent circuit configuration is maintained.

Switching element S3 is electrically connected between a node N2 and power line GL. Switching element S4 is electrically connected between power line PL and node N2. Switching element S5 is electrically connected between nodes N1 and N2. Reactor L2 and DC power supply B2 are electrically connected in series between power line PL and node N2. For example, reactor L2 is electrically connected between a positive electrode terminal of DC power supply B2 and power line PL and a negative electrode terminal of DC power supply B2 is electrically connected to node N2. Even when an order of connection of reactor L2 and DC power supply B2 is interchanged, an electrically equivalent circuit configuration is maintained.

Anti-parallel diodes D1 to D4 are arranged for switching elements S1 to S4, respectively. Diodes D1 to D4 are arranged to each form a current path in a direction from power line GL toward power line PL (in the drawings, a direction upward from below) during forward biasing. On the other hand, diodes D1 to D4 form no current path during reverse biasing. Specifically, diode D1 is connected to have a direction from node N1 toward power line PL as a forward direction, and diode D2 is connected to have a direction from power line GL toward node N1 as the forward direction. Similarly, diode D3 is connected to have a direction from power line GL toward node N2 as the forward direction, and diode D4 is connected to have a direction from node N2 toward power line PL as the forward direction.

In the configuration example in FIG. 1, switching element S5 is provided as a bidirectional switch which can separately control formation and cut-off of each of a current path from node N1 toward node N2 and a current path from node N2 toward node N1. The bidirectional switch (S5) has a diode D5a and a switching element S5a electrically connected in series between nodes N1 and N2. Diode D5a is electrically connected between nodes N1 and N2 with a direction from node N1 toward node N2 being defined as a forward direction.

The bidirectional switch (S5) further has a diode D5b and a switching element S5b electrically connected in series between nodes N1 and N2. Diode D5b and switching element S5b are connected between nodes N1 and N2 in parallel to diode D5a and switching element S5a. Diode D5b is electrically connected between nodes N1 and N2 with a direction from node N2 toward node N1 being defined as the forward direction.

In the bidirectional switch, when switching element S5a is turned on, a current path is formed in a direction from node N1 toward node N2 through diode D5a. When switching element S5a is turned off, the current path is cut off. Switching element S5a is arranged to control formation and cut-off of the current path from node N1 to node N2.

When switching element S5b is turned on, a current path is formed in a direction from node N2 toward node N1 through diode D5b. When switching element S5b is turned off, the current path is cut off. Switching element S5b is arranged to control formation and cut-off of the current path from node N2 to node N1.

On and off of switching elements S1 to S5a and S5b can be controlled in response to control signals SG1 to SG4, SG5a, and SG5b from control device 100, respectively. Specifically, switching elements S1 to S5 can form current paths as they are turned on when control signals SG1 to SG5 are at the logic high level (hereinafter also denoted as the "H level"). On the other hand, switching elements S1 to S5a and S5b cut off the current paths as they are turned off when control signals SG1 to SG4, SG5a, and SG5b are at the logic low level (hereinafter also denoted as the "L level").

In the configuration example in FIG. 1, switching element S1 and diode D1 correspond to a "first semiconductor element SM1," switching element S2 and diode D2 correspond to a "second semiconductor element SM2," and switching element S3 and diode D3 correspond to a "third semiconductor element SW." Switching element S4 and diode D4 correspond to a "fourth semiconductor element SM4" and switching elements S5a and S5b and diodes D5a and D5b correspond to a "fifth semiconductor element SM5." Reactors L1 and L2 correspond to the "first reactor" and the "second reactor", respectively. In the example in FIG. 1, by controlling on and off of switching elements S1 to S5a and S5b, formation and cut-off of a current path can be controlled in each of first semiconductor element SM1 to fifth semiconductor element SM5.

Control device 100 is implemented, for example, by an electronic control unit (ECU) having a central processing unit (CPU) and a memory which are not shown. Control device 100 is configured to perform operation processing using a detection value from each sensor, based on a map and a program stored in the memory. Alternatively, at least a part of control device 100 may be configured to perform prescribed numeric and logical operation processing with such hardware as an electronic circuit.

Control device 100 generates control signals SG1 to SG5a and SG5b controlling on and off of switching elements S1 to S5 for controlling output voltage VH. Though illustration is not provided in FIG. 1, detectors (voltage sensors) for a voltage (denoted as V[1]) and a current (denoted as I[1]) of DC power supply B1, a voltage (denoted as V[2]) and a current (denoted as I[2]) of DC power supply B2, and output voltage VH are provided. Outputs from these detectors are provided to control device 100.

Figure 2:
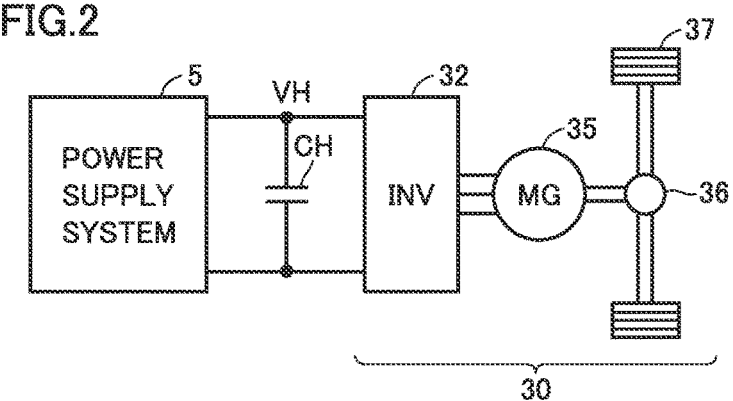
FIG. 2 is a schematic diagram showing a configuration example of a load shown in FIG. 1.

FIG. 2 is a schematic diagram showing a configuration example of load 30.

Referring to FIG. 2, load 30 is configured to include, for example, a traction motor of an electrically powered vehicle. Load 30 includes a smoothing capacitor CH, an inverter 32, a motor generator 35, a power train 36, and a drive wheel 37.

Motor generator 35 is a traction motor, for generating vehicle driving force, and it is implemented, for example by a multiple-phase permanent magnet type synchronous motor. Output torque from motor generator 35 is transmitted to drive wheel 37 through power train 36 constituted of a reduction gear and a power split device. The electrically powered vehicle runs with torque transmitted to drive wheel 37. Motor generator 35 generates power with rotational force from drive wheel 37 during regenerative braking of the electrically powered vehicle. This generated electric power is subjected to AC/DC conversion by inverter 32. This DC power can be used as charging power for DC power supplies B1 and B2 included in power supply system 5.

In a hybrid car on which an engine (not shown) is mounted in addition to the motor generator, this engine and motor generator 35 are operated in coordination so as to generate vehicle driving force necessary for the electrically powered vehicle. Here, DC power supplies B1 and B2 can also be charged with power generated through rotation of the engine.

Thus, the electrically powered vehicle comprehensively represents a vehicle on which a traction motor is mounted, and includes both of the hybrid car on which an engine and a motor are mounted and an electric car and a fuel cell car on which no engine is mounted.

(Operation of Power Converter)

Similarly to the power converter described in PTD 2, power converter 10 has a plurality of operation modes different in manner of DC power conversion (DC/DC conversion) between DC power supplies B1 and B2 and power lines PL and GL. These operation modes are selectively applied by switching a manner of on/off control of the switching elements.

The plurality of operation modes of power converter 10 include a "parallel boost mode" for DC/DC conversion in parallel between DC power supplies B1 and B2 and power lines PL and GL and a "series boost mode" for DC/DC conversion between DC power supplies B1 and B2 connected in series and power lines PL and GL. The parallel boost mode corresponds to the "parallel connection mode" in PTD 2 and the series boost mode corresponds to the "series connection mode" in PTD 2.

As will be clarified in the description below, the power supply system according to the present embodiment is characterized in switching control for suppressing a difference in heat generation among switching elements in the parallel boost mode of power converter 10. Therefore, an operation and control in the parallel boost mode which define the basis will initially be described.

As is understood from FIG. 1, power converter 10 has a circuit configuration including a boost chopper circuit formed between DC power supply B1 and power lines PL and GL and a boost chopper circuit formed between DC power supply B2 and power lines PL and GL as being combined. Therefore, an operation of a basic boost chopper circuit will initially be described in detail.

FIG. 3 shows a circuit diagram showing a configuration of the basic boost chopper circuit.

Referring to FIG. 3, a boost chopper circuit CHP has a switching element Su implementing an upper arm, a switching element S1 implementing a lower arm, and a reactor L. Diodes Du and D1 are connected in anti-parallel to switching element Su in the upper arm and switching element S1 in the lower arm, respectively.

In boost chopper circuit CHP, an on period and an off period of the lower arm (switching element S1) are alternately provided. During the on period of the lower arm, a current path 101 through a DC power supply PS, a reactor L, and lower arm element S1 (on) is formed. Thus, energy is stored in reactor L.

During the off period of the lower arm, a current path 102 through DC power supply PS, reactor L, diode Du (or switching element Su), and load 30 is formed. Thus, energy stored in reactor L during the on period of lower arm element S1 and energy from DC power supply PS are supplied to load 30. Thus, an output voltage to load 30 is boosted as compared with an output voltage from DC power supply PS.

Switching element Su in the upper arm should be turned off during the on period of switching element S1 in the lower arm. During the off period of switching element S1 in the lower arm, switching element Su in the upper arm is turned on, so that power from load 30 can be regenerated to DC power supply PS. For example, by periodically and complementarily turning on and off switching element Su in the upper arm and switching element S1 in the lower arm, DC/DC conversion can be carried out for both of regeneration and power running while controlling output voltage VH, without switching a manner of switching control (on/off control) in accordance with a direction of a current.

When power regeneration to DC power supply PS is not carried out, a direction of a current is limited to one direction. Therefore, it is not necessary to arrange switching element Su in the upper arm, and the upper arm can be implemented only by diode Du. In addition, it is not necessary to arrange diode D1 in the lower arm.

FIG. 4 shows an operation waveform example of the boost chopper circuit shown in FIG. 3.

Referring to FIG. 4, during the on period of the lower arm, a current which flows through reactor L and DC power supply PS (hereinafter referred to as a "reactor current") IL becomes higher and during the off period of the lower arm, reactor current IL is lowered. Therefore, by controlling a ratio between the on period and the off period of switching element S1 in the lower arm, output voltage VH can be controlled. Specifically, by raising a ratio of the on period, output voltage VH becomes higher.

A voltage conversion ratio (a boost ratio) in boost chopper circuit CHP has been known to be expressed by an expression (1) below, by using a voltage Vi from DC power supply PS, output voltage VH, and a duty ratio DT (hereinafter also simply referred to as a duty ratio DT). Duty ratio DT is a parameter which represents a ratio of the on period and is defined by a ratio of the on period of the lower arm (a time ratio) to a switching period To (the on period+the off period).

$$VH = 1/(1-DT) \cdot Vi \quad (1)$$

In boost chopper circuit CHP, on and off of the switching element (hereinafter switching control) can be controlled based on pulse width modulation (PWM) control. For example, a control pulse signal SD for turning on and off the lower arm is generated in accordance with voltage comparison between a carrier wave CW and duty ratio DT.

Carrier wave CW is equal in period to switching period To. For example, a triangular wave is employed for carrier wave CW. A frequency of carrier wave CW corresponds to a switching frequency of switching element S1 (Su). A voltage width (peak to peak) of carrier wave CW is set to a voltage corresponding to DT=1.0.

Control pulse signal SD is set to the H level when a voltage exhibiting duty ratio DT is higher than a voltage of carrier wave CW, and set to the L level when it is lower than a voltage of carrier wave CW. A control pulse signal /SD is an inverted signal of control pulse signal SD.

On and off of switching element S1 in the lower arm is controlled in response to control pulse signal SD. Namely, switching element S1 in the lower arm is controlled to on during the H level period of control pulse signal SD, while it is controlled to off during the L level period of control pulse signal SD. On and off of switching element Su in the upper arm can be controlled periodically and complementarily to switching element S1 in the lower arm, in response to control pulse signal /SD.

Reactor current IL increases during a period in which the lower arm is on and lowers during a period in which the upper arm is on under the switching control. At timing of transition from on of the upper arm to on of the lower arm, reactor current IL attains to a relative minimum point. In contrast, reactor current IL attains to a relative maximum point at timing of transition from on of the lower arm to on of the upper arm.

As duty ratio DT is higher, the on period of the lower arm is longer and hence the average value of current IL increases. Thus, with increase in output from DC power supply PS, output voltage VH increases.

In contrast, as duty ratio DT is lower, the on period of the upper arm is longer and hence the average value of current IL lowers. Thus, with lowering in output from DC power supply PS, output voltage VH lowers. Thus, in a chopper circuit, an output is controlled by providing a relative maximum point and a relative minimum point, that is, a plurality of inflection points, in reactor current IL under the switching control.

(Circuit Operation in Parallel Boost Mode)

An operation and control in the parallel boost mode of power converter 10 will now be described in detail. Power converter 10 operates in the parallel boost mode in such a manner that two boost chopper circuits are operated in parallel with respect to each of DC power supplies B1 and B2. Namely, power converter 10 controls output voltage VH in accordance with voltage command value VH* by carrying out DC/DC conversion in parallel between DC power supplies B1 and B2 and power lines PL and GL (load 30), as in the parallel connection mode in PTD 2.

Referring again to FIG. 1, power converter 10 is characterized by difference in boost chopper circuit formed for DC power supplies B1 and B2 between an example in which switching element S5 (S5a, S5b) is turned off and no current flows between nodes N1 and N2 and an example where it is not the case.

Figure 5:
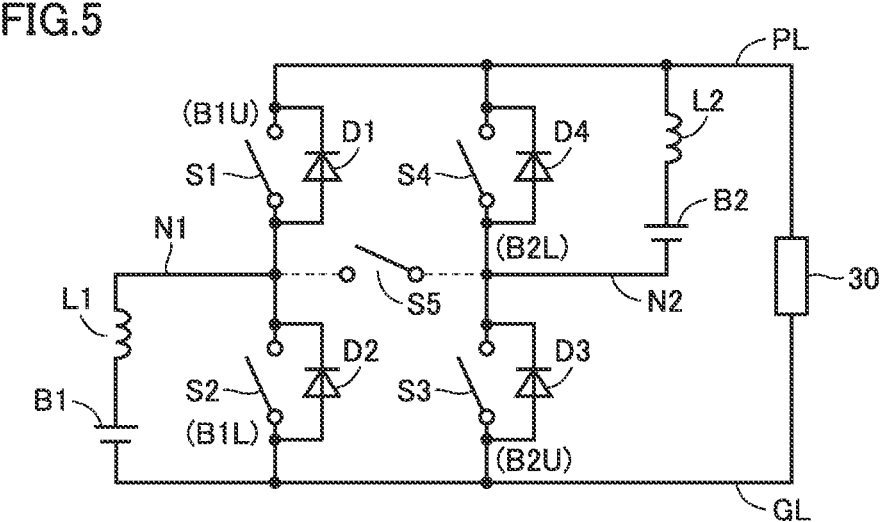
FIG. 5 is a first equivalent circuit diagram in a parallel boost mode of a power converter shown in FIG. 1.

FIG. 5 shows an equivalent circuit of power converter 10 when no current flows between nodes N1 and N2. A state that no current flows between nodes N1 and N2 as a result of turn-off of at least one of switching elements S5a and S5b is also referred to as off of switching element S5 below.

Referring to FIG. 5, while switching element S5 is off, for DC power supply B1, such a boost chopper circuit that switching element S2 and diode D2 implement the lower arm and switching element S1 and diode D1 implement the upper arm is formed. On the other hand, for DC power supply B2, such a boost chopper circuit that switching element S4 and diode D4 implement the lower arm and switching element S3 and diode D3 implement the upper arm is formed.

Therefore, power converter 10 has a circuit configuration in which boost chopper circuits are provided in parallel to DC power supplies B1 and B2 while switching element S5 is off as in PTD 1.

Figure 6:
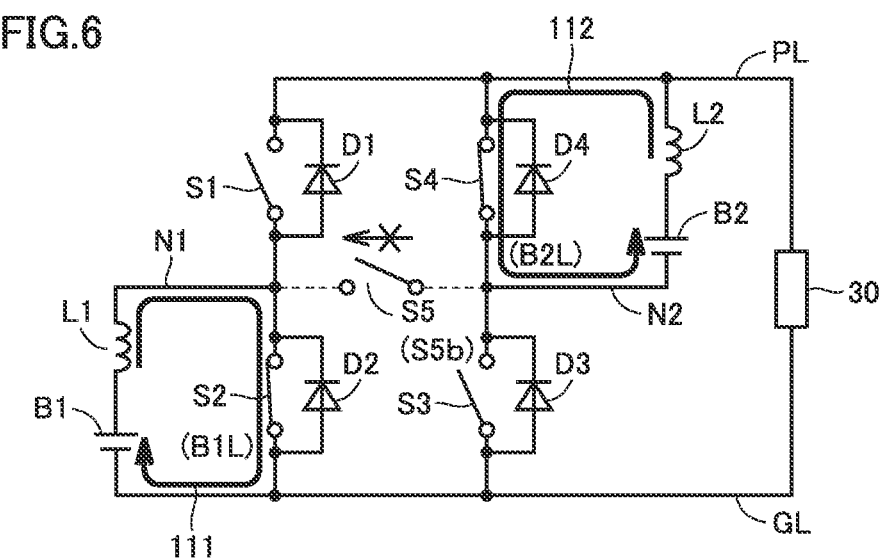
FIG. 6 is a circuit diagram showing a current path when a lower arm of each DC power supply is turned on in the equivalent circuit diagram shown in FIG. 5.

FIG. 6 shows a current path when the lower arms of DC power supplies B1 and B2 are turned on in the equivalent circuit diagram shown in FIG. 5.

Referring to FIG. 6, by turning on switching element S2, similarly to current path 101 in FIG. 3, a current path 111 for storing energy in reactor L1 with output from DC power supply B1 is formed. Namely, switching element S2 corresponds to the lower arm of the boost chopper circuit formed in correspondence with DC power supply B1.

Similarly, by turning on switching element S4, similarly to current path 101 in FIG. 3, a current path 112 for storing energy in reactor L2 with output from DC power supply B2 is formed. Namely, switching element S4 corresponds to the lower arm of the boost chopper circuit formed in correspondence with DC power supply B2.

Figure 7:
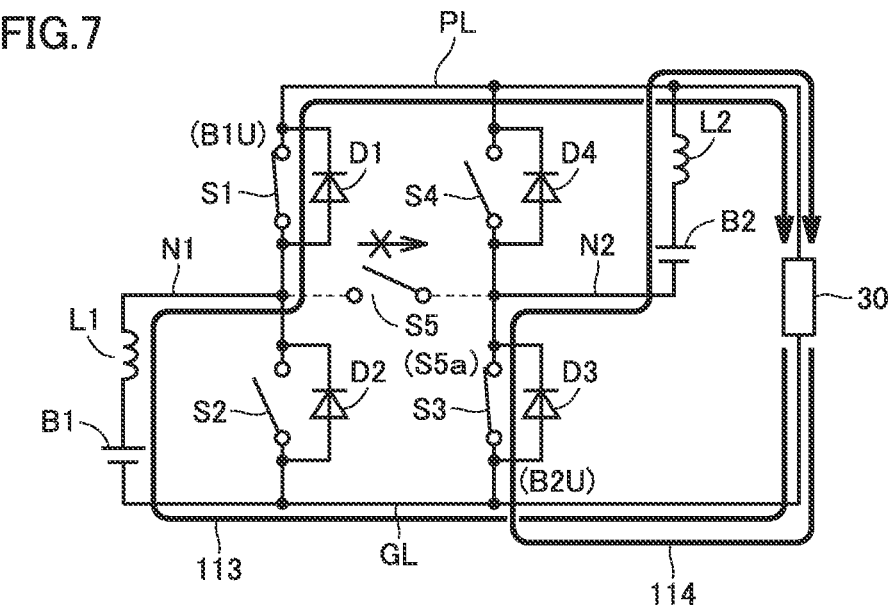
FIG. 7 is a circuit diagram showing a current path when an upper arm of each DC power supply is turned on in the equivalent circuit diagram shown in FIG. 5.

FIG. 7 shows a current path when upper arms of DC power supplies B1 and B2 are turned on in the equivalent circuit diagram shown in FIG. 5.

Referring to FIG. 7, by turning off switching element S2, a current path 113 for outputting energy stored in reactor L1 to power line PL together with energy from DC power supply B1 through switching element S1 or diode D1 is formed. In the present embodiment, by complementarily turning on and off switching elements S1 and S2, switching element S1 is turned on during the off period of switching element S2. Switching element S1 corresponds to the upper arm of the boost chopper circuit formed in correspondence with DC power supply B1.

Similarly, by turning off switching element S4, a current path 114 for outputting energy stored in reactor L2 to power line PL together with energy from DC power supply B2 through switching element S3 or diode D3 is formed. In the present embodiment, since switching elements S3 and S4 are complementarily turned on and off, switching element S3 is turned on during the off period of switching element S4. Switching element S3 corresponds to the upper arm of the boost chopper circuit formed in correspondence with DC power supply B2.

As is understood from FIGS. 6 and 7, by alternately forming current paths 111 and 113, DC/DC conversion between DC power supply B1 and power lines PL and GL is carried out. Similarly, by alternately forming current paths 112 and 114, DC/DC conversion between DC power supply B2 and power lines PL and GL is carried out.

In the following, the upper arm of the boost chopper circuit formed in correspondence with DC power supply B1 is also referred to as a "B1U arm" and the lower arm is referred to as a "B1L arm". Similarly, the upper arm of the boost chopper circuit formed in correspondence with DC power supply B2 is also referred to as a "B2U arm" and the lower arm is also referred to as a "B2L arm".

As is understood from FIG. 6, if a current path from node N2 toward node N1 is formed while the B1L arm and the B2L arm are formed, a short-circuiting path from power line PL to power line GL is formed and hence the current path should be cut off. Therefore, in this case, switching element S5b should be turned off. On the other hand, even though switching element S5a is turned on, the current path from node N2 toward node N1 can be cut off by using diode D5a.

Similarly, as is understood from FIG. 7, if a current path from node N1 toward node N2 is formed while the B1U arm and the B2U arm are formed, a short-circuiting path from power line PL to power line GL is formed and hence the current path should be cut off. Therefore, in this case, switching element S5a should be turned off. On the other hand, even though switching element S5b is turned on, the current path from node N1 toward node N2 can be cut off by using diode D5b.

Figure 8:
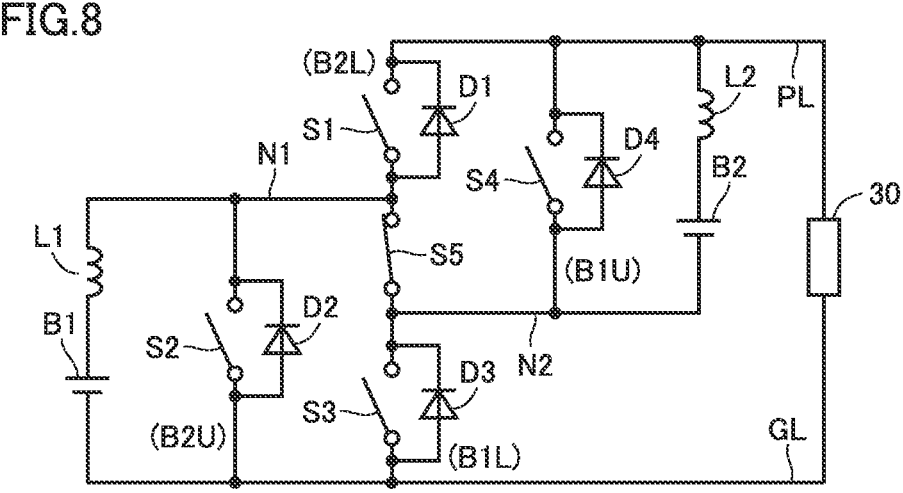
FIG. 8 is a second equivalent circuit diagram in the parallel boost mode of the power converter shown in FIG. 1.

When switching element S5 is thus configured as a bidirectional switch, switching elements S5a and S5b can separately be turned on and off FIG. 8 shows an equivalent circuit of power converter 10 when a current flows between nodes N1 and N2. A state that a current flows between nodes N1 and N2 as a result of turn-on of switching elements S5a and S5b is also referred to as on of switching element S5 below.

Referring to FIG. 8, in connection with DC power supply B1, while switching element S5 is turned on, switching element S3 connected between node N2 and power line GL can serve as the lower arm (the B1L arm) of DC power supply B1 and the boost chopper circuit can thus be formed. Similarly, switching element S4 electrically connected between node N2 and power line PL serves as the upper arm (the B1U arm) of DC power supply B1 and the boost chopper circuit can thus be formed.

For DC power supply B2, the boost chopper circuit can be formed, with switching element S1 connected between node N1 and power line PL serving as the lower arm (the B2L arm) and switching element S2 serving as the upper arm (the B2U arm).

FIG. 9 shows current paths when the lower arms of DC power supplies B1 and B2 are turned on in the equivalent circuit diagram shown in FIG. 8.

Referring to FIG. 9 (a), by turning on switching elements S3 and S5a, a current path 115 for storing energy in reactor L1 with output from DC power supply B1 is formed. As shown in FIG. 9 (b), by turning on switching elements S1 and S5a, a current path 116 for storing energy in reactor L2 with output from DC power supply B2 is formed.

FIG. 10 shows current paths when the upper arms of DC power supplies B1 and B2 are turned on in the equivalent circuit diagram shown in FIG. 8.

Referring to FIG. 10 (a), in connection with DC power supply B1, by turning off switching element S3 while switching element S5 (S5a) is on, a current path 117 for outputting energy stored in reactor L1 to power line PL together with energy from DC power supply B1 through switching element S4 or diode D4 is formed. As described above, since switching elements S3 and S4 are complementarily turned on and off, switching element S3 can form the B1L arm and switching element S4 can form the B1U arm.

Referring to FIG. 10 (b), in connection with DC power supply B2, by turning off switching element S1 while switching element S5 (S5a) is on, a current path 118 for outputting energy stored in reactor L2 to power line PL together with energy from DC power supply B2 through switching element S2 or diode D2 is formed. As described above, since switching elements S1 and S2 are complementarily turned on and off, switching element S1 can form the B2L arm and switching element S2 can form the B2U arm. In FIGS. 10 (a) and (b), as switching element S5b is turned on, a regenerative current from load 30 which flows in a direction reverse to current paths 117 and 118 can be accepted to charge DC power supplies B1 and B2.

FIG. 11 shows correspondence between each arm of the boost chopper circuit formed in each case of off and on of switching element S5 and on and off of the switching elements.

Referring to FIG. 11, each arm in the boost chopper circuit formed while switching element S5 is off (FIGS. 5 to 7) is referred to as a "first arm" and each arm of the boost chopper circuit formed while switching element S5 is on (FIGS. 8 to 10) is referred to as a "second arm".

While switching element S5 is off, that is, while the first arm is formed, for DC power supply B1, as described above, the B1L arm is turned on by turning on switching element S2 and the B1U arm is turned on by turning on switching element S1 (turning off of switching element S2). For DC power supply B2, the B2L arm is turned on by turning on switching element S4, and the B2U arm is turned on by turning on switching element S3 (turning off of switching element S4).

While switching element S5 is on, that is, while the second arm is formed, for DC power supply B1, as described above, the B1L arm is turned on by turning on switching element S3, and the B1U arm is turned on by turning on switching element S4 (turning off of switching element S3). For DC power supply B2, the B2L arm is turned on by turning on switching element S1, and the B2U arm is turned on by turning on switching element S2 (turning off of switching element S1).

Thus, in any of the first arm and the second arm, switching elements S1 and S2 are complementarily turned on and off and switching elements S3 and S4 are complementarily turned on and off, so that each of DC power supplies B1 and B2 can be controlled such that the upper arm and the lower arm are alternately turned on and off.

In the parallel boost mode of power converter 10 according to the first embodiment, DC/DC conversion is carried out by selectively using the first arm and the second arm shown in FIG. 11. As shown in FIG. 11, however, switching elements S1 to S4 operate as the first arm for one of DC power supplies B1 and B2, while they operate as the second arm for the other of DC power supplies B1 and B2. Attention should be paid to such a fact that interference between the first arm and the second arm will limit a period during which the second arm can be applied.

Specifically, when the second arm is turned on for one of DC power supplies B1 and B2, the first arm on a side opposite in terms of upper and lower is turned on for the other of DC power supplies B1 and B2. For example, when switching elements S3 and S5 are turned on to thereby turn on the B1L arm of the second arm (FIG. 9 (a)), in response to on of switching element S3, as in FIG. 7, the B2U arm of the first arm is turned on for DC power supply B2. In contrast, when switching elements S4 and S5 are turned on to thereby turn on the B1U arm of the second arm (FIG. 10 (a)), as in FIG. 6, the B2L arm of the first arm is turned on for DC power supply B2.

As is understood also from FIGS. 9 (a) and (b), when both of the B1L arm and the B2L arm are turned on while the second arm is formed, a short-circuiting path is formed between power lines PL and GL through switching elements S1, S3, and S5a in the on state. Therefore, when both of the B1L arm and the B2L arm are turned on as described above, the first arm (FIG. 6) should be applied by turning off switching element S5 (at least S5a).

Similarly, as is understood also from FIGS. 10 (a) and (b), when both of the B1U arm and the B2U arm are turned on while the second arm is formed, a short-circuiting path is formed between power lines PL and GL through switching elements S4, S5b, and S2 in the on state. Therefore, when both of the B1L arm and the B2L arm are turned on as described above, the first arm (FIG. 6) should be applied by turning off switching element S5 (at least S5b).

Therefore, a period during which the second arm can be used is limited to a period during which a command (on/off) to the upper arm and a command (on/off) to the lower arm are different between DC power supplies B1 and B2. Namely, the second arm can be used only during a period in which on of the upper arm is indicated to DC power supply B1 and on of the lower arm is indicated to DC power supply B2 or during a period in which on of the lower arm is indicated to DC power supply B1 and on of the upper arm is indicated to DC power supply B2.

FIG. 12 shows gate Boolean expressions for controlling on and off of each of switching elements S1 to S5 in the parallel boost mode.

Referring to FIG. 12, a control pulse signal SD1 corresponds to control pulse signal SD (FIG. 4) in the boost chopper circuit corresponding to DC power supply B1. Namely, while control pulse signal SD1 is at the H level, on of the lower arm is instructed to DC power supply B1. As the H level period of control pulse signal SD1 is longer, output from DC power supply B1 increases.

A control pulse signal /SD1 is an inverted signal of control pulse signal SD1. Namely, while control pulse signal /SD1 is at the H level, on of the upper arm is instructed to DC power supply B1. As the H level period of control pulse signal /SD1 (that is, the L level period of control pulse signal SD1) is longer, output from DC power supply B1 decreases.

Similarly, a control pulse signal SD2 corresponds to control pulse signal SD (FIG. 4) in the boost chopper circuit corresponding to DC power supply B2, and a control pulse signal /SD2 is an inverted signal of control pulse signal SD2. As the H level period of control pulse signal SD2 is longer, output from DC power supply B2 increases, and as the H level period of control pulse signal /SD1 (that is, the L level period of control pulse signal SD1) is longer, output from DC power supply B1 decreases.

In the parallel boost mode of power converter 10, on and off of switching element S2 is controlled in correspondence with control pulse signal SD1, and switching element S1 is turned on and off in response to control pulse signal /SD1. On and off of switching element S4 is controlled in response to control pulse signal SD2, and switching element S3 is turned on and off in response to control pulse signal /SD2.

On and off of switching element S5 is basically controlled in accordance with an exclusive OR (XOR) of control pulse signals SD1 and SD2. Thus, when control pulse signals SD1 and SD2 are identical to each other in logic level (that is, SD1=SD2=H or SD1=SD2=L), switching element S5 is turned off. Consequently, formation of a short-circuiting path between power lines PL and GL can be avoided by electrically disconnecting nodes N1 and N2 from each other in the circuit state shown in FIG. 6 or 7.

In order to avoid formation of a short-circuiting path in each of the circuit states in FIGS. 6 and 7 as described above, cut-off of a current path in one direction suffices. Specifically, in the circuit state in FIG. 6, formation of the short-circuiting path can be avoided simply by cutting off only the current path in the direction from node N2 toward node N1. Similarly, in the circuit state in FIG. 7, the current path in the direction from node N1 toward node N2 should only be cut off.

Therefore, during a period in which both of the B1L arm (switching element S2) and the B2L arm (switching element S4) are turned on, that is, during a period in which a condition of SD1=SD2=the H level is satisfied, switching element S5b should be turned off whereas switching element S5a can be turned on. During a period in which both of the B1U arm (switching element S1) and the B2U arm (switching element S3) are turned on, that is, during a period in which a condition of SD1=SD2=the H level is satisfied, switching element S5a should be turned off whereas switching element S5b can be turned on.

Therefore, switching element S5a can also be turned on and off in accordance with a logical sum (OR) of control pulse signals SD1 and SD2. Similarly, switching element S5b can also be turned on and off in accordance with a logical sum (OR) of control pulse signals /SD1 and /SD2.

Since the number of times of turn-on and -off of each of switching elements S5a and S5b can be reduced as compared with an example in which switching elements S5a and S5b are turned on and off in common in accordance with an exclusive logical sum (XOR) of control pulse signals SD1 and SD2, a switching loss can be suppressed.

Thus, by controlling on and off of switching elements S1 to S5a and S5b in response to control pulse signals SD1 and SD2 in accordance with the Boolean expressions shown in FIG. 12, DC/DC conversion in the parallel boost mode can be carried out while automatic selection between the boost chopper circuit where the first arm is used and the boost chopper circuit using formation of the second arm is made. In particular, by controlling formation/cut-off of a current path between nodes N1 and N2 through switching element S5 (S5a, S5b), switching between the first arm and the second arm can be made while formation of a short-circuiting path between power lines PL and GL is avoided.

Figure 13:
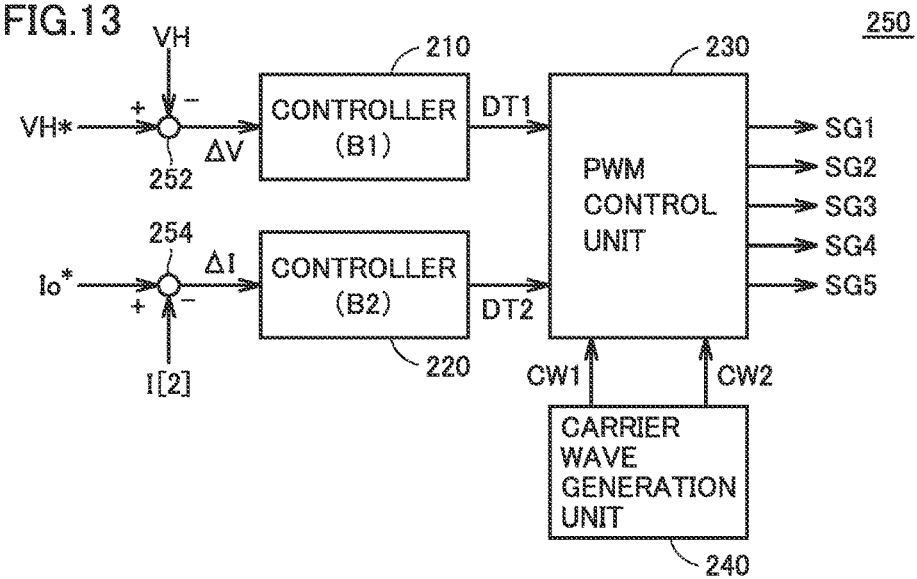
FIG. 13 is a functional block diagram for illustrating an example of control of output from the DC power supplies in the parallel boost mode of the power converter shown in FIG. 1.

FIG. 13 is a functional block diagram for illustrating an example of control of output from DC power supplies B1 and B2 in the parallel boost mode of power converter 10. In the following, a function of the functional block in each functional block diagram represented by FIG. 13 is implemented by software processing and/or hardware processing by control device 100.

Referring to FIG. 13, in the parallel boost mode, as in the parallel connection mode in PTD 2, output from one of DC power supplies B1 and B2 can be controlled so as to compensate for a voltage difference ΔV (ΔV=VH*−VH) in output voltage VH (voltage control), and output from the other of DC power supplies B1 and B2 can be controlled so as to compensate for a current difference of current I[1] or I[2] (current control). For example, a command value (Io*) for current control can be set in order to control output power from the power supply.

By way of example, a converter control unit 250 in the parallel boost mode controls power converter 10 so as to subject output from DC power supply B1 to voltage control and subject output from DC power supply B2 to current control. In this case, by using a power command value P[2]* and voltage V[2] of DC power supply B2 so as to set Io*=P[2]*/V[2], an input/output voltage of DC power supply B2 can be controlled in accordance with power command value P[2]*.

Converter control unit 250 includes subtraction units 252 and 254, a controller 210 for controlling output from DC power supply B1, a controller 220 for controlling output from DC power supply B2, a PWM control unit 230, and a carrier wave generation unit 240.

Subtraction unit 252 calculates voltage difference ΔV (ΔV=VH*−VH) for voltage control. Controller 210 operates a duty ratio DT1 of DC power supply B1 (hereinafter simply referred to as duty ratio DT1) through feedback control for compensating for voltage difference ΔV (for example, PI control). Duty ratio DT1 can also be operated, with a theoretical boost ratio found from a voltage ratio between voltage V[1] from DC power supply B1 and voltage command value VH* based on the expression (1) being further reflected.

Subtraction unit 254 calculates a current difference ΔI (ΔI=Io*−I[2]) for current control. Controller 220 operates a duty ratio DT2 of DC power supply B2 (hereinafter simply referred to as duty ratio DT2) through feedback control for compensating for current difference ΔI (for example, PI control). Duty ratio DT2 can also be operated, with a theoretical boost ratio found from a voltage ratio between voltage V[2] from DC power supply B2 and voltage command value VH* based on the expression (1) being further reflected.

Carrier wave generation unit 240 generates a carrier wave CW1 used for control of DC power supply B1 and CW2 used for control of DC power supply B2. PWM control unit 230 generates control signals SG1 to SG5 based on combination between PWM control based on comparison between duty ratio DT1 and carrier wave CW1 and PWM control based on comparison between carrier wave CW2 and duty ratio DT2. Carrier waves CW1 and CW2 have the same frequency corresponding to a switching frequency.

Figure 14:
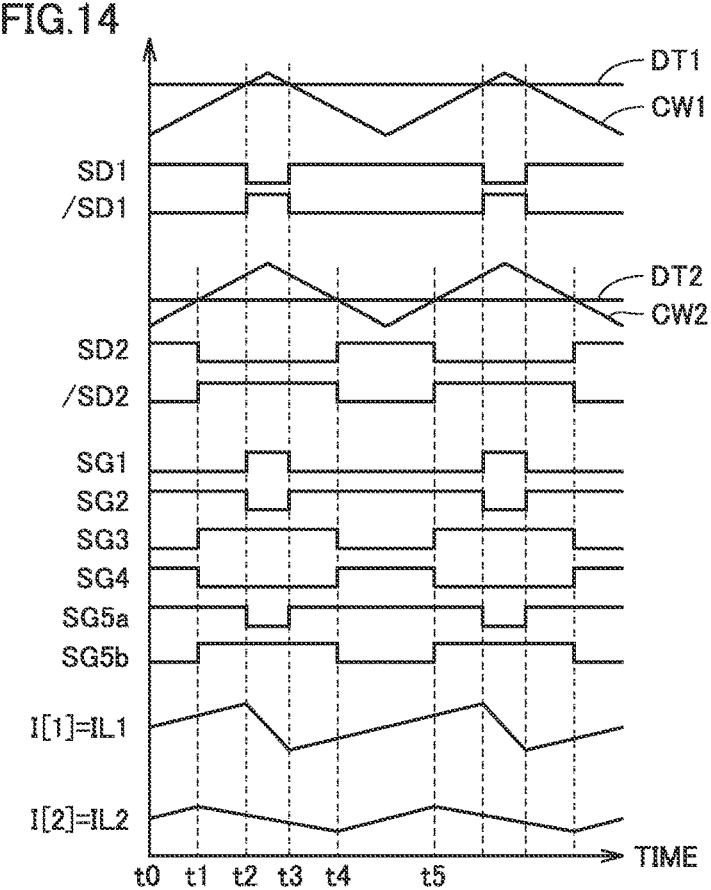
FIG. 14 is a waveform diagram for illustrating an operation in PWM control.

FIG. 14 shows a waveform diagram for illustrating an operation of PWM control unit 230 in the parallel connection mode.

Referring to FIG. 14, for DC power supply B1, control pulse signals SD1 and /SD1 are generated through PWM control based on voltage comparison between carrier wave CW1 and duty ratio DT1. During a period in which a condition of DT1>CW1 is satisfied, control pulse signal SD1 is set to the H level, and during a period in which a condition of CW1>DT1 is satisfied, control pulse signal SD1 is set to the L level. Therefore, with increase in duty ratio DT1, the H level period of control pulse signal SD1 is longer and the H level period of control pulse signal /SD1 is shorter. As described above, since on of the lower arm of DC power supply B1 is indicated during the H level period of control pulse signal SD1, output from DC power supply B1 increases with increase in duty ratio DT1.

Similarly, for DC power supply B2 as well, control pulse signals SD2 and /SD2 are generated through PWM control based on voltage comparison between duty ratio DT2 and carrier wave CW2. Similarly to control pulse signals SD1 and /SD1, during a period in which a condition of DT2>CW2 is satisfied, control pulse signal SD2 is set to the H level, and during a period in which a condition of CW2>DT2 is satisfied, control pulse signal SD2 is set to the L level. During the H level period of control pulse signal SD2, on of the lower arm of DC power supply B2 is indicated, and hence output from DC power supply B2 increases with increase in duty ratio DT2.

Control signals SG1 to SG5 are generated in response to control pulse signals SD1, /SD1, SD2, and /SD2 obtained through PWM control, in accordance with the Boolean expressions shown in FIG. 12. Here, in accordance with the Boolean expressions shown in FIG. 12, a switching pattern of switching elements S1 to S5 is limited to four shown in FIG. 15, depending on combination between the H/L level of control pulse signal SD1 and the H/L level of control pulse signal SD2.

Figures 15, 16:
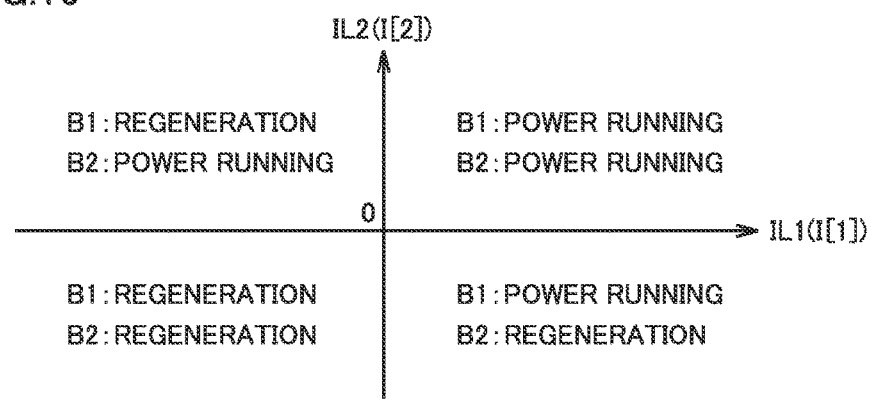
FIG. 15 is a chart showing a list of switching patterns in the parallel boost mode.
FIG. 16 is a conceptual diagram illustrating combination of orientations of reactor currents in the power converter according to the first embodiment.

FIG. 15 is a chart showing a list of on/off patterns (switching patterns) of switching elements S1 to S5 in the parallel boost mode.

Referring to FIG. 14, during a period from time t0 to t1, a condition of SD1=SD2=H is satisfied. Here, as shown in FIG. 15, a condition of control signal SG1=SG3=SG5b=L is satisfied, while a condition of SG2=SG4=SG5a=H is satisfied. Therefore, switching element S5b is turned off and the first arm is formed. Switching elements S1 and S3 are turned off while switching elements S2 and S4 are turned on.

Here, as is understood from FIG. 11, turn-on of the lower arm (the B1L arm and the B2L arm) is indicated to each of DC power supplies B1 and B2. Therefore, during the period from time t0 to t1, both of reactor currents IL1 and IL2 increase. As is clear from the circuit configuration in FIG. 1, reactor current IL1 corresponds to current I[1] from DC power supply B1, and reactor current IL2 corresponds to current I[2] from DC power supply B2.

Referring again to FIG. 14, since control pulse signal SD2 makes transition from the H level to the L level at time t1, during a period from time t1 to t2, a condition of SD1=H and SD2=L is satisfied. Here, as shown in FIG. 15, a condition of control signal SG2=SG3=SG5a=SG5b=H is satisfied, while a condition of SG1=SG4=L is satisfied. Therefore, under such a condition that switching elements S5a and S5b are turned on and the second arm is formed, switching elements S2 and S3 are turned on while switching elements S1 and S4 are turned off.

Here, as is understood from FIG. 11, on of the lower arm (the B1L arm) is indicated to DC power supply B1, while on of the upper arm (the B2U arm) is indicated to DC power supply B2. Therefore, during the period from time t1 to t2, reactor current IL1 increases while reactor current IL2 lowers. Consequently, at time t1, reactor current IL2 stops to increase and starts to lower and hence it has the relative maximum point.

Referring again to FIG. 14, since control pulse signal SD1 makes transition from the H level to the L level at time t2, during a period from time t2 to t3, a condition of SD1=SD2=L is satisfied. Here, as shown in FIG. 15, a condition of control signal SG2=SG4=SG5a=L is satisfied, while a condition of SG1=SG3=SG5b=H is satisfied. Therefore, under such a condition that switching element S5a is turned off and the boost chopper circuit where the first arm is used is formed, switching elements S1 and S3 are turned on and switching elements S2 and S4 are turned off.

Here, as is understood from FIG. 11, on of the upper arm (the B1U arm and the B2U arm) is indicated to each of DC power supplies B1 and B2. Therefore, during the period from time t2 to t3, both of reactor currents IL1 and IL2 lower. Consequently, at time t2, reactor current IL1 stops to increase and starts to lower and hence it has the relative maximum point.

Referring again to FIG. 14, since control pulse signal SD1 makes transition from the L level to the H level at time t3, during a period from time t3 to t4, a condition of SD1=H and SD2=L is satisfied. Therefore, as a switching pattern during the period from time t0 to t1 is reproduced, under such a condition that the first arm is used, switching elements S1 to S5 are controlled such that reactor current IL1 increases while reactor current IL2 lowers. Consequently, at time t3, reactor current IL1 stops to lower and starts to increase and hence it has the relative minimum point.

In order to thus control outputs from DC power supplies B1 and B2 in accordance with duty ratios DT1 and DT2, in each control cycle corresponding to one cycle of carrier waves CW1 and CW2, two inflection points (a relative maximum point and a relative minimum point) are provided in each of reactor currents IL1 and IL2.

In the operation example in FIG. 14, since a condition of DT1>DT2 is satisfied, in contrast to the period from time t0 to t1, there is no period during which a condition of SD1=L and SD2=H is satisfied. During that period, however, as shown in FIG. 15, a condition of control signal SG1=SG4=SG5a=SG5b=H is satisfied, while a condition of SG2=SG3=L is satisfied. Therefore, under such a condition that switching elements SG5a and SG5b are turned on and the boost chopper circuit where the second arm is used is formed, switching elements S1 and S4 are turned on while switching elements S2 and S3 are turned off.

Here, as is understood from FIG. 11, on of the lower arm (the B2L arm) is indicated to DC power supply B2, while on of the upper arm (the B1U arm) is indicated to DC power supply B1. Therefore, it is understood that, during that period, switching elements S1 to S5a and S5b are controlled such that reactor current IL2 increases while reactor current IL1 lowers.

At time t4 or later in FIG. 14 as well, switching elements S1 to S5 can similarly be controlled in accordance with the switching pattern shown in FIG. 15 through PWM control in accordance with duty ratios DT1 and DT2.

Thus, according to power converter 10 in the first embodiment, in the parallel boost mode, on and off of switching elements S1 to S5a and S5b is controlled in accordance with the Boolean expressions shown in FIG. 12. Thus, DC power supplies B1 and B2 can carry out DC/DC conversion in parallel for power lines PL and GL, while switching between a period during which the boost chopper circuit using the first arm is formed and a period during which the boost chopper circuit using the second arm is formed is automatically made.

In particular, power converter 10 can be controlled such that one of DC power supplies B1 and B2 is subjected to voltage control (VH→VH*) and the other of DC power supplies B1 and B2 is subjected to current control (I[1] or I[2]→Io*) through control of output from DC power supplies B1 and B2 based on duty ratios DT1 and DT2. Thus, in the parallel boost mode, input/output power of the DC power supply subjected to voltage control can also indirectly be controlled by controlling input/output power of the DC power supply subjected to current control relative to input/output power PL (load power PL) of power converter 10 as a whole for load 30.

Control of outputs from DC power supplies B1 and B2 is not limited as exemplified in FIG. 13, and duty ratios DT1 and DT2 can be calculated in any manner so long as a function to control output voltage VH to voltage command value VH* is achieved.

By way of example of a variation, outputs from DC power supplies B1 and B2 can also be subjected to power control (current control) based on calculation of necessary power Pr input to and output from power converter 10 for control of output voltage VH to voltage command value VH*. Specifically, power outputs from DC power supplies B1 and B2 can be controlled in accordance with power command values P1* and P2* which represent allocation of necessary power Pr to DC power supplies B1 and B2 (Pr=P1*+P2*). In the parallel boost mode, allocation of power command values P1* and P2* can freely be set. In this case, duty ratios DT1 and DT2 can be calculated through feedback control of currents I[1] and I[2] with current command values I1* (I1*=P1*/V[1]) and I2* (I2*=P2*/V[2]) calculated from power command values P1* and P2* being defined as the reference value.

(Power Loss in Power Converter in Parallel Boost Mode)

An effect of reduction in power loss in the parallel boost mode of power converter 10 according to the first embodiment will now be described in detail.

Power converter 10 carries out DC/DC conversion with the circuit configuration (PTD 1) in which two boost chopper circuits are connected in parallel as shown in FIG. 5 while the first arm set by turn-off of switching element S5 is applied.

On the other hand, in the parallel connection mode of the power converter shown in PTD 2, currents resulting from DC/DC conversion for two DC power supplies flow as being superimposed on each other through some switching elements and hence increase in conduction loss is a concern. Namely, in the parallel connection mode of the power converter, there is a concern that a power loss in the switching element is greater than in the circuit configuration in PTD 2 and application of the first arm of power converter 10 in PTD 1.

In contrast, in power converter 10 according to the first embodiment, as will be described below, a conduction loss in the switching element can be reduced by providing a period during which the second arm is formed described above.

Referring again to FIG. 15, during a period in which the boost chopper circuit where the second arm is used is formed in power converter 10, there are only two patterns of a first pattern in which switching elements S2, S3, and S5 (S5a and S5b) are turned on (S1 and S4 are turned off) and a second pattern in which switching elements S1, S4, and S5 (S5a and S5b) are turned on (S2 and S3 are turned off). In the first pattern, the B1L arm and the B2U arm are turned on, whereas in the second pattern, the B1U arm and the B2L arm are turned on.

As is understood from FIG. 8, in the first pattern (S2, S3, S5a, and S5b being turned on), switching elements S2 and S3 are electrically connected in parallel between node N2 and power line GL, as being configured as the lower arm of DC power supply B1. Simultaneously, switching elements S2 and S3 are electrically connected in parallel between node N2 and power line GL as the upper arm of DC power supply B2.

In the second pattern (S1, S4, S5a, and S5b being turned on), switching elements S1 and S4 are electrically connected in parallel between node N2 and power line PL, as being configured as the lower arm of DC power supply B2. Simultaneously, switching elements S1 and S4 are electrically connected in parallel between node N1 and power line PL as the upper arm of DC power supply B1.

When the second arm is formed, a power loss in the switching element is suppressed owing to a branching effect resulting from connection in parallel of a plurality of switching elements as the upper arm or the lower arm of DC power supplies B1 and B2 and an effect of cancellation between reactor currents IL1 and IL2. The current cancellation effect is different in behavior depending on an orientation (positive/negative) of reactor currents IL1 and IL2.

FIG. 16 shows a conceptual diagram illustrating a combination of directions of reactor currents IL1 and IL2 in power converter 10.

Referring to FIG. 16, based on combination of positive/negative of reactor currents IL1 and IL2, an operation region of power converter 10 is divided into a region where both of DC power supplies B1 and B2 perform a power running operation (IL1>0, IL2>0), a region where DC power supply B1 performs a regeneration operation while DC power supply B2 performs a power running operation (IL1<0, IL2>0), a region where both of DC power supplies B1 and B2 perform a regeneration operation (IL1<0, IL2<0), and a region where DC power supply B1 performs a power running operation while DC power supply B2 performs a regeneration operation (IL1>0, IL2<0).

A behavior of a current when the second arm is formed will now be described with reference to FIG. 17. FIG. 17 (a) shows a behavior of a current in the first pattern (the B1L arm and the B2U arm being turned on). FIG. 17 (b) shows a behavior of a current in the second pattern (the B1U arm and the B2L arm being turned on).

FIG. 17 (a) shows a behavior of a current in an example where the condition of IL1>0 and IL2>0 is satisfied and both of DC power supplies B1 and B2 perform a power running operation. In the first pattern, switching elements S2, S3, and S5 (S5a and S5b) in the on state are connected in a form of a loop between nodes N1 and N2 and power line GL. Since diodes are connected bidirectionally in parallel in each of switching elements S2, S4, and S5 in this state, paths for reactor currents IL1 and IL2 are varied in accordance with relation in potential between nodes N1 and N2. Reactor current IL2 may form a current path 118d which goes through switching element S2 and switching element S5a as a result of branching, in addition to current path 118. Similarly, reactor current IL1 may form a current path 115d which goes through switching element S2 as a result of branching, in addition to current path 115.

A forward voltage substantially the same in magnitude is generated in each conducting diode through which a current flows. Therefore, such a state that a current flows through all of switching elements S2, S3, and S5 connected in a form of a loop (a conducting state) does not take place, because, if three substantially comparable voltages form a closed path in a loop, the Kirchhoff's voltage law does not hold whichever orientation each voltage may be in. Therefore, any of switching elements S2, S3, and S5 is naturally rendered non-conducting and a current does not pass therethrough.

As shown in FIG. 17 (a), when the condition of IL1>0 and IL2>0 is satisfied, IL1 flows into node N1 whereas IL2 flows in from node N2. In connection with this direction of the current, when a condition of IL2>IL1 is satisfied, switching element S2 is rendered non-conducting (current=0) and switching elements S3 and S5 are rendered conducting.

Initially, when S2 and S3 are conducting (S5 is not conducting), such a state is inconsistent with the Kirchhoff's voltage law and hence such a circuit state does not take place. Specifically, when S2 and S3 are conducting (S5 is not conducting), a total amount of IL1 passes through S2 via current path 115d and a total amount of IL2 passes through S3 via current path 118. In this direction of the current, however, the sum of forward voltage drops caused in switching elements S2 and S3 is applied to switching element S5, and hence switching element S5 cannot be rendered non-conducting.

Similarly, when S2 and S5 are conducting (S3 is not conducting) as well, such a circuit state is inconsistent with the Kirchhoff's voltage law and hence such a circuit state does not take place. Specifically, when S2 and S5 are conducting (S3 is not conducting), a total amount of IL2 passes through S2 via current path 118d and IL1 is branched to current paths 115 and 115d. Consequently, IL2 passes through S5 and a differential current (IL1−IL2) passes through S2. When the condition of IL2>IL1 is satisfied, however, the sum of forward voltage drop in S2 and forward voltage drop in S5 is applied to switching element S3 and switching element S3 cannot be rendered non-conducting.

In contrast, when S3 and S5 are conducting (S2 is not conducting), a total amount of IL1 passes through S5 via current path 115 and IL2 is branched to current paths 118 and 118d. Consequently, IL1 passes through S5 and a differential current (IL1−IL2) passes through S3. When the condition of IL2>IL1 is satisfied, a difference between forward voltage drop in S5 and forward voltage drop in S3 is applied to switching element S2 and hence switching element S2 is rendered non-conducting.

Therefore, when the condition of IL2>IL1 is satisfied in FIG. 17 (a), a current through switching element S2 is 0 whereas a differential current (IL1−IL2) passes through switching element S3 and IL1 passes through switching element S5a.

When a condition of IL1>IL2 is satisfied in FIG. 17 (a), a direction of the differential current (IL1−IL2) is reverse, and hence switching element S3 is rendered non-conducting (current=0) and switching elements S2 and S5 are rendered conducting. A current through switching element S3 is 0, whereas a differential current (IL2−IL1) passes through switching element S2 and IL2 passes through switching element S5a.

FIG. 17 (b) shows a behavior of a current when the condition of IL1>0 and IL2>0 is satisfied in which both of DC power supplies B1 and B2 perform the power running operation in the second pattern (the B1U arm and the B2L arm being turned on).

In the second pattern, switching elements S1, S4, and S5 (S5a and S5b) in the on state are connected in the form of the loop between nodes N1 and N2 and power line PL. In this state, each of switching elements S1, S4, and S5 is in such a state that diodes are bidirectionally connected in parallel. Therefore, the paths for reactor currents IL1 and IL2 are varied in accordance with relation in potential between nodes N1 and N2. Reactor current IL2 may form a current path 116d which goes through switching elements S1 and S5a as a result of branching, in addition to current path 116. Similarly, reactor current IL1 may form a current path 117d which goes through switching element S1 (diode D1) as a result of branching, in addition to current path 117.

When the condition of IL2>IL1 is satisfied in FIG. 17 (b), based on the discussion as presented with reference to FIG. 17 (a), switching element S1 is rendered non-conducting (current=0) and switching elements S4 and S5 are rendered conducting. A current through switching element S1 is 0, whereas a differential current (IL2−IL1) passes through switching element S4 and IL1 passes through switching element S5a.

Similarly, when the condition of IL1>IL2 is satisfied in FIG. 17 (b), a direction of the differential current (IL1−IL2) is reverse, and hence switching element S4 is rendered non-conducting (current=0) and switching elements S1 and S5 are rendered conducting. A current through switching element S4 is 0, whereas a differential current (IL1−IL2) passes through switching element S3 and IL2 passes through switching element S5a.

Thus, when both of DC power supplies B1 and B2 perform the power running operation while the second arm is formed in the parallel boost mode of power converter 10, three switching elements are turned on and currents therethrough are set to 0, IL1 or IL2, and a differential current ΔI (IL1−IL2), respectively. When IL1 and IL2 are identical in sign, a condition of |IL1−IL2|<IL1 and |IL1−IL2|<IL2 is satisfied. Therefore, while the second arm is formed, a power loss (a conduction loss and a switching loss) in switching elements S1 to S5 (S5a and S5b) can be less than in the example of formation of the first arm in which IL1 and IL2 pass through respective switching elements.

When both of DC power supplies B1 and B2 perform the regeneration operation, current directions of IL1 and IL2 are each opposite, and hence the current paths in the first pattern and the second pattern are opposite to the current directions in FIGS. 17 (a) and (b). Since the condition of |IL1−IL2|<|IL1| and |IL1−IL2|<|IL2| is satisfied again, a power loss in switching elements S1 to S5 (S5a and S5b) while the second arm is formed is the same as in the example in which both of DC power supplies B1 and B2 perform the power running operation.

Therefore, in power converter 10, when both of DC power supplies B1 and B2 perform the power running operation or the regeneration operation, owing to an effect that a current through a switching element is set to the differential current |IL1−IL2| while the second arm is formed, a power loss in switching elements S1 to S5 (S5a and S5b) can be lessened.

When DC power supply B1 performs the power running operation (IL1>0) whereas DC power supply B2 performs the regeneration operation (IL2<0) in the circuit state (the first pattern) in FIG. 17 (a), currents flow in from both of nodes N1 and N2 into switching elements S2, S3, and S5 in the on state. Here, switching element S5 is rendered non-conducting, and IL1 totally passes through switching element S2 and IL2 passes through switching element S3. This is because such a circuit state that switching element S2 or S3 is rendered non-conducting in a loop path formed by switching elements S2, S3, and S5 is inconsistent with the Kirchhoff's voltage law in consideration of the direction of forward voltage drop.

Similarly, when the condition of IL1>0 and IL2<0 is satisfied as above in the circuit state (the second pattern) in FIG. 17 (b), currents flow in from both of nodes N1 and N2 into switching elements S1, S4, and S5 in the on state. Here again, switching element S5 is rendered non-conducting, and IL1 totally passes through switching element S1 and IL2 passes through switching element S4. This is because such a circuit state that switching element S1 or S4 is rendered non-conducting in the loop path formed by switching elements S1, S4, and S5 is inconsistent with the Kirchhoff's voltage law in consideration of the direction of forward voltage drop.

It is understood that the current cancellation effect producing a differential current is not obtained in such a case and therefore a power loss in switching elements S1 to S5 (S5a and S5b) is comparable to that in formation of the first arm in which switching element S5 is turned off, that is, the circuit configuration in PTD 1.

When DC power supply B1 performs the regeneration operation (IL1<0) whereas DC power supply B2 performs the power running operation (IL2>0), current paths in the first pattern and the second pattern are opposite in current direction to the case of IL1>0 and IL2<0 described above. In this case as well, a power loss in switching elements S1 to S5 (S5a and S5b) is comparable to that in formation of the first arm, that is, the circuit configuration in PTD 1.

A power loss in switching elements in the parallel boost mode of power converter 10 described above is summarized. When any one of DC power supplies B1 and B2 performs the power running operation and the other performs the regeneration operation while the first arm is formed and while the second arm is formed (IL1>0 and IL2<0 or IL1<0 and IL2>0), a power loss in switching elements is comparable to that in PTD 1 in which two boost chopper circuits operate in parallel.

When DC power supplies B1 and B2 are identical in power running/regeneration operation while the second arm is formed (IL1>0 and IL2>0 or IL1<0 and IL2<0), a power loss in switching elements S1 to S5a and S5b is less than in formation of the first arm and PTD 1, owing to the current cancellation effect producing a differential current.

Therefore, even when DC power supplies B1 and B2 are different in operation between power running and regeneration throughout a period during which the second arm is formed, a conduction loss in switching elements is comparable to a conduction loss in the boost chopper circuit where the first arm is used (that is, a conduction loss in the power converter in PTD 1). If there is at least a period during which both of DC power supplies B1 and B2 perform the power running operation or the regeneration operation, a conduction loss in switching elements is less than in formation of the first arm.

By providing a period during which the second arm is formed (the on period of switching element S5), a power loss in switching elements S1 to S5a and S5b (a conduction loss and a switching loss) can be less than a power loss in the boost chopper circuit where the first arm is used.

(Current Phase Control)

In the power supply system according to the first embodiment, a loss in power converter 10 is further reduced by control of phases of reactor currents IL1 and IL2 (hereinafter also referred to as "current phase control") based on adjustment of a phase difference between carrier waves used for control of outputs from DC power supplies B1 and B2.

Figure 18:
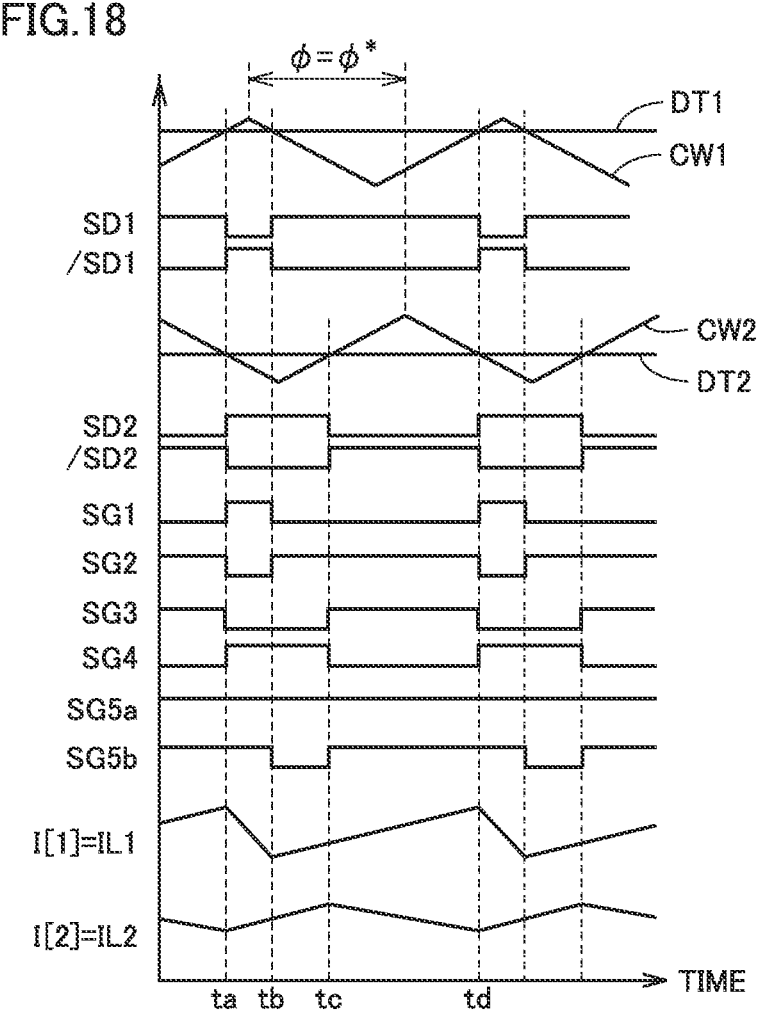
FIG. 18 is a waveform diagram for illustrating an operation in PWM control to which current phase control is applied.

FIG. 18 is a waveform diagram for illustrating application of a current phase to power converter 10 according to the first embodiment.

Referring to FIG. 18, in application of current phase control, carrier wave generation portion 240 (FIG. 13) provides a phase difference φ between carrier wave CW1 used for PWM control of DC power supply B1 and carrier wave CW2 used for PWM control of DC power supply B2.

In contrast, in the operation waveform exemplified in FIG. 14, carrier waves CW1 and CW2 are identical in frequency and phase. In other words, in FIG. 14, a condition of φ=0 is set.

With phase difference φ, control pulse signals SD1 and /SD1 are generated in PWM control based on voltage comparison between carrier wave CW1 and duty ratio DT1. Similarly, control pulse signals SD2 and /SD2 are generated in PWM control based on voltage comparison between carrier wave CW2 and duty ratio DT2.

In FIG. 18, duty ratios DT1 and DT2 are identical in value to those in FIG. 14. Therefore, control pulse signal SD1 in FIG. 18 is identical in duration of the H level period to control pulse signal SD1 in FIG. 14, although it is different in phase. Similarly, control pulse signal SD2 in FIG. 18 is identical in duration of the H level period to control pulse signal SD2 in FIG. 14, although it is different in phase.

By providing a phase difference between carrier waves CW1 and CW2, control signals SG1 to SG5a and SG5b in FIG. 18 are different in waveform from control signals SG1 to SG5a and SG5b in FIG. 14. It is understood based on comparison between FIGS. 14 and 18 that phase relation (current phase) between reactor currents IL1 and IL2 is also changed with change in phase difference φ between carrier waves CW1 and CW2.

It is understood on the other hand that an average value of currents IL1 and IL2 for the same duty ratios DT1 and DT2 is equivalent between FIGS. 14 and 18. Outputs from DC power supplies B1 and B2 are controlled based on duty ratios DT1 and DT2 and are not affected by change in phase difference φ between carrier waves CW1 and CW2.

Therefore, in current phase control, a conduction loss in switching elements in the parallel connection mode of power converter 10 is lessened by carrier phase control for appropriately adjusting phase difference φ between carrier waves CW1 and CW2.

Specifically, phase difference φ is adjusted such that inflection points in reactor currents IL1 and IL2 appear at the same timing. In the example in FIG. 18, a condition of phase difference φ=φ* can be set such that the timing of transition of control pulse signal SD1 from the H level to the L level and the timing of transition of control pulse signal SD2 from the L level to the H level are the same (time ta). Since reactor current IL1 thus stops to increase and starts to lower at time ta, it has a relative maximum point. In contrast, since reactor current IL2 stops to lower and starts to increase, it has a relative minimum point.

With such a current phase, as is understood from comparison between FIGS. 14 and 18, the number of times of turn-on and -off (a total value) of switching elements S5a and S5b for each control cycle (corresponding to one cycle of carrier waves CW1 and CW2) can be reduced. Furthermore, a longer period during which control pulse signals SD1 and SD2 are different from each other in logic level, that is, a period during which the second arm is used, can be ensured. Phase difference φ* which brings about such phase relation is hereinafter also referred to as an optimal phase difference φ*.

As described above, in the parallel boost mode of power converter 10, a power loss (a conduction loss and a switching loss) in switching elements is less during application of the second arm than during application of the first arm. As is understood from the gate Boolean expressions shown in FIG. 12, the period during which the second arm can be used is limited to the period during which control pulse signals SD1 and SD2 are different from each other in logic level. Therefore, under such a condition that a duration of the H level period of control pulse signals SD1 and SD2 is defined by duty ratios DT1 and DT2, by adjusting a pulse phase such that the period during which the control pulse signals are different from each other in logic level is longer, the period during which the second arm is used can be longer in the parallel boost mode of power converter 10. A conduction loss in the parallel boost mode of power converter 10 can thus further be lessened.

In contrast to the example in FIG. 18, when phase difference φ is set such that the timing of transition of control pulse signal SD1 from the L level to the H level (time tb) and timing of transition of control pulse signal SD2 from the H level to the L level (time tc) are the same as well, as in FIG. 18, the number of times of turn-on and -off (a total value) of switching elements S5a and S5b can be reduced and a longer period during which the second arm is applied can be ensured. Phase difference φ at this time can also be defined as optimal phase difference φ*.

By setting phase difference φ=φ* such that control pulse signals SD1 and SD2 are the same in timing of transition of the logic level and the period during which the second arm is used is maximized as described above, the inflection points of reactor currents IL1 and IL2 appear at the same timing.

As is understood from FIGS. 14 and 18, waveforms of control pulse signals SD1 and SD2 are determined by duty ratios DT1 and DT2. Therefore, it is understood that optimal phase difference φ* with which relation between control pulse signals SD1 and SD2 and current phases of IL1 and IL2 as in FIG. 18 can be realized is also varied in accordance with duty ratios DT1 and DT2.

Therefore, relation between duty ratios DT1 and DT2 and optimal phase difference φ* is found in advance and correspondence can be stored in advance as a map (hereinafter also referred to as a "phase difference map") or a function expression (hereinafter also referred to as a "phase difference calculation expression") in control device 100.

Therefore, when the parallel boost mode of power converter 10 is selected, carrier wave generation portion 240 (FIG. 13) can set optimal phase difference φ* by referring to the phase difference map or the phase difference calculation expression based on duty ratios DT1 and DT2 calculated by controllers 210 and 220 (FIG. 13). Furthermore, carrier wave generation portion 240 generates carrier waves CW1 and CW2 identical in frequency in order to provide set optimal phase difference φ* therebetween.

Figures 30, 31:
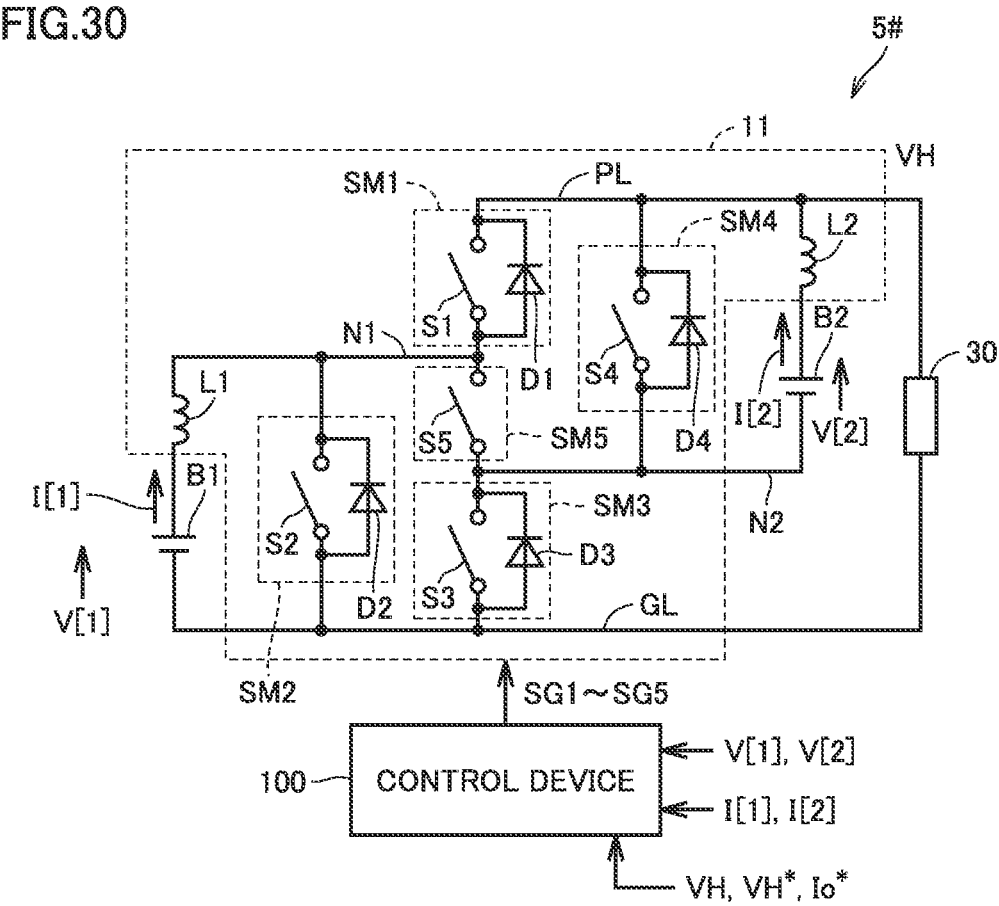
FIG. 30 is a circuit diagram for illustrating a configuration of a power converter according to a third embodiment.
FIG. 31 is a chart showing a list of gate Boolean expressions for controlling on and off of each switching element in the parallel boost mode of the power converter according to the third embodiment.

PWM control unit 230 (FIG. 13) generates control pulse signals SD1 and SD2 in such phase relation that the period during which control pulse signals SD1 and SD2 are different from each other in logic level (H/L level) is maximized as shown in FIG. 31. Control signals SG1 to SG4, SG5*a*, and SG5*b* are generated in accordance with the Boolean expressions shown in FIG. 12.

Consequently, in power converter 10, as a result of application of current phase control, DC/DC conversion can further be efficient owing to reduction in switching loss by switching elements S5*a* and S5*b* and reduction in loss in switching elements based on extension of the period during which the second arm is applied.

(Switching Control According to Present Embodiment)

As described so far, in power converter 10, PWM control in accordance with duty ratios DT1 and DT2 is carried out. Thus, outputs from DC power supplies B1 and B2 are controlled by providing inflection points (a relative maximum point and a relative minimum point) in reactor currents IL1 and IL2 in each control cycle (one cycle of carrier waves CW1 and CW2). As a differential current flows through a specific switching element as a result of current phase control, a total value of power losses in switching elements S1 to S5*a* and S5*b* can be reduced.

Though reduction in power loss in a specific switching element contributes to improvement in efficiency in the power converter as a whole, it is less effective for lessening of unevenness in amount of heat generation among elements. It is a concern that a greater difference in power loss among switching elements may lead to a relatively greater amount of heat generation in at least one of the switching elements. Consequently, since a greater number of chips connected in parallel are required in such a switching element than in other switching elements, an effect of reduction in manufacturing cost in mass production may be lowered.

Therefore, in the power supply system according to the present first embodiment, switching control in DC/DC conversion for decreasing a difference in power loss among switching elements is carried out.

Figure 19:
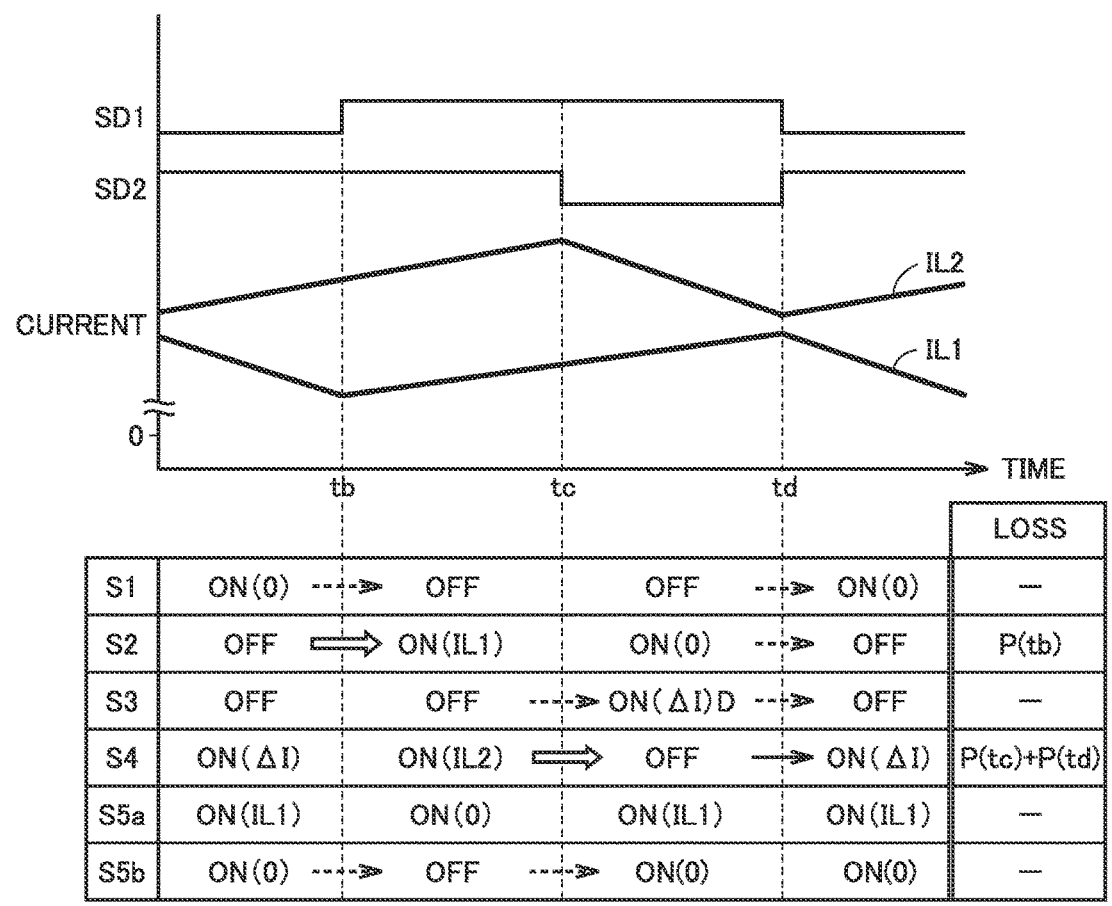
FIG. 19 is a waveform diagram (in power running) for illustrating a power loss in each switching element when current phase control is applied.

FIG. 19 is a waveform diagram for illustrating a power loss in each switching element when current phase control is applied, which is shown as a comparative example. FIG. 19 shows a waveform diagram in an example in which both of DC power supplies B1 and B2 perform the power running operation (IL1>0 and IL2>0). FIG. 19 shows a current waveform when the condition of |IL2|>|IL1| is satisfied. A reactor current smaller in absolute value is also referred to as a "low current" and a reactor current greater in absolute value is also referred to as a "high current" below.

Referring to FIG. 19, since a condition of SD1=L and SD2=H is satisfied for a period until time tb, the second arm is applied. Reactor current IL1 lowers due to turn-on of the B1U arm whereas reactor current IL2 increases due to turn-on of the B2L arm.

As shown in FIG. 17 (*b*), switching elements S1, S4, S5*a*, and S5*b* are turned on. Since the condition of IL2>IL1 is satisfied, the current through switching element S1 is 0 and differential current ΔI (IL2−IL1) flows through switching element S4. Current IL1 flows through switching element S5*a*, whereas the current through switching element S5*b* is 0.

Therefore, a power loss (a conduction loss) is produced only in switching elements S4 and S5*a*. A conduction loss in accordance with ΔI=(IL2−IL1) is produced in switching element S4, whereas a conduction loss in accordance with IL1 is produced in switching element S5*a*. Therefore, it is understood that only a conduction loss in accordance with IL2 is produced in total in switching elements S4 and S5*a*. Since IL1 and IL2 pass through separate switching elements in the circuit configuration in PTD 1, a conduction loss in accordance with (IL1+IL2) is produced.

As in FIG. 18, at time tb, control pulse signal SD1 in accordance with duty ratio DT1 makes transition from the L level to the H level. In response, reactor current IL1 attains to the relative minimum point.

At time tb, the B1U arm is turned off and the B1L arm is turned on. Therefore, switching element S2 is turned on and switching elements S1 and S5*b* are turned off. Consequently, switching elements S2, S4, and S5*a* are turned on.

In switching element S2, a switching loss (turn-on) due to hard switching of IL1 is produced. In the hereafter including FIG. 19, turn-on or turn-off due to hard switching is denoted with a "bold arrow (hollow)." Since a condition of a current=0 is satisfied in the on state of switching elements S1 and S5*b*, a switching loss due to turn-on is not produced therein. In the hereafter including FIG. 19, turn-on and turn-off without a switching loss is denoted with a "dotted arrow." Since reactor current IL2 flows through switching element S4 maintained in the on state, a switching loss due to IL2 is not produced.

During a period from time tb to tc, since a condition of SD1=SD2=H is satisfied, the first arm is applied and reactor currents IL1 and IL2 both increase (the B1L arm and the B2L arm being turned on). Therefore, reactor current IL1 flows through switching element S2 and reactor current IL2 flows through switching element S4 as shown in FIG. 6. Therefore, in power converter 10 as a whole, a conduction loss comparable to that in the circuit configuration in PTD 1 is produced. A current through switching element S5*a* is 0.

When control pulse signal SD2 makes transition from the H level to the L level at time tc, reactor current IL2 attains to the relative maximum point. At time tc, the B2L arm is turned off and the B2U arm is turned on. Therefore, switching element S4 is turned off and switching elements S3 and S5*b* are turned on. Consequently, as shown in FIG. 17 (*a*), switching elements S2, S3, S5*a*, and S5*b* are turned on.

At time tc, a power loss (turn-off) due to hard switching of current IL2 is produced in switching element S4. Since the condition of IL2>IL1 is satisfied, reactor current IL1 flows through switching element S5*a* maintained in the on state, and no current flows through switching element S5*b* which has been turned on. Consequently, no switching loss is produced in switching element S5*b*.

It is understood that since the condition of IL2>IL1 is satisfied, differential current ΔI flows through diode D3 not switching element S3, as shown in FIG. 17 (*a*). Therefore, no switching loss is produced when switching element S3 is turned on.

During a period from time tc to td, the second arm is applied and reactor current IL1 increases whereas reactor current IL2 lowers (the B1L arm and the B2U arm being turned on). Therefore, as shown in FIG. 17 (*a*), reactor current IL1 flows through switching element S5*a* and differential current ΔI (ΔI=IL2−IL1) flows through diode D3. Therefore, in power converter 10 as a whole, only a conduction loss in accordance with the sum of IL1 and ΔI, that is, IL2, is produced. In the hereafter including FIG. 19, a current which flows through a diode is denoted with a suffix "D".

At time td, control pulse signal SD1 makes transition from the H level to the L level and control pulse signal SD2 makes transition from the L level to the H level as a result of current phase control. Thus, reactor current IL1 attains to the relative maximum point and reactor current IL2 attains to the relative minimum point at the same timing.

After time td, similarly to before time tb, the second arm is applied and the B1U arm and the B2L arm are turned on. Consequently, as shown in FIG. 17 (b), switching elements S1, S4, S5a, and S5b are turned on.

At time td, switching elements S1 and S4 are turned on and switching elements S2 and S3 are turned off. A switching loss (turn-on) in accordance with differential current ΔI is produced in switching element S4. This switching loss is smaller than a loss due to hard switching of IL1 or IL2. Since the condition of IL2>IL1 is satisfied, no current flows through switching element S1 and hence no switching loss is produced in switching element S1. Similarly, since a current through switching element S2 is 0 during the period from time tc to td, no switching loss is produced when switching element S2 is turned on. Since diode D3 is turned off owing to natural arc extinguishing, no turn-off loss is produced in switching element S3.

As is understood from FIG. 19, only switching in accordance with differential current ΔI is made without hard switching of IL1 and IL2 at time td at which inflection points (the relative maximum point and the relative minimum point) of reactor currents IL1 and IL2 appear at the same timing owing to current phase control. Consequently, owing to the effect of current phase control, a total value of switching losses (on and off losses) in the switching elements can be reduced. Furthermore, during the period in which the second arm is applied (a period except for the period from time tb to tc) as described above, a conduction loss can be reduced by generation of differential current ΔI.

In the circuit state (IL1>0 and IL2>0) exemplified in FIG. 19, a switching loss is produced only in switching elements S2 and S4. In particular in switching element S4, hard switching is made at the relative maximum point (time tc) of IL2 representing the high current, and hence a switching loss (P(tc)) is greater. In switching element S4, also at time td, a switching loss P(td) in accordance with differential current ΔI is produced. In switching element S2, on the other hand, only a switching loss P(tb) due to hard switching at the relative minimum point (time tb) of IL1 representing the low current is produced. Therefore, when the circuit operation in FIG. 19 continues for a long period of time, increase in difference in amount of heat generation between switching elements S2 and S4 due to a difference in switching loss therebetween is a concern.

Figure 20:
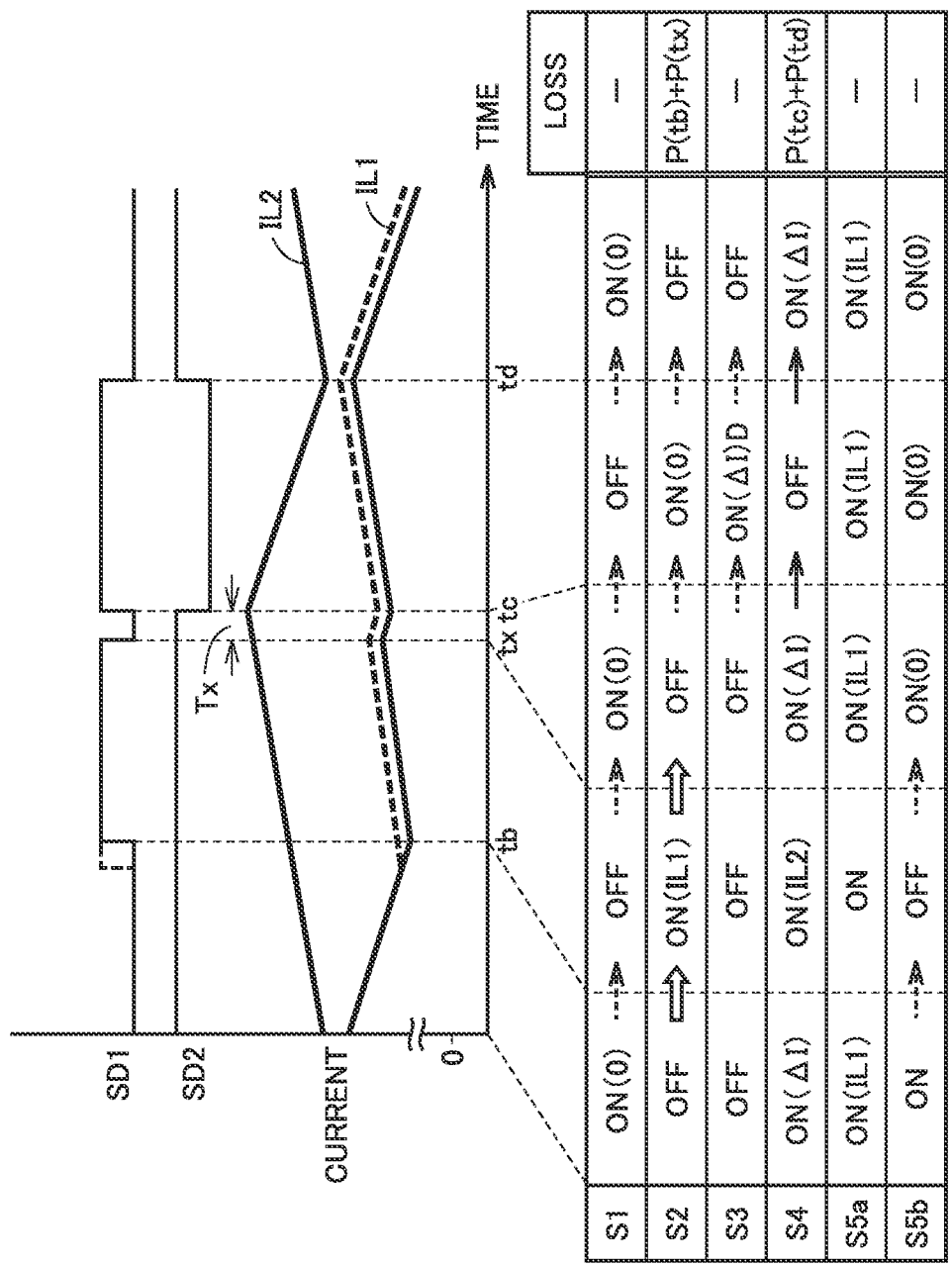
FIG. 20 is a waveform diagram (in power running) for illustrating a power loss in each switching element when switching control according to the present embodiment is applied.

FIG. 20 is a waveform diagram for illustrating a power loss in each switching element when switching control according to the present embodiment is applied. FIG. 20 shows a waveform diagram when switching control according to the first embodiment is applied to the circuit state the same as in FIG. 19. In FIG. 20, the condition of IL1>0 and IL2>0 and |IL1|>|IL2| is again satisfied.

Based on comparison of FIG. 20 with FIG. 19, in switching control according to the present embodiment, an inflection point is added at times tx and tc to IL1 representing the low current. Therefore, in control pulse signal SD1, during a period from time tb to td in which it is maintained at the H level in FIG. 19, the L level period (an inverted period) is provided for a period from time tx to tc. A duration Tx of the inverted period is variable. The inverted period is provided in order to add an inflection point for adjusting a switching loss to inflection points resulting from duty control. Therefore, duration Tx of the inverted period is preferably as short as possible in order to lessen influence on output control, so long as the inverted period has an interval with which a switching element can be turned on and off in a stable manner. For example, duration Tx of the inverted period (a period from time tc to tx) is preferably set to be shorter than a period from time tb to tx.

Referring to FIG. 20, since the circuit state before tb and at time tb is the same as in FIG. 19, detailed description will not be repeated. At time tb, a loss (turn-on) due to hard switching at the relative minimum point of the low current (reactor current IL1) is produced in switching element S2.

When control pulse signal SD1 makes transition from the H level to the L level at time tx, reactor current IL1 attains to the relative maximum point. The circuit state from time tx is the same as that before time tb. Therefore, during a period from time tx to tc, switching elements S1, S4, S5a, and S5b are turned on and switching elements S2 and S3 are turned off. Therefore, at time tx, switching element S2 is turned off and switching elements S1 and S5b are turned on.

Thus, in switching element S2, a loss (turn-off) due to hard switching of IL1 representing the low current is produced in switching element S2. During the period from time tx to tc, a current through switching elements S1 and S5b is 0. Therefore, no switching loss is produced in switching elements S1 and S5b. Since reactor current IL1 and differential current ΔI flow through switching elements S5a and S4 maintained in the on state, respectively, no switching loss due to these currents is produced either.

At time tc, in synchronization with transition of control pulse signal SD2 from the H level to the L level, control pulse signal SD1 returns to the H level. Thus, reactor current IL1 attains to the relative minimum point and reactor current IL2 attains to the relative maximum point.

Since the circuit state after time tc is the same as in FIG. 19, at time tc, switching elements S2 and S3 are turned on and switching elements S1 and S4 are turned off. A loss (turn-off) due to switching of differential current ΔI is produced in switching element S4. Since the condition of IL2>IL1 is satisfied, reactor current IL1 continues to flow through switching element S5a maintained in the on state and no switching loss is produced in switching element S5b. Since differential current ΔI flows through diode D3, no switching loss due to turn-on is produced in switching element S3. In switching elements S1 and S2 as well, currents before turn-off and after turn-on are both 0 and hence no switching loss is produced.

At time td, as in FIG. 19, a loss (turn-on) due to switching of differential current ΔI is produced in switching element S4.

Thus, IL2 representing the high current corresponding to the "first current" attains to the inflection points (the relative maximum point and the relative minimum point) owing to PWM control in accordance with duty ratio DT2 at times tc and td within one control cycle. For IL2, the relative minimum point at time td corresponds to the "first inflection point" and the relative maximum point at time tc corresponds to the "second inflection point."

IL1 representing the low current corresponding to the "second current" attains to the inflection points (the relative minimum point and the relative maximum point) owing to PWM control in accordance with duty ratio DT1 at times tb and td within one control cycle. For IL1, the relative maximum point at time td identical in timing to the relative minimum point of IL2 corresponds to the "first inflection point" and the relative minimum point at time tb corresponds to the "second inflection point." IL1 is additionally provided, at times tc and tx, with two inflection points (the relative minimum point and the relative maximum point) corresponding to the inverted period within the same control cycle. The inverted period is provided such that the added inflection point of IL1 (low current) is identical in timing to the second inflection point of the high current (IL2). In FIG. 20, the relative minimum point at time tc identical in timing to the relative maximum point of IL2 corresponds to the "third inflection point" and the relative maximum point at time tx corresponds to the "fourth inflection point."

As shown in FIG. 20, when both of DC power supplies B1 and B2 perform the power running operation, at each of times tc and td, any one and the other of the inflection point of IL1 and the inflection point of IL2 are any one and the other of the relative maximum point and the relative minimum point, respectively. Consequently, hard switching of IL2 is not made at the inflection point of the high current (IL2).

FIG. 21 shows a conceptual diagram for comparison of a switching loss between switching control (FIG. 20) with addition of an inflection point to current phase control and switching control (FIG. 19) without addition of an inflection point with only current phase control being carried out.

Referring to FIG. 21 (a), in switching control without addition of an inflection point shown in FIG. 19 (that is, without application of switching control according to the present embodiment), a switching loss Pl2 in switching element S2 consists of loss P(tb) at time tb. P(tb) represents a power loss due to hard switching at the relative minimum point of IL1 representing the low current.

A switching loss Pl4 in switching element S4 is the sum of loss P(tc) at time tc and loss P(td) at time td. P(tc) represents a power loss due to hard switching at the relative maximum point of IL2 representing the high current. P(td) represents a power loss due to switching of differential current ΔI between IL2 at the relative minimum point and IL1 at the relative maximum point. Therefore, P(tc) is greater than P(tb) and P(td). Consequently, in switching control in FIG. 19, a difference ΔP in switching loss between switching elements S2 and S4 is also relatively great under the influence by ΔP(tc).

Referring to FIG. 21 (b), in switching control with addition of an inflection point shown in FIG. 20, switching loss Pl2 in switching element S2 is the sum of loss P(tb) at time tb and a loss P(tx) at time tx. Since P(tb) represents a power loss due to hard switching at the relative minimum point of IL1 at time tb, P(tb) is equal between FIGS. 19 and 20. P(tx) represents a power loss due to hard switching at the relative minimum point of IL1 representing the low current at time tx.

Switching loss Pl4 in switching element S4 in FIG. 20 is the sum of loss P(tc) at time tc and loss P(td) at time td. P(tc) represents a power loss due to switching of a differential current between IL2 (the relative maximum point) and IL1 at time tc. Therefore, P(tc) in FIG. 20 is smaller than P(tc) in FIG. 19. Since P(td) represents a power loss due to switching of differential current ΔI between IL2 at the relative minimum point and IL1 at the relative maximum point, P(td) is equal between FIGS. 19 and 20.

Thus, in switching control in FIG. 20, Pl4 lowers with decrease in P(tc), whereas Pl2 increases with production of P(tx). Therefore, as a result of application of switching control (FIG. 20) in which an inflection point is added, a difference (ΔP) in switching loss between switching elements S2 and S4 can be reduced. Unevenness in amount of heat generation between switching elements S2 and S4 can thus be lessened.

Pl2 represents power losses due to hard switching of IL1 two times, whereas PL4 represents power losses due to switching of differential current ΔI two times. Therefore, FIG. 21 (b) is smaller in ΔP than FIG. 21 (a). Depending on values for IL1 and IL2, a condition of Pl2>Pl4 may be satisfied and relation in magnitude of the power loss between switching elements may also be reversed.

Thus, with switching control to add an inflection point in synchronization with a side of the high current (IL2) to a side of the low current (IL1), unevenness in switching loss between switching elements S2 and S4 can be lessened.

As shown in FIG. 20, as a result of forcibly providing the inverted period (duration Tx) in control pulse signal SD1 for addition of an inflection point, a duration of the H level period of SD1 is shorter than its original duration for control of an output from DC power supply B1. Lowering in average value of reactor current IL1 than an original control value is thus a concern. Owing to a compensation function of feedback control shown in FIG. 13, however, duty ratio DT1 is set to be higher than in an example where an inverted period is not provided, in accordance with lowering in voltage or current under the influence by the inverted period. Thus, as shown with a dotted line in FIG. 20, the H level period of control pulse signal SD1 which is comparable to that in an example without the inverted period is ensured so that control in accordance with voltage command value VH* can normally continue.

Figure 22:
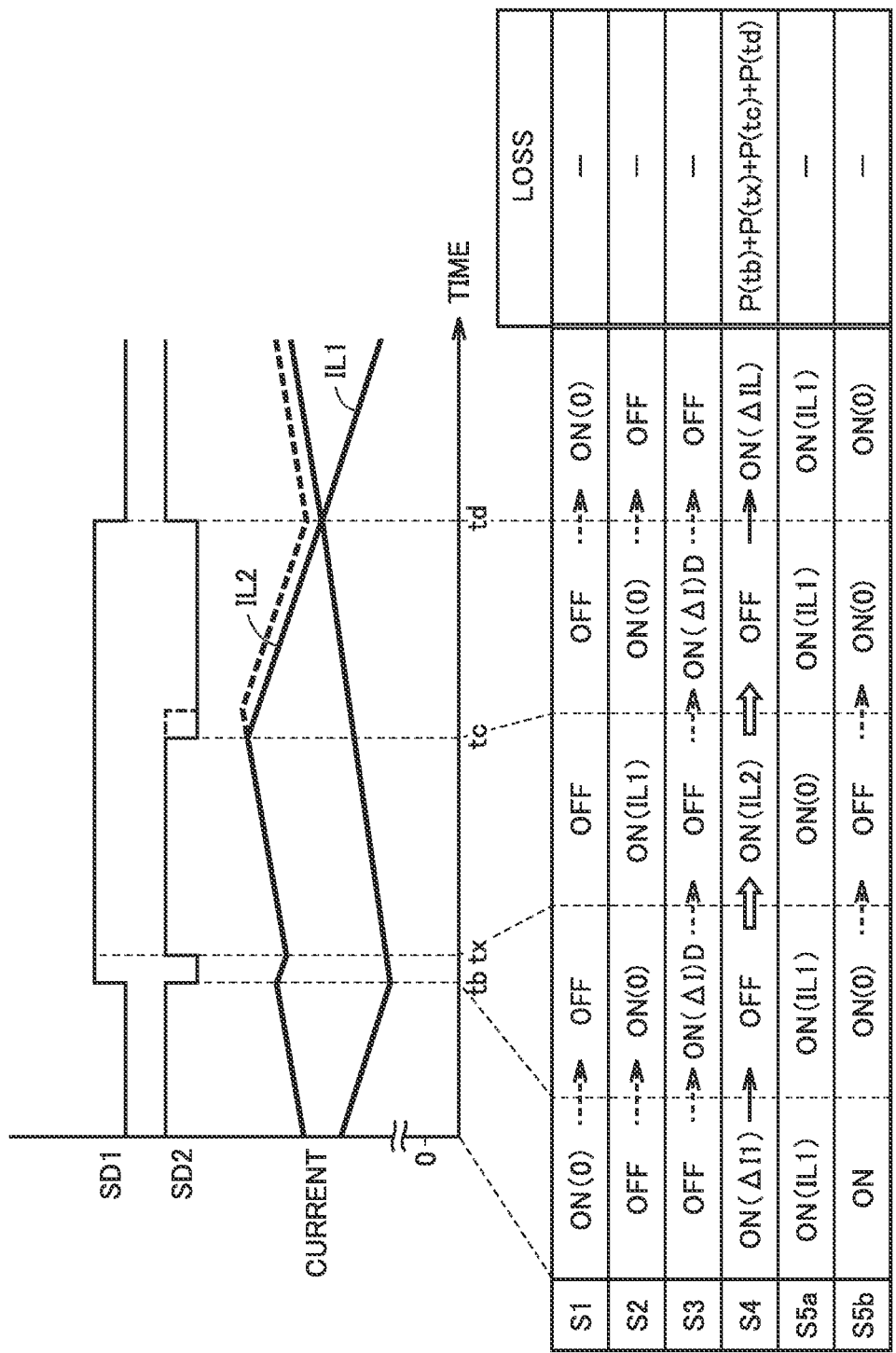
FIG. 22 is a waveform diagram (in power running) when a condition for switching control according to the present embodiment is modified which is shown for comparison.

FIG. 22 shows for comparison, a waveform diagram in carrying out switching control for adding an inflection point in synchronization with the side of the low current (IL1) to the side of the high current (IL2), in contrast to FIG. 20.

Based on comparison of FIG. 22 with FIG. 19, in the example in FIG. 22, an inflection point is added to IL2 representing the high current at times tb and tx. Therefore, control pulse signal SD2 is provided with a forced inverted period (duration Tx) from time tx to time tb, during the period before time tc in which the control pulse signal is maintained at the H level in FIG. 19.

Referring to FIG. 22, the circuit state before time tb is the same as in FIG. 19. In addition to transition of control pulse signal SD1 from the L level to the H level at time tb from this state, control pulse signal SD2 also makes transition from the H level to the L level. Thus, reactor current IL1 attains to the relative minimum point and reactor current IL2 attains to the relative maximum point.

At time tx, control pulse signal SD2 makes transition from the L level to the H level while control pulse signal SD1 is maintained at the H level. Reactor current IL1 thus attains to the relative minimum point. Consequently, inflection points at times tb and tx are added to IL2 representing the high current.

During a period from time tb to tx, since a condition of SD1=the H level and SD2=the L level is satisfied, as in the period from time tc to td in FIG. 19, reactor current IL1 increases, whereas reactor current IL2 lowers (the B1L arm and the B2U arm being turned on). Therefore, as shown in FIG. 17 (a), reactor current IL1 flows through switching element S5a and differential current ΔI (ΔI=IL2−IL1) flows through diode D3.

Therefore, at time tb, switching elements S2 and S3 are turned on and switching elements S1 and S4 are turned off. In switching element S4, a loss (turn-off) due to switching of differential current ΔI is produced. On the other hand, no power loss is produced by turn-off of switching element S1 in which a current in the on state is 0, turn-on of switching element S3 in which a current flows through diode D3, and turn-on of switching element S2 in which a current after turn-on is 0.

Since the condition of SD1=SD2=the H level is satisfied during the period from time tx to tc as in the period from time tb to tc in FIG. 19, both of reactor currents IL1 and IL2 increase (the B1L arm and the B2L arm being turned on). Therefore, as shown in FIG. 6, switching elements S2 and S4 are turned on and IL1 and IL2 flow through switching elements S2 and S4, respectively.

Therefore, at time tx, switching element S4 is turned on whereas switching elements S3 and S5b are turned off. A power loss (turn-on) due to hard switching of reactor current IL2 is produced in switching element S4. On the other hand, no power loss is produced at the time of turn-off of switching element S3 in which a current flows through diode D3 and turn-off of switching element S5b in which a current in the on state is 0.

Since the circuit operation after time tx is the same as in FIG. 19, detailed description will not be repeated. At time tc, a loss (turn-off) due to hard switching of IL2 is produced in switching element S4. At time td, a loss (turn-on) due to switching of differential current ΔI is produced in switching element S4.

In the example in FIG. 22 as well, waveforms of control pulse signal SD2 and reactor current IL2 deformed by feedback control when the inverted period is provided are shown with dotted lines.

In switching control in FIG. 22, since loss P(tb) due to switching of differential current ΔI is no longer produced in switching element S2, a power loss is less than in FIG. 19. In switching element S4, on the other hand, loss P(tb) due to switching of differential current ΔI and loss P(tc) due to hard switching of IL2 are produced in addition to losses P(tc) and P(td) in FIG. 19.

Since increase in loss in switching element S4 is smaller than decrease in loss in switching element S2 in FIG. 22, a switching loss in power converter 10 as a whole increases as compared with that in FIG. 19. Since a power loss is produced only in switching element S4, unevenness in power loss between elements is also greater than in FIG. 19.

Addition of an inflection point on the side of the high current thus aggravates both of the switching loss in power converter 10 as a whole and unevenness in power loss among switching elements. Therefore, switching control according to the present embodiment lessens unevenness in power loss (switching loss) among switching elements by adding an inflection point in synchronization with the side of the high current (IL2) to the side of the low current (IL1) as shown in FIG. 20.

Though FIG. 20 shows an example in which the condition of IL2>IL1 is satisfied throughout the period for ease of understanding of illustration, distinction between the high current and the low current in switching control for addition of an inflection point is not limited to such a current condition. In a partial period, which of IL1 and IL2 is defined as the high current and the low current can be determined as appropriate based on comparison between current average values, current relative maximum points, or current relative minimum points also when relation in magnitude between IL1 and IL2 is reversed.

Figure 23:
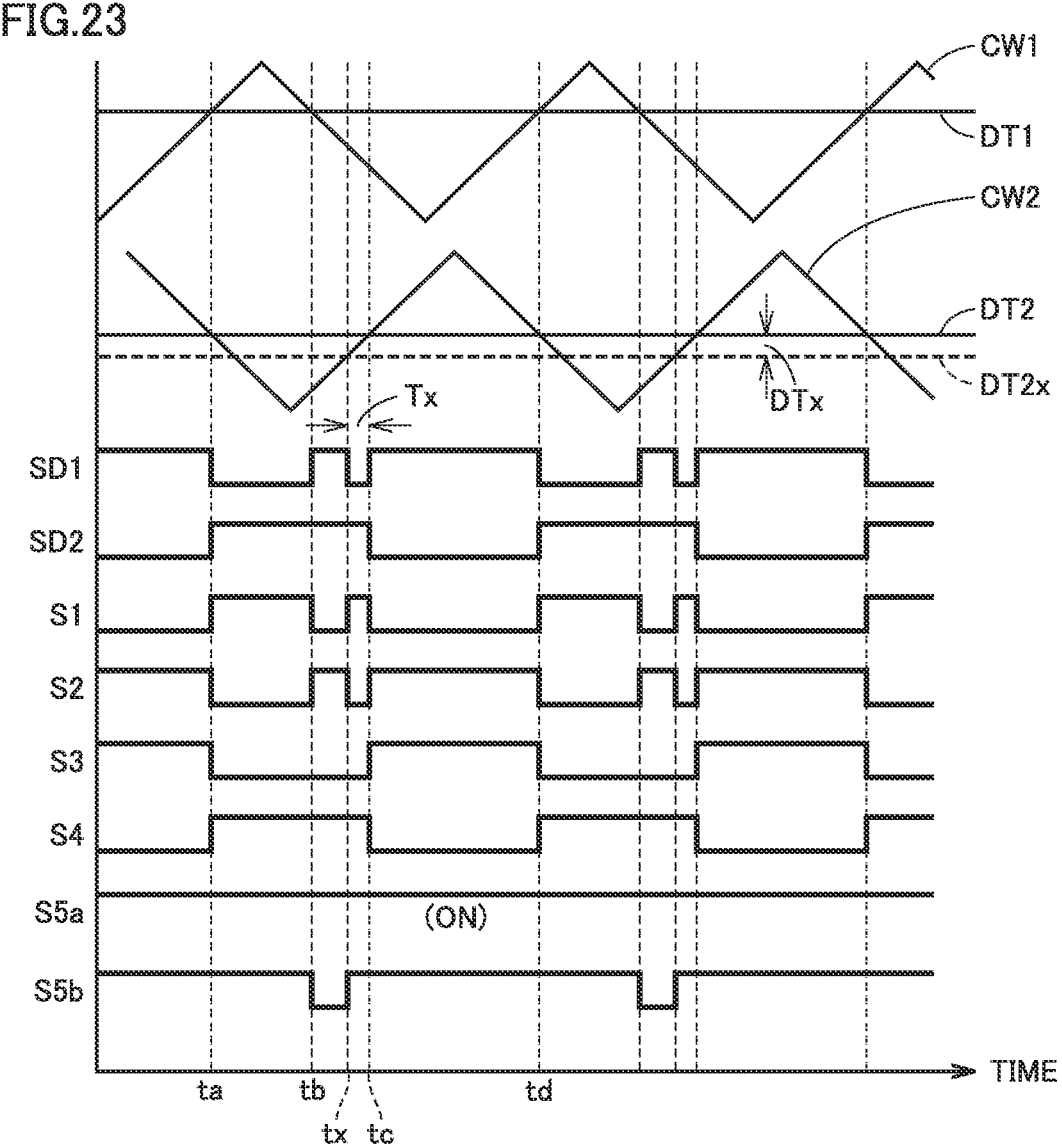
FIG. 23 is a waveform diagram for illustrating PWM control when switching control according to the present embodiment is applied.

FIG. 23 is a waveform diagram for illustrating PWM control when switching control according to the present embodiment is applied. In FIG. 23, the condition of |IL2|>|IL1| is satisfied as in FIGS. 19 to 21.

Referring to FIG. 23, in PWM control on the side of the high current (IL2), a duty ratio DT2x (DT2x=DT2−DTx) is further set in addition to duty ratios DT1 and DT2 owing to feedback control (FIG. 13). By varying DTx, duration Tx of the inverted period can be adjusted.

Control pulse signal SD2 on the side of the high current (IL2) is generated in accordance with a result of comparison between carrier wave CW2 and duty ratio DT2 similarly to the conventional example.

Optimal phase difference ϕ* described with reference to FIG. 18 is provided between carrier waves CW1 and CW2. Thus, at times ta and td, transition of control pulse signal SD1 from the H level to the L level and transition of control pulse signal SD2 from the L level to the H level are identical in timing to each other. Consequently, at times ta and td, the relative maximum point of reactor current IL1 and the relative minimum point of reactor current IL2 are identical in timing to each other.

Control pulse signal SD1 on the side of the low current (IL2) is generated, with a result of comparison between carrier wave CW2 and duty ratios DT2 and D2x being further reflected, in addition to the result of comparison between carrier wave CW1 and duty ratio DT1.

Specifically, during a period in which a condition of D2x<CW2<DT2 is satisfied, the logic level of control pulse signal SD1 is forcibly inverted. In the example in FIG. 23, the condition of SD1=L is set, with a period in which the condition of D2x<CW2<DT2 is satisfied while a condition of DT1>CW1 is satisfied (the period from time tb to td) being defined as the inverted period. Thus, SD1 can be provided with the forced L level period (inverted period) in synchronization with the timing of transition of control pulse signal SD2 from the H level to the L level.

By controlling on and off of switching elements S1 to S5a and S5b in accordance with the gate Boolean expressions shown in FIG. 12 based on control pulse signals SD1 and SD2 thus generated, switching control to add an inflection point on the side of the low current (IL1) shown in FIG. 20 can be implemented.

[Modification of First Embodiment]

A switching loss in an example in which both of DC power supplies B1 and B2 perform the power running operation is described in the first embodiment. In a modification of the first embodiment, an effect in an example where switching control according to the first embodiment is applied to an example where both of DC power supplies B1 and B2 perform the regeneration operation will be described for the confirmation purpose.

Figure 24:
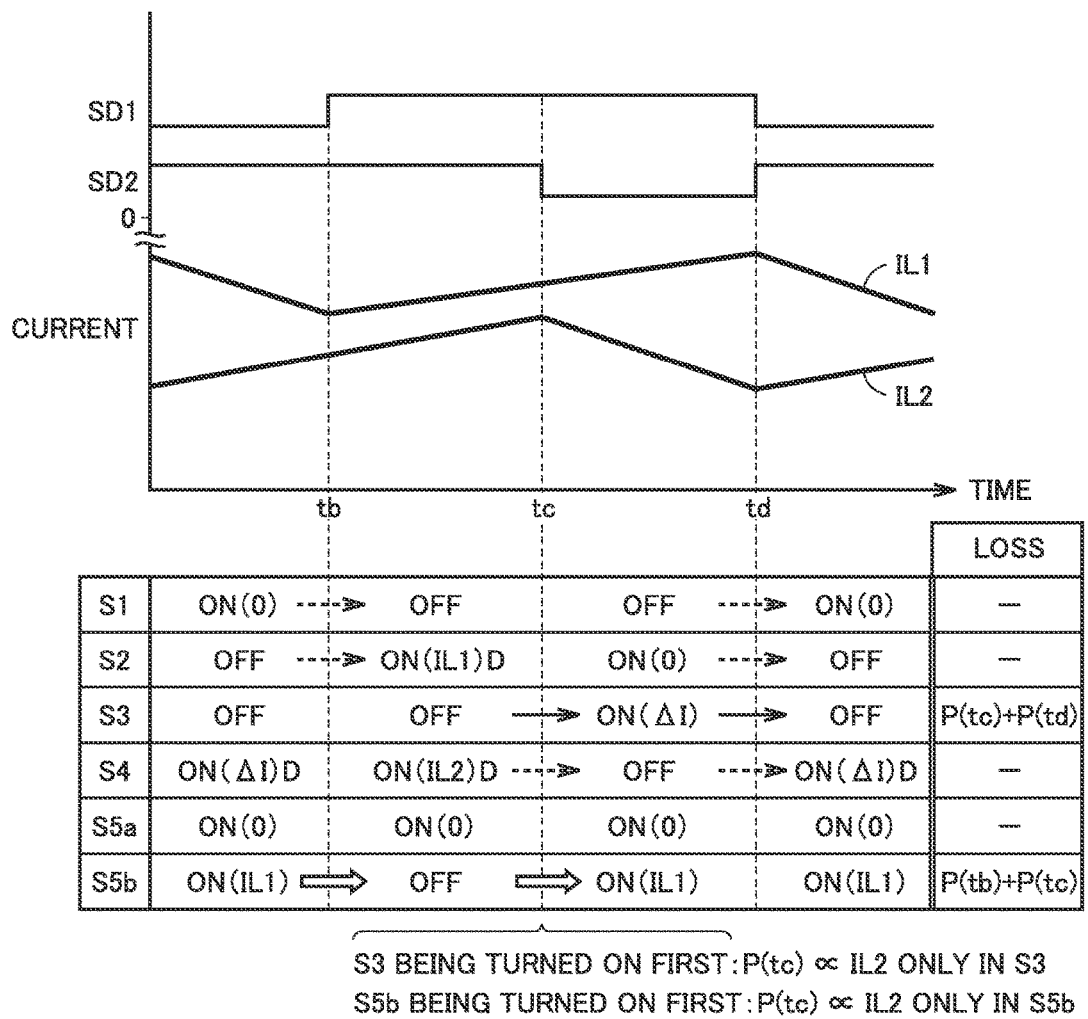
FIG. 24 is a waveform diagram (in regeneration) for illustrating a power loss in each switching element when current phase control is applied.

FIG. 24 is a waveform diagram for illustrating a power loss in each switching element when current phase control without addition of an inflection point is applied, which is shown as the comparative example as in FIG. 19. FIG. 24 shows a waveform diagram in an example in which both of DC power supplies B1 and B2 perform the regeneration operation (IL1<0 and IL2<0). FIG. 24 also shows a current waveform when the condition of |IL2|>|IL1| is satisfied. In the description in the example of the regeneration operation below, IL1 represents the low current and IL2 represents the high current. FIG. 25 is a circuit diagram illustrating a behavior of a current in formation of the second arm in power converter 10 during the regeneration operation.

Referring to FIG. 24, since a condition of SD1=L and SD2=H is satisfied during the period until time tb, the second arm is applied. Reactor current IL1 lowers due to turn-on of the B1U arm whereas reactor current IL2 increases due to turn-on of the B2L arm. A current path in power converter 10 during that period is shown in FIG. 25 (b).

Referring to FIG. 25 (b), during regeneration of DC power supplies B1 and B2, a current in a direction reverse to the direction in FIG. 17 (b) is generated. DC power supply B1 is charged with IL1 which flows through a current path 117# (IL1<0). IL1 may form a current path 117d# which goes through switching element S1 as a result of branching. Similarly, DC power supply B2 is charged with IL2 which flows through a current path 116# (IL2<0). IL2 may form a current path 116d# which goes through diode D1 and switching element S5b as a result of branching.

Therefore, before time tb, a current in a reverse direction flows through each element in a switching pattern the same as in FIG. 19. Since the condition of |IL2|>|IL1| is satisfied, a current through switching element S1 is 0 whereas differential current ΔI (IL2−IL1) flows through diode D4 not switching element S4. Current IL1 flows through switching element S5b whereas a current through switching element S5a is 0.

Similarly, during the period from time tb to tc (the B1L arm and the B2L arm being turned on), currents in opposite directions flow through current paths 111 and 112 in FIG. 6. Therefore, while switching elements S2, S4, and S5a are turned on, IL1 flows through diode D2 and IL2 flows through diode D4. As in the power running operation, a current through switching element S5a is 0.

Therefore, at time tb, switching element S2 is turned on and switching elements S1 and S5b are turned off. A power loss (turn-off) due to hard switching of IL1 is produced in switching element S5b. At the time of turn-off of switching element S1 and turn-on of switching element S2, currents before turn-off and after turn-on thereof are both 0 and hence no switching loss is produced.

A current path in power converter 10 during the period from time tc to td is shown in FIG. 25 (a). During the period from time tc to td, as in FIG. 17 (b), the B1L arm and the B2U arm are turned on.

Referring to FIG. 25 (a), during regeneration of DC power supplies B1 and B2, a current in a direction reverse to the direction in FIG. 17 (b) is generated. DC power supply B1 is charged with IL1 which flows through a current path 115# (IL1<0). IL1 may form a current path 115d# which goes through diode D2 as a result of branching. Similarly, DC power supply B2 is charged with IL2 which flows through a current path 118# (IL2<0). IL2 may form a current path 118d# which goes through switching elements S2 and S5b as a result of branching.

Therefore, during the period from time tc to td, a current in a reverse direction flows through each element in a switching pattern the same as in FIG. 19. Reactor current IL1 flows through switching element S5b, whereas a current through switching element S5a is 0 and differential current ΔI (|IL2−IL1|) flows through switching element S3. A current through switching element S2 is 0 as in the power running operation.

Therefore, at time tc, switching elements S3 and S5b are turned on and switching elements S1 and S4 are turned off. In switching element S5b, a power loss (turn-on) due to hard switching of IL1 is produced, and in switching element S3, a power loss (turn-on) due to switching of differential current ΔI is produced. Since diode D4 is turned off owing to arc extinguishing by itself, no power loss due to turn-off of switching element S4 is produced.

Switching losses in switching elements S3 and S5b are different from the switching loss above when there is a difference in timing of turn-on of them. Specifically, when switching element S3 is turned on first, a turn-on loss due to hard switching of IL2 is produced in switching element S3 whereas no switching loss is produced in switching element S5b which is turned on later. Similarly, when switching element S5b is turned on first, a turn-on loss due to hard switching of IL2 is produced in switching element S5b whereas no switching loss is produced in switching element S3 which is turned on later.

After time td, a current identical to the current before time tb flows through each element. Therefore, at time td, switching elements S1 and S4 are turned on and switching elements S2 and S3 are turned off. A power loss (turn-off) due to switching of differential current ΔI is produced in switching element S3. Since a path for differential current ΔI is changed to a path through diode D4, no turn-on loss is produced in switching element S4. At the time of turn-on of switching element S1 and turn-off of switching element S2 as well, currents after turn-on and before turn-on are both 0 and hence no switching loss is produced.

Consequently, in the circuit operation exemplified in FIG. 24 (IL1<0 and IL2<0), a switching loss is produced only in switching elements S3 and S5b. Since hard switching of IL2 representing the high current is not made during the regeneration operation, the switching loss is not so great. A difference in loss power, that is, a difference in heat generation, between switching elements S3 and S5b is not so great either.

When there is a time lag in turn-on between switching elements S3 and S5b at time tc, a loss due to hard switching of IL2 is produced only in one switching element (which is earlier in turn-on), and hence a difference in power loss may be great. In particular, such a time lag in turn-on may be caused by an individual difference of an element or a drive circuit (not shown). In this case, an element great in power loss (that is, an amount of heat generation) being fixed is a concern.

Figure 26:
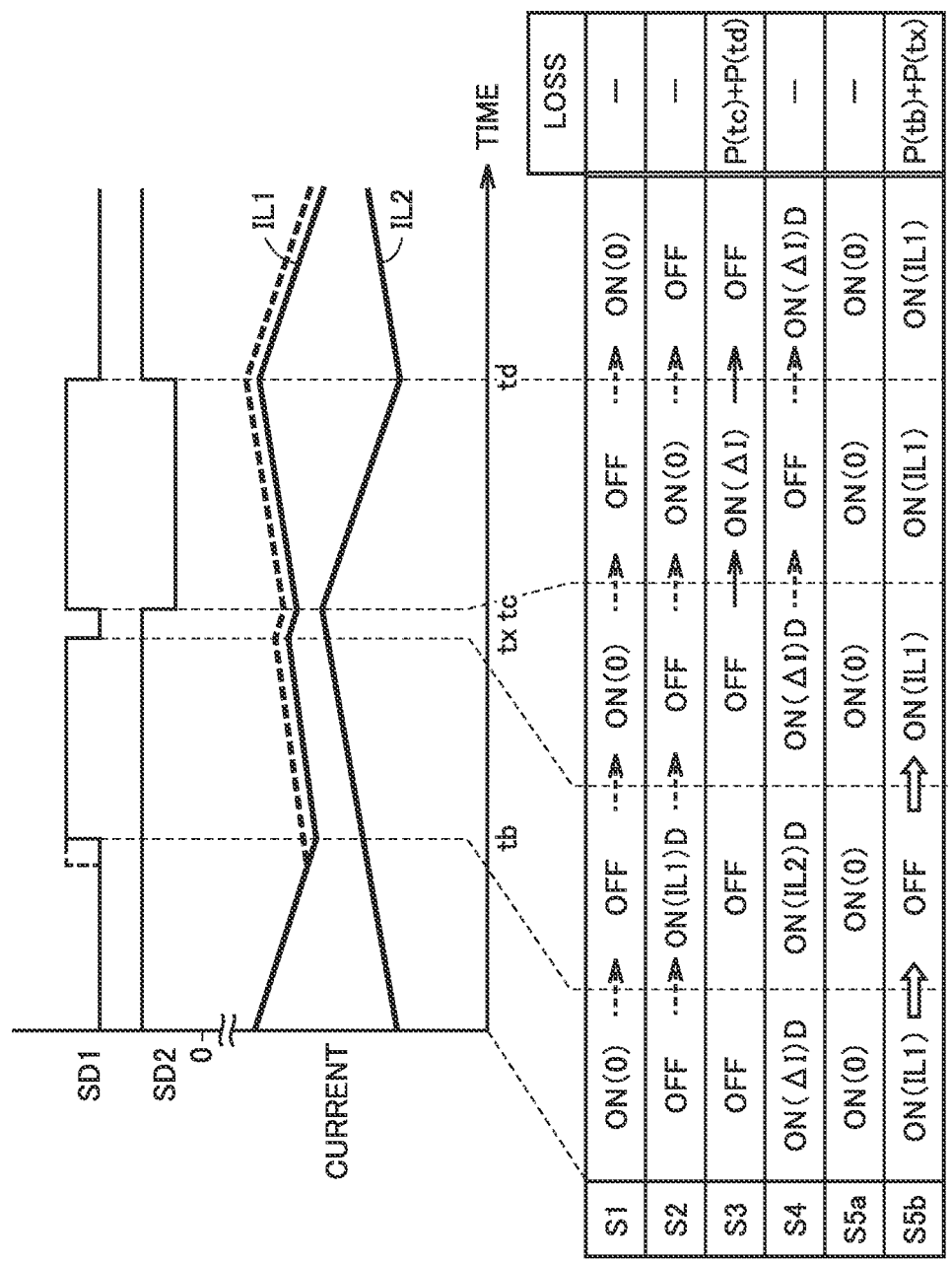
FIG. 26 is a waveform diagram (in regeneration) for illustrating a power loss in each switching element when switching control according to the present embodiment is applied.

FIG. 26 shows a waveform diagram when switching control to add an inflection point according to the first embodiment is applied to the circuit state the same as in FIG. 24. In FIG. 26, the condition of IL1<0, IL2<0, and |IL2|>|IL1| is again satisfied.

Referring to FIG. 26, inflection points are added at times tx and tc to IL1 representing the low current as in the first embodiment. Since behaviors of IL1 and IL2 and a current through each element until time tx and after time tc are the same as in FIG. 25, detailed description will not be repeated.

A current identical to the current before time tb flows through each element during the period from time tx to tc. Therefore, at time tx, switching elements S1 and S5b are turned on and switching element S2 is turned off.

Thus, a loss (turn-on) due to hard switching of IL1 representing the low current is produced in switching element S5b. At the time of turn-on of switching element S1, a current after turn-on is 0, and hence no switching loss is produced. Since a path for differential current ΔI is varied owing to natural arc-extinguishing of diode D2, no switching loss due to turn-off of switching element S2 is produced.

At time tc, on the other hand, switching elements S2 and S3 are turned on and switching elements S1 and S4 are turned off. Thus, a loss (turn-off) due to switching of differential current ΔI is produced in switching element S3. At the time of turn-on of switching element S2 and turn-off of switching element S1, currents after turn-on and before turn-off are both 0 and hence no switching loss is produced. Since the path for differential current ΔI is varied owing to natural arc-extinguishing of diode D4, no switching loss due to turn-off of switching element S4 is produced.

Since switching losses produced at times tb and td are the same as in FIG. 25, detailed description will not be repeated. FIG. 26 shows again with a dotted line, change in waveform of control pulse signal SD1 and reactor current IL1 when influence by duration Tx of the inverted period is compensated for by feedback control as in FIG. 20.

Consequently, switching losses are produced only in switching elements S3 and S5b also in the circuit operation exemplified in FIG. 26. In each of FIGS. 24 and 25, a power loss due to switching of differential current ΔI is produced at times tc and td in switching element S3. Similarly, a power loss due to hard switching of IL1 is produced in switching element S5b at times tb and tc.

Therefore, when there is no time lag in turn-on between switching elements S3 and S5b at time tc in FIG. 24, switching elements S3 and S5b are comparable to each other in switching loss regardless of addition of an inflection point.

In switching control with addition of an inflection point shown in FIG. 25, on the other hand, the problem caused by a time lag in turn-on described with reference to FIG. 24 is avoided by turning on switching elements S5b and S3 stepwise at times tx and tc. An effect of prevention of increase in difference in power loss between switching elements S3 and S5b due to an individual difference of an element or a drive circuit (not shown) is achieved. Switching control to add an inflection point described with reference to the first embodiment can thus be applied also to the regeneration operation.

Inflection points (the relative maximum point and the relative minimum point) owing to PWM control in accordance with duty ratio DT2 appear in IL2 representing the high current corresponding to the "first current" at times tc and td within one control cycle, also in FIG. 26. In IL2, the relative minimum point at time td corresponds to the "first inflection point" and the relative maximum point at time tc corresponds to the "second inflection point."

Inflection points (the relative minimum point and the relative maximum point) owing to PWM control in accordance with duty ratio DT1 appear in IL1 representing the low current corresponding to the "second current" at times tb and td within one control cycle. In IL1, the relative maximum point at time td which is identical in timing to the relative minimum point of IL2 corresponds to the "first inflection point" and the relative minimum point at time tb corresponds to the "second inflection point." Furthermore, two inflection points (the relative minimum point and the relative maximum point) corresponding to the inverted period are additionally provided in IL1 at times tc and tx within the same control cycle. The inverted period is provided also in FIG. 26 such that an added inflection point of IL1 (the low current) is identical in timing to the second inflection point of the high current (IL2). The relative minimum point at time tc which is identical in timing to the relative maximum point of IL2 corresponds to the "third inflection point," and the relative maximum point at time tx corresponds to the "fourth inflection point."

When both of DC power supplies B1 and B2 perform the regeneration operation also as shown in FIG. 26, any one and the other of the inflection point of IL1 and the inflection point of IL2 are any one and the other of the relative maximum point and the relative minimum point, respectively, at each of times tc and td.

Figure 27:
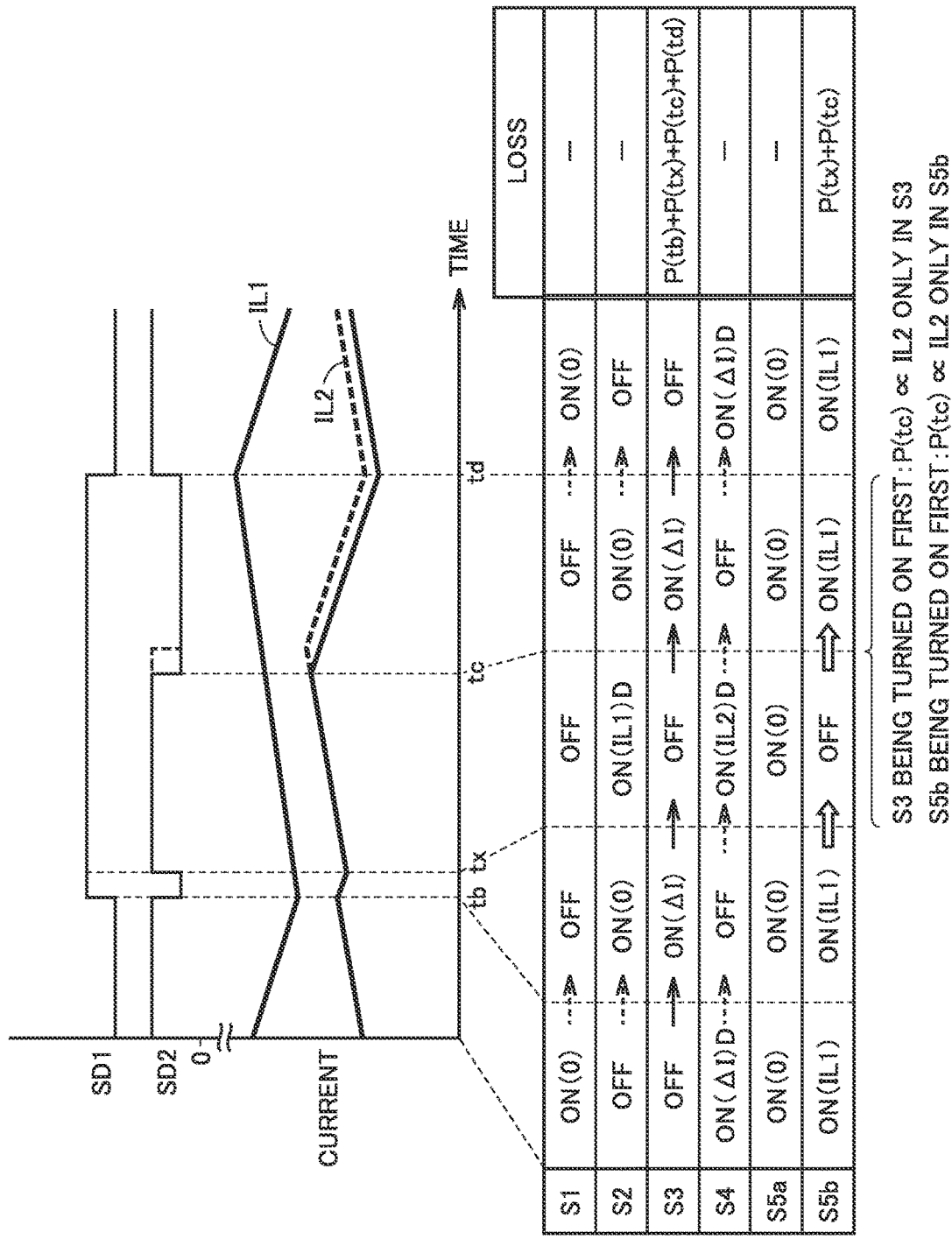
FIG. 27 is a waveform diagram (in regeneration) when a condition for switching control according to the present embodiment is modified which is shown for comparison.

FIG. 27 shows for comparison, a waveform diagram in carrying out switching control to add an inflection point to the side of the high current (IL2) as in FIG. 22 and in contrast to FIG. 26.

Based on comparison of FIG. 27 with FIG. 26, in the example in FIG. 27, an inflection point is added to IL2 representing the high current at times tb and tx. Therefore, a forced inverted period (duration Tx) is provided in control pulse signal SD2 during the period from time tb to tx.

Referring to FIG. 27, the circuit state before time tb is the same as before time tb in FIG. 26. During the period from time tb to tx, as in the period from time tc to td in FIG. 26, reactor current IL1 increases whereas reactor current IL2 lowers (the B1L arm and the B2U arm being turned on). Therefore, as shown in FIG. 25 (a), reactor current IL1 flows through switching element S5b and differential current ΔI (ΔI=IL2−IL1) flows through switching element S3.

Therefore, at time tb, switching elements S2 and S3 are turned on and switching elements S1 and S4 are turned off. A power loss (turn-on) due to switching of differential current ΔI is produced in switching element S3. No power loss is produced by turn-off of switching element S1 in which a current in the on state is 0, turn-off of switching element S4 in which a current flows through diode D4, and turn-on of switching element S2 in which a current after turn-on is 0.

During the period from time tx to tc, as in the period from time tb to tc in FIG. 26, the condition of SD1=SD2=the H level is satisfied, and hence both of reactor currents IL1 and IL2 increase (the B1L arm and the B2L arm being turned on). Therefore, switching elements S2 and S4 are turned on and currents in opposite directions flow through current paths 111 and 112 in FIG. 6, respectively. IL1 and IL2 flow through diodes D2 and D4, respectively.

Therefore, at time tx, switching elements S3 and S5b are turned off and switching element S4 is turned on. A power loss (turn-off) due to hard switching of IL1 is produced in switching element S5b. A power loss (turn-off) due to switching of differential current ΔI is produced in switching element S3. No power loss is produced by turn-on of switching element S4 in which a current flows through diode D4 after turn-on.

Since switching losses produced at times tc and td are the same as in FIG. 24, detailed description will not be repeated. FIG. 27 also shows with a dotted line, change in waveform of control pulse signal SD2 and reactor current IL2 when influence by duration Tx of the inverted period is compensated for by feedback control as in FIG. 22.

Switching control in FIG. 27 is comparable to FIG. 26 in power loss in switching element S5b. In switching element S3, on the other hand, a power loss due to switching of differential current ΔI is produced also at times tb and tx in addition to times tc and td. Therefore, a power loss in switching element S3 increases as compared with the power loss in FIG. 26. Therefore, a switching loss in power converter 10 as a whole increases as compared with the power loss in FIG. 26. A difference in switching loss between switching elements S3 and S5b is also greater than in FIG. 26.

Thus, with addition of an inflection point to the side of the high current also during the regeneration operation, a switching loss in power converter 10 as a whole is aggravated and unevenness in power loss among switching elements is also aggravated. Therefore, switching control according to the present embodiment can lessen unevenness in power loss (switching loss) among switching elements by adding an inflection point to a current smaller in absolute value (IL1) also when the switching control is applied to the regeneration operation.

Which of IL1 and IL2 is defined as the high current and the low current can be determined as appropriate based on comparison between current average values, current relative maximum points, or current relative minimum points in both of the regeneration operation and the power running operation. Distinction between the high current and the low current can be made based on comparison of an absolute value of a current average value, a current relative maximum point, or a current relative minimum point.

[Second Embodiment]

Switching control for lessening a difference in switching loss among switching elements by adding an inflection point to a reactor current on the side of the low current is described in the first embodiment and the modification thereof. Control in which a plurality of types of switching control are combined in a time division manner will be described in a second embodiment.

Figure 28:
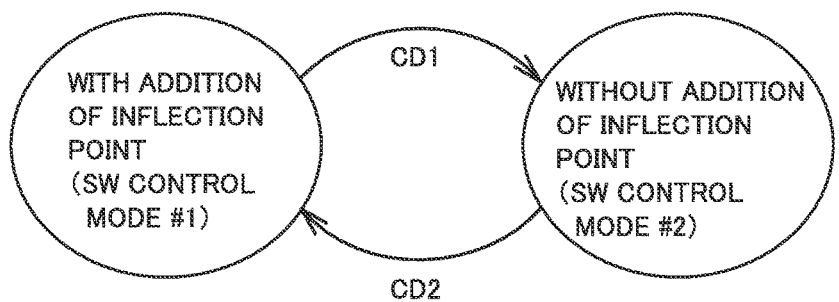
FIG. 28 is a conceptual diagram for illustrating switching control applied to the power supply system according to a second embodiment.

FIG. 28 is a conceptual diagram for illustrating switching control applied to the power supply system according to the second embodiment.

Referring to FIG. 28, in the second embodiment, on and off of switching elements S1 to S5a and S5b implementing power converter 10 is controlled by switching between a switching control mode 1 (an SW control mode #1) and a switching control mode 2 (an SW control mode #2).

SW control mode #1 refers, for example, to switching control (FIGS. 20 and 26) in which addition of an inflection point is combined with current phase control described in the first embodiment and the modification thereof. On the other hand, SW control mode #2 refers, for example, to switching control (FIGS. 19 and 24) in which only current phase control is carried out without addition of an inflection point.

When a transition condition CD1 is satisfied during application of switching control mode 1, the control mode is switched and switching control mode 2 is newly applied. Similarly, when a transition condition CD2 is satisfied during application of switching control mode 2, the control mode is switched and switching control mode 1 is newly applied.

As described with reference to FIGS. 19, 20, and 22, in power converter 10, a power loss is produced only in switching elements S2 and S4 during the power running operation of DC power supplies B1 and B2. As seen in the example in FIG. 21, relation in magnitude of switching loss may be interchanged between switching elements S2 and S4, depending on whether or not an inflection point is added.

Therefore, further decrease in difference in amount of heat generation among switching elements can be expected by alternately applying switching control with addition of an inflection point and switching control without addition of an inflection point. Transition conditions CD1 and CD2 can be determined such that the control mode makes transition when a duration of each switching control mode exceeds a prescribed threshold value.

Figure 29:
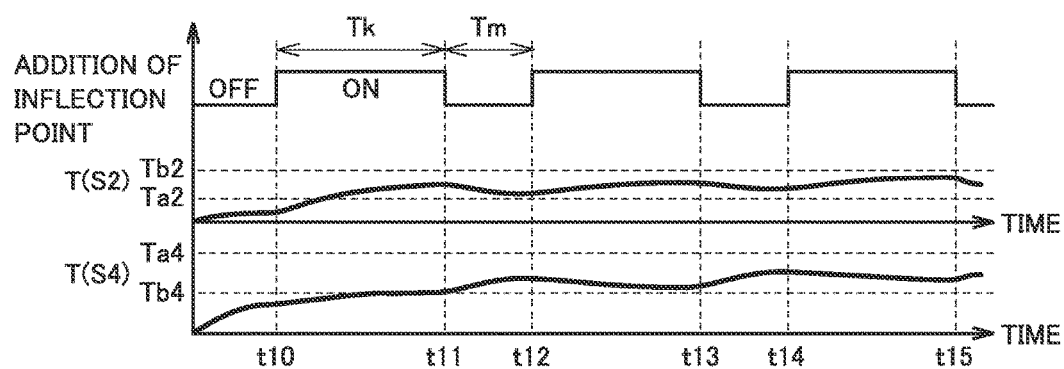
FIG. 29 is a conceptual waveform diagram showing one example of a history of change in temperature of a switching element when switching control according to the second embodiment is applied.

FIG. 29 shows one example of a history of change in temperature of a switching element when switching control according to the second embodiment is applied.

Referring to FIG. 29, a temperature T(S2) of switching element S2 and a temperature T(S4) of switching element S4 increase with an amount of heat generation resulting from switching losses in switching elements S2 and S4. Owing to a thermal capacity of a switching element, T(S2) and T(S4) increase with first-order lag response.

Each switching element is attached to a heat radiation mechanism represented by a heat sink. Therefore, T(S2) and T(S4) do not continue to increase with production of a switching loss, and is stabilized at a rate of temperature increase in accordance with a difference between an amount of heat radiation by the heat radiation mechanism and an amount of heat generation from a switching element. There is a stabilization time period for T(S2) and T(S4) until saturation of temperature increase in response to a certain input of a switching loss.

In FIGS. 29, Ta2 and Ta4 correspond to a stabilization temperature when T(S2) and T(S4) increase upon receiving switching losses Pl2 and Pl4 shown in FIG. 21 (a) as a result of application of switching control without addition of an inflection point. Since a condition of Pl4>Pl2 is satisfied, a condition of Ta4>Ta2 is satisfied.

Similarly, Tb2 and Tb4 correspond to a stabilization temperature when T(S2) and T(S4) increase upon receiving switching losses Pl2 and Pl4 shown in FIG. 21 (b) as a result of application of switching control with addition of an inflection point. Since a condition of Pl2>Pl4 is satisfied, a condition of Tb2>Tb4 is satisfied. At T(S2), a condition of Tb2>Ta2 is satisfied, and at T(S4), a condition of Ta4>Tb4 is satisfied.

Switching control without addition of an inflection point (off) is applied before time t10. Therefore, T(S4) increases toward stabilization temperature Ta4 and T(S2) increases toward stabilization temperature Ta2. While addition of an inflection point is off, switching loss Pl4 is greater than switching loss Pl2 as shown in FIG. 21 (a) and hence T(S4) more quickly increases.

At time t10, the switching control mode is switched and switching control with an inflection point (on) is applied. T(S4) thus increases toward stabilization temperature Tb4 and T(S2) increases toward stabilization temperature Tb2.

When transition condition CD2 is satisfied at time t11 after lapse of Tk since time t10, switching control without an inflection point (off) is started as a result of switching of the switching control mode in response thereto.

At time t11, T(S2) is higher than stabilization temperature Ta2. Therefore, T(S2) lowers after time t11 as a result of application of switching control without addition of an inflection point (off). In contrast, T(S4) at time t11 is lower than stabilization temperature Ta4, and hence T(S4) increases toward Ta4 after time t11.

When transition condition CD1 is satisfied at time t12 after lapse of a period Tm since time t11, switching control with an inflection point (on) is started as a result of switching of the switching control mode in response thereto.

At time t12, T(S4) is higher than stabilization temperature Tb4. Therefore, T(S4) lowers after time t12 as a result of application of switching control with addition of an inflection point (on). In contrast, T(S2) at time t12 is lower than stabilization temperature Tb2 and therefore T(S2) increases toward Tb2 after time t12.

Thereafter, the switching control mode is switched each time a duration of each switching control mode reaches Tk or Tm. Thus, at times t13, t14, and t15, addition of an inflection point is switched on and off. Transition conditions CD1 and CD2 can be defined as "whether or not a duration of SW control mode #1 or #2 has exceeded a prescribed threshold value (Tk, Tm)."

By setting threshold values Tk and Tm described above to be shorter than a stabilization time period of T(S2) and T(S4) in each case of addition of an inflection point (on) and absence of addition of an inflection point (off) described above, temperature increase in switching elements S2 and S4 can be suppressed to satisfy a condition of T(S2)<Tb2 and T(S4)<Ta4. It is understood that temperature increase in a switching element can be suppressed as compared with an example in which a single switching control mode is continuously applied without switching the switching control mode.

It is understood that an effect of switching control according to the second embodiment is higher when relation of magnitude in switching loss between switching elements S2 and S4 is interchanged between a case with addition of an inflection point and a case without addition of an inflection point as in the example above. Even when relation of magnitude between switching losses in switching elements S2 and S4 is not interchanged by addition of an inflection point, however, an amount of heat generation is decreased by application of switching control according to the second embodiment in a switching element greater in power loss without addition of an inflection point (switching element S4 in FIG. 21 (a)).

According to switching control in the second embodiment, by thus alternately applying a plurality of switching control modes different in switching element where a switching loss is maximum, a highest temperature of the switching element can be suppressed. A rating of heat resistance of each switching element is designed to ensure heat resistance against the highest temperature. Therefore, manufacturing cost can be reduced by relaxing an element rating of a switching element by applying switching control according to the second embodiment. In particular, manufacturing cost can be reduced by decreasing the number of transistor chips connected in parallel in a module implementing a switching element.

Transition conditions CD1 and CD2 can be determined with attention being paid also to a temperature of an element, in addition to setting the condition based on a duration of the switching control mode as described above. For example, in switching control with addition of an inflection point (SW control mode #1), transition condition CD1 being satisfied can be determined when T(S2) of switching element S2 high in power loss exceeds a prescribed temperature. Similarly, in switching control without addition of an inflection point (SW control mode #2), transition condition CD2 being satisfied can be determined when T(S4) of switching element S4 high in power loss exceeds a prescribed temperature.

[Third Embodiment]

A modification of the circuit configuration of power converter 10 described in the first and second embodiments will be described in a third embodiment.

FIG. 30 is a circuit diagram for illustrating a configuration of a power converter 11 according to the third embodiment.

Referring to FIG. 30, power converter 11 is different from power converter 10 shown in FIG. 1 in that common switching element S5 is connected as a semiconductor element connected between nodes N1 and N2, instead of a bidirectional switch in FIG. 1. Switching element S5 corresponds to "fifth semiconductor element SM5." Since power converter 11 is otherwise the same in configuration as power converter 10, detailed description will not be repeated.

On and off of switching element S5 is controlled in accordance with control signal SG5 from control device 100 (FIG. 1). In power converter 11, the first arm is formed while switching element S5 is turned off and the second arm is formed while switching element S5 is turned on.

Switching element S5 should be turned off in both of the off period of switching element S5a and the off period of switching element S5b in power converter 10 shown in FIG. 1. Switching element S5 can be turned on during a period in which both of switching elements S5a and S5b are turned on.

Therefore, in power converter 11, in the parallel boost mode, on and off of switching elements S1 to S5 is controlled in accordance with Boolean expressions shown in FIG. 31.

FIG. 31 is a chart showing a list of Boolean expressions for controlling on and off of each switching element in the parallel boost mode of power converter 11.

Referring to FIG. 31, on and off of switching elements S1 to S4 is controlled in accordance with the gate Boolean expressions the same as in FIG. 12, as in the parallel boost mode of power converter 10. Switching element S2 is turned on and off in response to control pulse signal SD1 whereas switching element S1 is turned on and off in response to control pulse signal /SD1. Similarly, switching element S4 is turned on and off in response to control pulse signal SD2 whereas switching element S3 is turned on and off in response to control pulse signal /SD2.

Switching element S5 is turned on and off in accordance with an exclusive logical sum (XOR) of control pulse signals SD1 and SD2.

Consequently, switching element S5 is turned off when the B1L arm and the B2L arm are turned on (FIG. 6) or when the B1U arm and the B2U arm are turned on (FIG. 7). Switching element S5 is turned on when the B1L arm and the B2U arm are turned on (FIG. 17 (a)) or when the B1U arm and the B2L arm are turned on (FIG. 17 (b)). Therefore, with power converter 11 as well, DC/DC conversion based on selective use of the first arm and the second arm as in power converter 10 can be carried out by switching among four switching patterns shown in FIG. 15.

Figure 32:
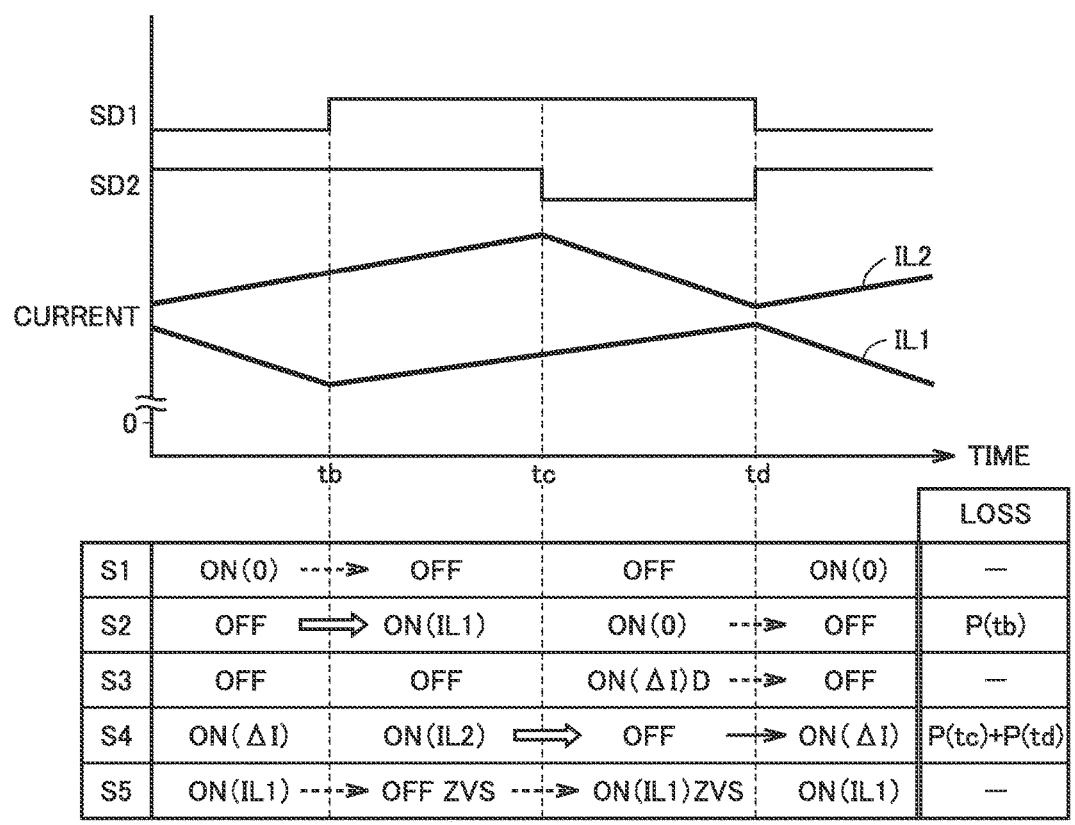
FIG. 32 is a waveform diagram (in power running) for illustrating a power loss in each switching element when current phase control as in FIG. 19 is applied to the power converter according to the third embodiment.

FIG. 32 shows a waveform diagram when current phase control as in FIG. 19 is applied to power converter 11. FIG. 32 also shows a current waveform when both of DC power supplies B1 and B2 perform the power running operation (IL1>0 and IL2>0) as in FIG. 19. Since the condition of |IL2|>|IL1| is satisfied, IL2 is defined as the high current and IL1 is defined as the low current.

Referring to FIG. 32, waveforms of control pulse signals SD1 and SD2 and waveforms of reactor currents IL1 and IL2 are the same as in FIG. 19. Behaviors of currents through switching elements S1 to S4 and switching losses therein are also the same as in FIG. 19.

Switching element S5 is turned off at time tb and turned on at time tc. In the circuit state before time tb, in the power running operation, there is no difference in potential across opposing ends of switching element S5 owing to diode D1 and switching element S4 in the on state. When switching element S5 is turned off from this state at time tb with on of switching element S4 being maintained, zero volt switching (ZVS) is achieved and no switching loss is produced.

Similarly, during the period from time tb to tc, in the power running operation, opposing ends of switching element S5 are set to the same potential through switching element S2 in the on state and diode D3. When switching element S5 is turned off from this state at time tc with on of switching element S2 being maintained, ZVS is achieved and hence no switching loss is produced.

Therefore, no switching loss is produced during the power running operation either in switching element S5 in power converter 11, as in switching elements S5a and S5b in power converter 10.

Figure 33:
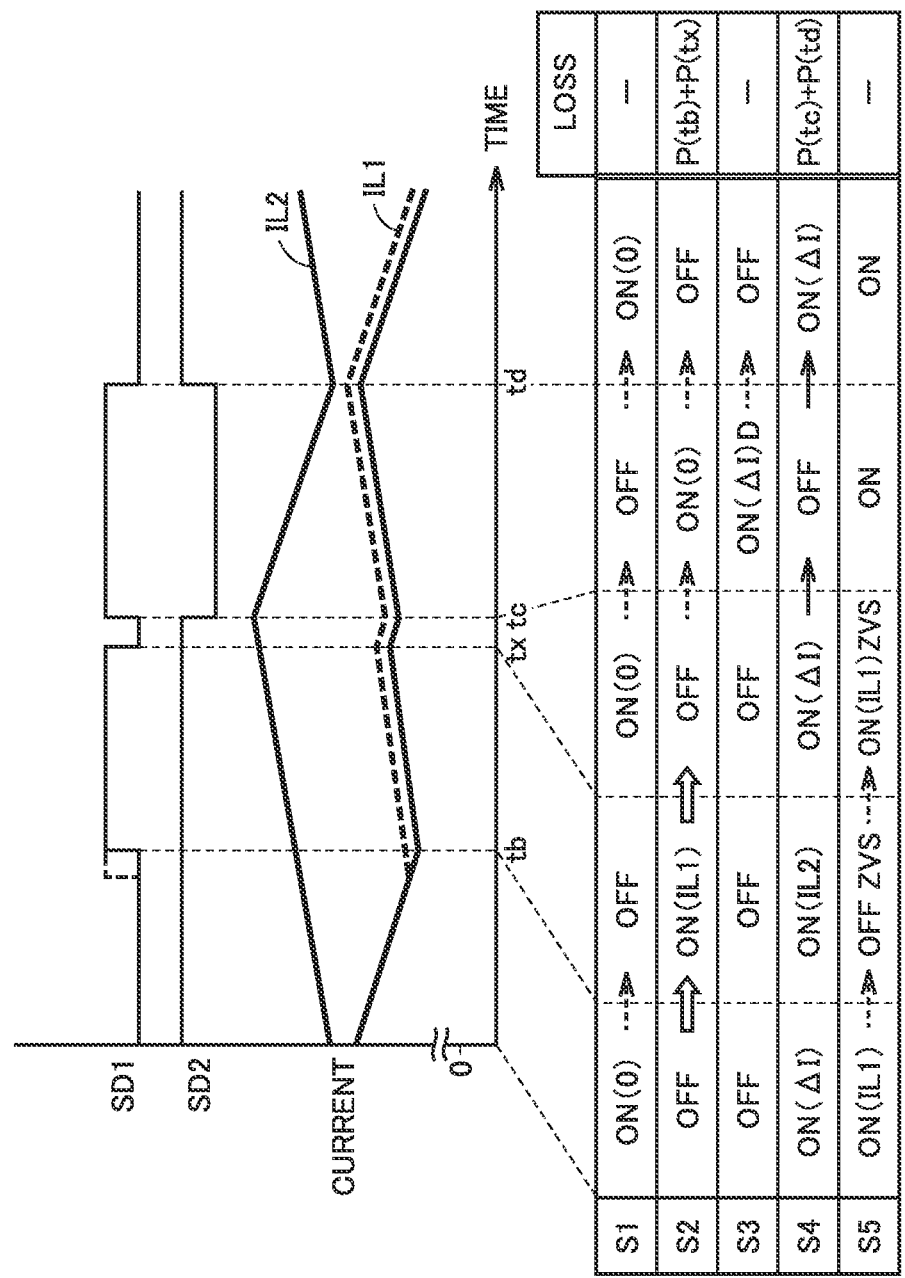
FIG. 33 is a waveform diagram (in power running) for illustrating a power loss in each switching element when switching control as in FIG. 20 is applied to the power converter according to the third embodiment.

FIG. 33 shows a waveform diagram when switching control to add an inflection point as in FIG. 20 is applied to power converter 11. FIG. 33 shows a waveform diagram in application of switching control according to the first embodiment to the circuit state the same as in FIG. 32. The condition of IL1>0, IL2>0, and |IL2|>|IL1| is satisfied again in FIG. 33.

Waveforms of control pulse signals SD1 and SD2 and waveforms of reactor currents IL1 and IL2 are the same as in FIG. 19. Behaviors of currents through switching elements S1 to S4 and switching losses therein are also the same as in FIG. 19. In FIG. 33 as well, switching element S5 is turned off and off as ZVS at times tb and tx as in FIG. 32. Therefore, a power loss in switching element S5 is the same between FIGS. 32 and 33.

Therefore, it can be understood from the discussion based on FIGS. 21 (a) and (b) that a difference in power loss among switching elements can be lessened without increase in power loss (switching loss) in all switching elements as compared with that in FIG. 32, by applying switching control to add an inflection point to the side of the low current (FIG. 33) also in power converter 11.

Though not illustrated in detail, when switching control to add an inflection point on the side of the high current is carried out also in power converter 11 as in FIG. 22, a switching loss in switching element S5 is equivalent to that in FIG. 32 (without addition of an inflection point). Since a switching loss in switching elements S1 to S4 is also the same as in FIG. 22, switching control to add an inflection point to the side of the high current leads to increase in switching loss in all switching elements and increase in difference in power loss among switching elements also in power converter 11.

Therefore, unevenness in power loss (switching loss) among switching elements can be lessened by adding an inflection point in synchronization with the side of the high current (IL2) to the side of the low current (IL1) when switching control to add an inflection point is applied also to power converter 11.

Switching control in an example in which both of DC power supplies B1 and B2 perform the regeneration operation in power converter 11 will now be described for the confirmation purpose.

Figure 34:
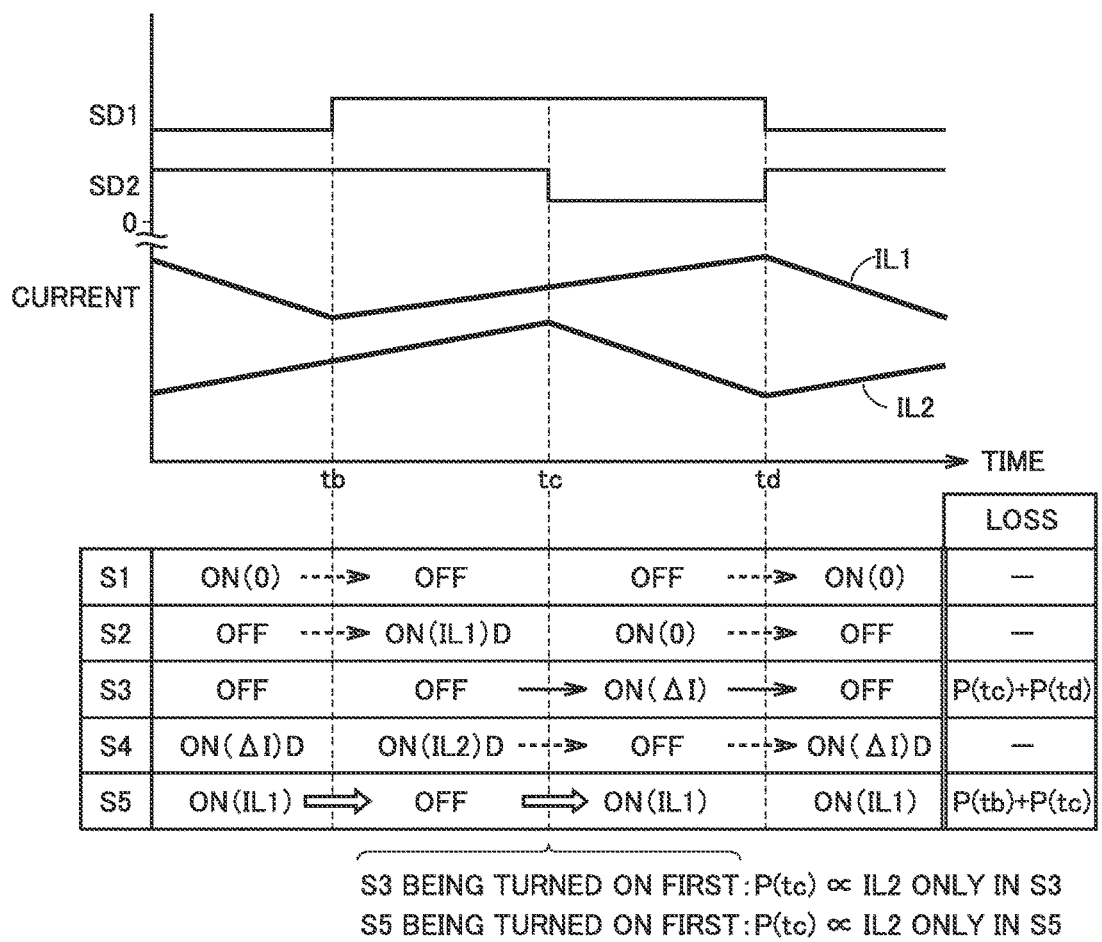
FIG. 34 is a waveform diagram (in regeneration) for illustrating a power loss in each switching element when current phase control as in FIG. 24 is applied to the power converter according to the third embodiment.

FIG. 34 shows a waveform diagram when current phase control as in FIG. 24 is applied to power converter 11. FIG. 34 also shows a current waveform in an example in which both of DC power supplies B1 and B2 perform the regeneration operation (IL1<0 and IL2<0) as in FIG. 24. Since the condition of |IL2|>|IL1| is satisfied, IL2 is defined as the high current and IL1 is defined as the low current.

Referring to FIG. 34, waveforms of control pulse signals SD1 and SD2 and waveforms of reactor currents IL1 and IL2 are the same as in FIG. 24. Behaviors of currents through switching elements S1 to S4 and switching losses therein are also the same as in FIG. 24.

Switching element S5 is also turned off at time tb and turned on at time tc similarly to switching element S5b in FIG. 24. In the regeneration operation, however, directions of IL1 and IL2 are reverse to those in the power running operation, and hence a path through diode D1 (time tb) and diode D3 (time tc) is not formed. Therefore, turn-off of switching element S5 at time tb is not turn-off as ZVS but a power loss (turn-off) due to hard switching of IL1 is produced. A power loss (turn-on) due to hard switching of IL1 is produced also by turn-on of switching element S5 at time tc.

The problem of a loss due to hard switching of IL2 in one switching element (which is earlier in turn-on) is caused also in power converter 11 as in power converter 10 when there is a time lag in actual turn-on between switching elements S3 and S5 at time tc at which turn-on commands are issued simultaneously to switching elements S3 and S5. When one of switching elements S3 and S5 is earlier in turn-on at time tc in a fixed manner due to an individual difference of an element or a drive circuit (not shown), an element greater in power loss (that is, an amount of heat generation) is fixed.

Figure 35:
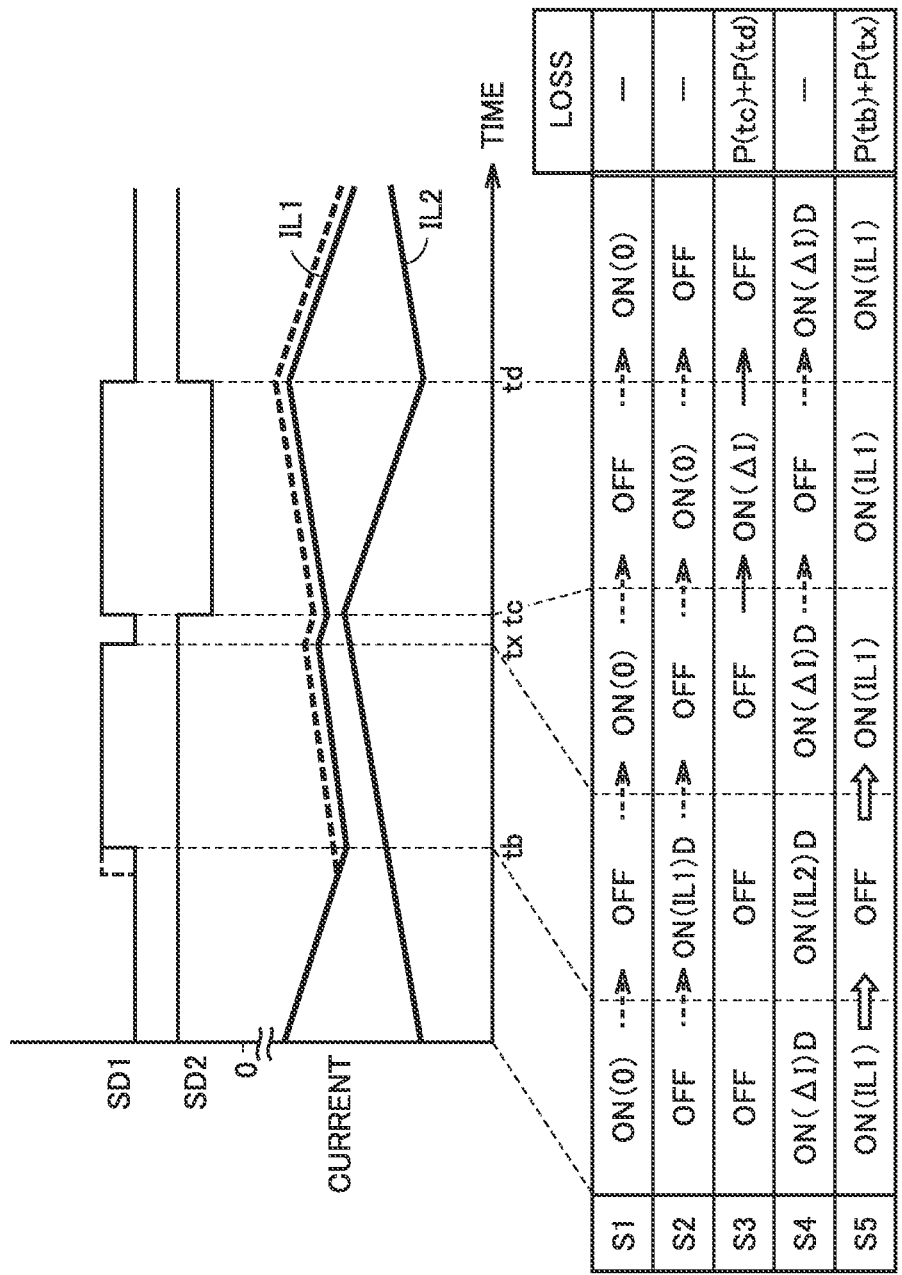
FIG. 35 is a waveform diagram (in regeneration) for illustrating a power loss in each switching element when switching control as in FIG. 26 is applied to the power converter according to the third embodiment.

FIG. 35 shows a waveform diagram in application of switching control to add an inflection point as in FIG. 26 to power converter 11. FIG. 35 shows a waveform diagram in application of switching control according to the first embodiment to a circuit state the same as in FIG. 34. The condition of IL1<0, IL2<0, and |IL2|>|IL1| is satisfied again in FIG. 35.

Waveforms of control pulse signals SD1 and SD2 and waveforms of reactor currents IL1 and IL2 are the same as in FIG. 26. Behaviors of currents through switching elements S1 to S4 and switching losses therein are also the same as in FIG. 26.

In switching element S5, power losses due to hard switching of IL1 are produced at times tb and tc. Since a current difference in IL1 between times tx and tc is small, a power loss in switching element S5 is substantially equivalent to that in FIG. 34. Therefore, a power loss in switching element S5 is equivalent between FIGS. 34 and 35.

The problem caused by a time lag in turn-on in FIG. 34 is avoided also in FIG. 35 as in FIG. 26 by turning on switching elements S5 and S3 stepwise at times tx and tc. An effect of prevention of increase in difference in power loss between switching elements S3 and S5 due to an individual difference of an element or a drive circuit (not shown) is achieved. Switching control to add an inflection point described in the first embodiment can thus be applied to the regeneration operation (IL1<0 and IL2<0) also in power converter 11.

Though not illustrated in detail, when switching control to add an inflection point is applied to the side of the high current in the regeneration operation of power converter 11, as in FIG. 27, a switching loss in all switching elements increases and a difference in power loss among switching elements increases as compared with switching control to add an inflection point to the side of the low current.

As described above, by applying also to power converter 11, switching control to add an inflection point in synchronization with the side of the high current (IL2) to the side of the low current (IL1) throughout the power running operation (IL1>0 and IL2>0) and the regeneration operation (IL1<0 and IL2<0), unevenness in power loss (switching loss) among the switching elements can be lessened.

When any one and the other of DC power supplies B1 and B2 perform any one and the other of the regeneration operation and the power running operation, respectively, in power converters 10 and 11, the current cancellation effect to generate a differential current is not obtained either in formation of the second arm as mentioned in the description with reference to FIGS. 17 (a) and (b). Therefore, in such an operation, even though switching control to add an inflection point is applied, an effect to suppress unevenness in switching loss is not obtained. Therefore, in consideration of increase in number of times of switching due to addition of an inflection point, preferably, such switching control is not applied.

[Fourth Embodiment]

An operation mode other than the parallel boost mode in power converters 10 and 11 will be described in a fourth embodiment. In particular, description will be given with a series boost mode effective for improvement in efficiency in a high-voltage region being focused on. In an operation mode other than the parallel boost mode described below, switching control described in the first to third embodiments cannot be applied. As will be clarified in the description below, however, energy stored in DC power supplies B1 and B2 can efficiently be made use of by selectively using a plurality of operation modes.

A circuit operation in the series boost mode of power converter 10 according to the first embodiment will initially be described in the fourth embodiment.

Referring again to FIG. 1, in power converter 10, switching elements S1 and S3 are turned off whereas switching element S5a or S5b is turned on, so that DC power supplies B1 and B2 connected in series can electrically be connected between power lines PL and GL.

In the series boost mode, DC/DC conversion between V[1]+V[2] (DC power supplies B1 and B2) and VH (power lines PL and GL) can be carried out by alternately forming a state that the lower arm is turned on for each of DC power supplies B1 and B2 and a state that the upper arm is turned on for DC power supplies B1 and B2 connected in series.

Figure 36:
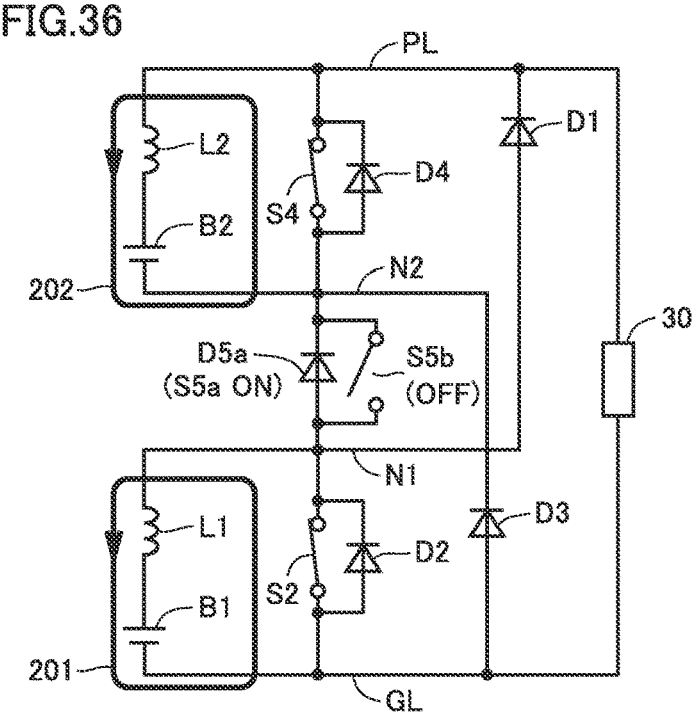
FIG. 36 is an equivalent circuit diagram (when the lower arm is on) of the power converter according to the first embodiment in a series boost mode according to a fourth embodiment.

FIG. 36 is an equivalent circuit diagram (when the lower arm is on) of power converter 10 in the series boost mode.

Referring to FIG. 36, a current path 201 and a current path 202 are formed by turning on switching elements S2 and S4 and turning off switching elements S1 and S3. Each equivalent circuit diagram in the fourth embodiment does not show switching elements S1 and S3 fixed to off in the series boost mode.

Energy is stored in reactor L1 with an output from DC power supply B1 through current path 201. Similarly, energy is stored in reactor L2 with an output from DC power supply B2 through current path 202. In FIG. 36, switching elements S2 and S4 in the on state correspond to the lower arm of the boost chopper circuit for both of DC power supplies B1 and B2 in the series boost mode.

In the circuit state in FIG. 36, when a current path in the direction from node N2 to node N1 is formed, a short-circuiting path from power line PL to power line GL is formed. Therefore, during the on period of the lower arm, switching element S5b should be turned off.

Figure 37:
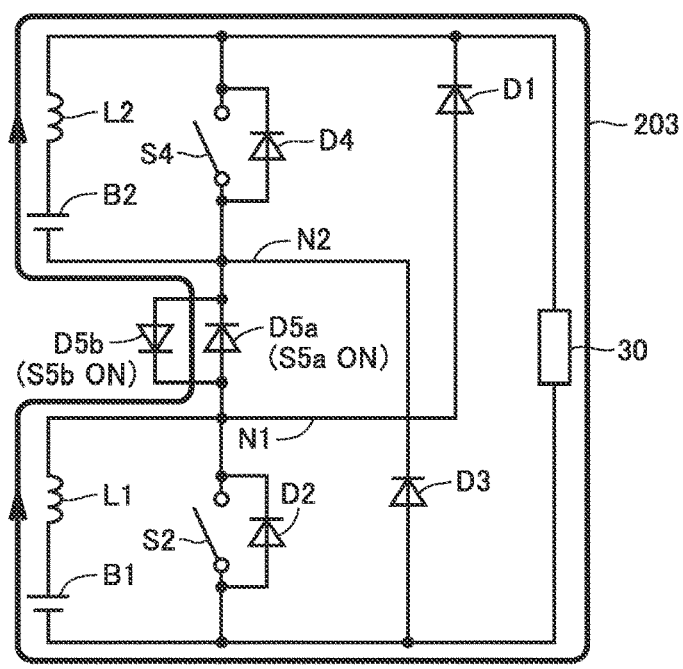
FIG. 37 is an equivalent circuit diagram (when the upper arm is on) of the power converter according to the first embodiment in the series boost mode according to the fourth embodiment.

FIG. 37 is an equivalent circuit diagram (when the upper arm is on) of power converter 10 in the series boost mode.

Referring to FIG. 37, a current path 203 is formed by turning off switching elements S1 to S4 and turning on switching element S5a. The sum of energy resulting from an output voltage from DC power supplies B1 and B2 connected in series and energy stored in reactors L1 and L2 is output across power lines PL and GL through current path 203. Consequently, a state that upper-arm elements in the boost chopper circuit are turned on is formed for DC power supplies B1 and B2 connected in series.

By turning on switching element S5b, DC power supplies B1 and B2 connected in series can be charged with a current in a direction opposite to current path 203. Therefore, adaptation to the regeneration operation of DC power supplies B1 and B2 can also be made. In the series boost mode, switching elements S5a and S5b correspond to the upper arm of the boost chopper circuit.

Figures 38, 39:
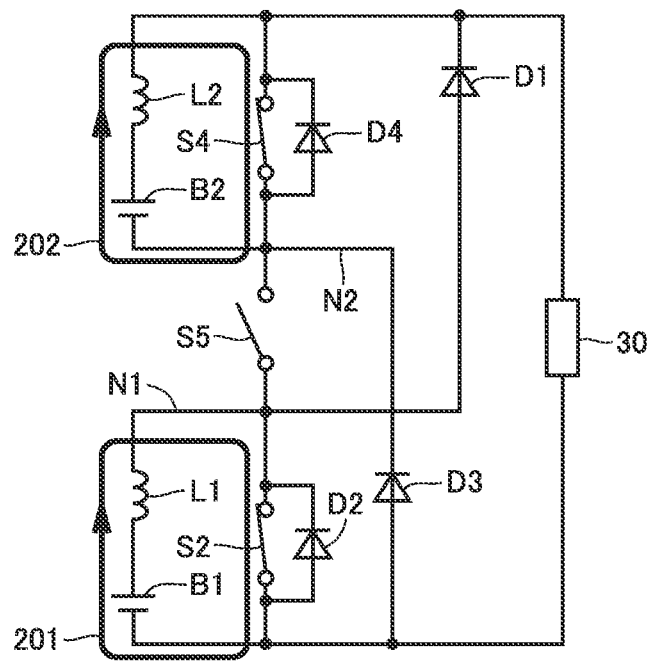
FIG. 38 is a chart showing a list of gate Boolean expressions for controlling on and off of each switching element in the series boost mode of the power converter according to the first embodiment.
FIG. 39 is an equivalent circuit diagram (when the lower arm is on) of the power converter according to the third embodiment in the series boost mode according to the fourth embodiment.

FIG. 38 shows gate Boolean expressions for controlling on and off of each of switching elements S1 to S5a and S5b in the series boost mode of power converter 10.

Referring to FIG. 38, in the series boost mode, a current which flows through DC power supplies B1 and B2 connected in series is common, and hence outputs from DC power supplies B1 and B2 cannot separately be controlled as in the parallel boost mode. Therefore, one boost chopper circuit is equivalently formed for a voltage V[1]+V[2].

Therefore, control pulse signal SD for duty control is common between DC power supplies B1 and B2.

In the series boost mode, switching elements S2 and S4 forming the lower arm are turned on and off in common in response to control pulse signal SD. Switching element S5b forming the upper arm is turned on and off in response to control pulse signal /SD (an inverted signal of SD). A pair of switching elements S2 and S4 forming the lower arm and switching element S5b forming the upper arm are complementarily turned on and off.

As shown in FIGS. 36 and 37, switching elements S1 and S3 are fixed to off in the series boost mode. Switching element S5a can be fixed to on throughout the on period of the lower arm and the on period of the upper arm.

Control pulse signal SD in FIG. 38 can be generated in PWM control in which duty ratio DT is compared with carrier wave CW1 or CW2 in the series boost mode. Duty ratio DT corresponds to a ratio of a period of on of the lower arm to a switching period (one cycle of a carrier wave) in the boost chopper circuit including switching elements S2 and S4 as the lower arm and including switching elements S5a and S5b as the upper arm.

In the boost chopper circuit in the series boost mode, in the expression (1), Vi is defined as Vi=V[1]+V[2]. In the series boost mode, an expression (2) below is satisfied among duty ratio DT, voltages V[1] and V[2] of DC power supplies B1 and B2, and output voltage VH.

$$VH = 1/(1-DT) \cdot (V[1]+V[2]) \qquad (2)$$

Therefore, a theoretical value of duty ratio DT for voltage command value VH* is shown in an expression (3) below.

$$DT = 1.0 - (V[1]+V[2])/VH^* \qquad (3)$$

For example, duty ratio DT can be calculated by modifying the theoretical value in the expression (3) with feedback control of a voltage deviation ΔVH from voltage command value VH* as in FIG. 13.

By thus applying the series boost mode to power converter 10, output voltage VH can be controlled in accordance with voltage command value VH* through DC/DC conversion for boosting V[1]+V[2] to output voltage VH. Thus, a power loss mainly in reactors L1 and L2 can be suppressed as in the series connection mode in PTD 2 by suppressing a boost ratio (VH/(V[1]+V[2])). Specifically, as reactors L1 and L2 are connected in series and thus a gradient of variation in reactor currents IL1 and IL2 is suppressed, amplitude of ripples is smaller. Thus, an iron loss caused in cores (not shown) of reactors L1 and L2 and an AC loss caused in a coil winding (not shown) can be reduced. Consequently, DC/DC conversion in power converter 10 can be higher in efficiency in a high-voltage region (VH>V[1]+V[2]).

A circuit operation in the series boost mode of power converter 11 according to the third embodiment will now be described.

Figures 40, 41:
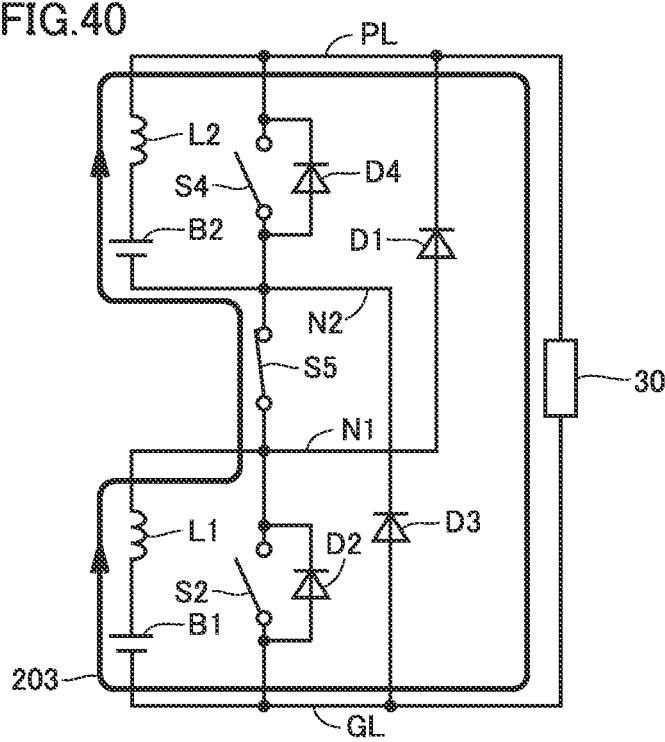
FIG. 40 is an equivalent circuit diagram (when the upper arm is on) of the power converter according to the third embodiment in the series boost mode according to the fourth embodiment.
FIG. 41 is a chart showing a list of gate Boolean expressions for controlling on and off of each switching element in the series boost mode of the power converter according to the third embodiment.

FIG. 39 is an equivalent circuit diagram (when the lower arm is on) of power converter 11 in the series boost mode and FIG. 40 is an equivalent circuit diagram (when the upper arm is on) of power converter 11 in the series boost mode.

Referring to FIG. 39, current path 201 and current path 202 as in FIG. 36 are formed by turning on switching elements S2 and S4 and turning off switching elements S1 and S3. Switching elements S2 and S4 correspond to the lower arm of the boost chopper circuit in the series boost mode also in power converter 11. During the on period of the lower arm, on the other hand, in order to cut off the current path from node N2 toward node N1, switching element S5 should be turned off.

Referring to FIG. 40, current path 203 as in FIG. 37 can be formed by turning off switching elements S1 to S4 and turning on switching element S5. By turning on switching element S5, a regenerative current in a direction opposite to current path 203 can also be addressed. Switching element S5 thus corresponds to the upper arm of the boost chopper circuit in the series boost mode.

FIG. 41 shows gate Boolean expressions for controlling on and off of each of switching elements S1 to S5 in the series boost mode of power converter 11.

Referring to FIG. 41, on and off of switching elements S1 to S4 is controlled in accordance with the gate Boolean expressions as in FIG. 38 as in the series boost mode of power converter 10. Switching elements S2 and S4 are turned on and off in response to control pulse signal SD whereas switching elements S1 and S3 are fixed to off throughout the on period of the lower arm and the on period of the upper arm. Switching element S5 is turned on and off in response to control pulse signal /SD (the inverted signal of SD) similarly to switching element S5b in FIG. 38. A pair of switching elements S2 and S4 forming the lower arm and switching element S5 forming the upper arm are thus complementarily turned on and off.

Therefore, the series boost mode can be applied also to power converter 11. Consequently, DC/DC conversion in power converter 11 can be higher in efficiency in the high-voltage region (VH>V[1]+V[2]).

An operation mode other than the parallel boost mode and the series boost mode in power converters 10 and 11 will further be described.

FIG. 42 is a chart showing a list of a plurality of operation modes applied to power converters 10 and 11.

Referring to FIG. 42, the plurality of operation modes are broadly categorized into a "boost mode" in which output voltage VH is controlled in accordance with voltage command value VH* and a "direct coupling mode" in which on and off of switching elements S1 to S5 (S5a and S5b) is fixed and DC power supply (power supplies) B1 and/or B2 are/is electrically connected to power lines PL and GL.

The boost mode includes the parallel boost mode and the series boost mode described above. In the parallel boost mode, by controlling on and off of switching elements S1 to S5a and S5b of power converter 10 in accordance with the gate Boolean expressions shown in FIG. 12, DC/DC conversion can be carried out in parallel between DC power supplies B1 and B2 and power lines PL and GL (load 30). Similarly, by controlling on and off of switching elements S1 to S5a and S5b of power converter 11 in accordance with the gate Boolean expressions shown in FIG. 31, DC/DC conversion can be carried out in parallel between DC power supplies B1 and B2 and power lines PL and GL (load 30). In the parallel boost mode, output voltage VH can be controlled in accordance with voltage command value VH* while a ratio of power allocation between DC power supplies B1 and B2 is controlled.

In the series boost mode, by controlling on and off of switching elements S1 to S5a and S5b of power converter 10 in accordance with the Boolean expressions shown in FIG. 38, DC/DC conversion can be carried out while DC power supplies B1 and B2 are connected in series. Similarly, by controlling on and off of switching elements S1 to S5 of power converter 11 in accordance with the Boolean expressions shown in FIG. 41, DC/DC conversion can be carried out while DC power supplies B1 and B2 are connected in series.

In the series boost mode, since a ratio of power allocation between DC power supplies B1 and B2 is automatically determined by a ratio between voltages V[1] and V[2] in control of output voltage VH in accordance with voltage command value VH*, direct control as in the parallel boost mode cannot be carried out.

Though the series boost mode can be adapted only to a high-voltage range expressed as VH>(V[1]+V[2]), a boost ratio in the high-voltage range can be lowered and hence DC/DC conversion can be high in efficiency.

The parallel boost mode can be adapted also to a voltage range expressed as VH≤V[1]+V[2] and hence an output voltage range is wide. Furthermore, by applying switching control to add an inflection point to the reactor current on the side of the low current described in the first to third embodiments, a difference in amount of heat generation among switching elements, that is, a temperature difference, can be suppressed. Since a ratio of power allocation between DC power supplies B1 and B2 can be controlled, a state of charge (SOC) of each of DC power supplies B1 and B2 can also be controlled.

Furthermore, the boost mode includes a "mode of boost by DC power supply B1 (hereinafter a B1 boost mode)" in which only DC power supply B1 is used to carry out DC/DC conversion between the DC power supply and power lines PL and GL (load 30) and a "mode of boost by DC power supply B2 (hereinafter a B2 boost mode)" in which only DC power supply B2 is used to carry out DC/DC conversion between the DC power supply and power lines PL and GL (load 30). In an operation mode other than the parallel boost mode and the series boost mode, an operation for turning on and off each of switching elements S5a and S5b of power converter 10 is common to an operation for turning on and off switching element S5 of power converter 11.

In the B1 boost mode, so long as output voltage VH is controlled to be higher than V[2], DC power supply B2 is not used, with a state electrically disconnected from power line PL being maintained. In the B1 boost mode, only the boost chopper circuit (the first arm) for DC power supply B1 is implemented. Therefore, switching elements S3 and S4 are fixed to off while the current path between nodes N1 and N2 is cut off by fixing switching element S5 (S5a and S5b) to off, while on and off of switching elements S1 and S2 is controlled in response to respective control pulse signals /SD1 and SD1 based on duty ratio DT1 for controlling an output from DC power supply B1.

Similarly, in the B2 boost mode, so long as output voltage VH is controlled to be higher than V[1], DC power supply B1 is not used, with a state electrically disconnected from power line PL being maintained.

In the B2 boost mode, only the boost chopper circuit (the first arm) for DC power supply B2 is implemented. Therefore, switching elements S1 and S2 are fixed to off while the current path between nodes N1 and N2 is cut off by fixing switching element S5 (S5a and S5b) to off, while on and off of switching elements S3 and S4 is controlled in response to respective control pulse signals /SD2 and SD2 based on duty ratio DT2 for controlling an output from DC power supply B2. In the B1 boost mode and the B2 boost mode, duty ratio DT1 or DT2 is calculated so as to control output voltage VH in accordance with voltage command value VH* (voltage control). Thus, in each of the operation modes belonging to the boost mode, output voltage VH is controlled in accordance with voltage command value VH*.

On the other hand, the direct coupling mode includes a "mode of direct coupling of DC power supply B1 (hereinafter a B1 direct coupling mode)" in which a current path to power lines PL and GL is formed only for DC power supply B1 and a "mode of direct coupling of DC power supply B2 (hereinafter a B2 direct coupling mode)" in which a current path to power lines PL and GL is formed only for DC power supply B2.

In the B1 direct coupling mode, switching element S1 is fixed to on while a current path between nodes N1 and N2 is cut off by fixing switching element S5 (S5a and S5b) to off, while switching elements S2 to S4 are fixed to off. Thus, since DC power supply B2 is disconnected between power lines PL and GL, output voltage VH is comparable to voltage V[1] of DC power supply B1 (VH=V[1]). In the B1 direct coupling mode, DC power supply B2 is not used, with a state electrically disconnected between power lines PL and GL being maintained. If the B1 direct coupling mode is applied in the state of V[2]>V[1], a short-circuiting current is produced from DC power supply B2 to DC power supply B1 via switching element S1 and diode D3. Therefore, a condition of V[1]>V[2] is required for application of the B1 direct coupling mode.

Similarly, in the B2 direct coupling mode, switching element S3 is fixed to on while a current path between nodes N1 and N2 is cut off by fixing switching element S5 (S5a and S5b) to off, while switching elements S1, S2, and S4 are fixed to off. Thus, since DC power supply B1 is disconnected between power lines PL and GL, output voltage VH is comparable to voltage V[2] of DC power supply B2 (VH=V[2]). In the B2 direct coupling mode, DC power supply B1 is not used, with a state electrically disconnected between power lines PL and GL being maintained. If the B2 direct coupling mode is applied in the state of V[1]>V[2], a short-circuiting current will be produced from DC power supply B1 to DC power supply B2 via diode D1 and switching element S3. Therefore, a condition of V[2]>V[1] is required for application of the B2 direct coupling mode.

When V[1] and V[2] are comparable to each other, a "parallel direct coupling mode" in which a state that DC power supplies B1 and B2 are electrically connected in parallel between power lines PL and GL is maintained can also be selected. In the parallel direct coupling mode, switching elements S1 and S3 are fixed to on while the current path between nodes N1 and N2 is cut off by fixing switching element S5 (S5a and S5b) to off, while switching elements S2 and S4 are fixed to off. Thus, output voltage VH is comparable to V[1] and V[2]. Since a voltage difference between V[1] and V[2] produces a short-circuiting current between DC power supplies B1 and B2, the parallel direct coupling mode can be applied only when the voltage difference is small.

Furthermore, the direct coupling mode includes a "series direct coupling mode" in which a state that DC power supplies B1 and B2 are electrically connected in series between power lines PL and GL is maintained. In the series direct coupling mode, switching elements S1 to S4 are fixed to off while the current path between nodes N1 and N2 is formed by fixing switching element S5 (S5a and S5b) to on. Thus, output voltage VH is comparable to the sum of voltages V[1] and V[2] of DC power supplies B1 and B2 (VH=V[1]+V[2]).

Since output voltage VH is determined depending on voltages V[1] and V[2] of DC power supplies B1 and B2 in each of the operation modes included in the direct coupling mode, the output voltage cannot directly be controlled. Therefore, since output voltage VH cannot be set to a voltage suitable for an operation of load 30 in each operation mode included in the direct coupling mode, a power loss in load 30 may increase.

On the other hand, since each of switching elements S1 to S5 (S5a and S5b) is not turned on and off in the direct coupling mode, a power loss (a switching loss involved with turning on and off) in power converters 10 and 11 is suppressed. Therefore, depending on an operation state of load 30, a power loss in power supply system 5 as a whole may be suppressed by application of the direct coupling mode, because an amount of reduction in power loss in power converters 10 and 11 is greater than an amount of increase in power loss in load 30.

Thus, power converters 10 and 11 can control output voltage VH while a plurality of operation modes shown in FIG. 42 are selectively applied by switching a switching pattern of switching elements S1 to S5 (S5a and S5b). In an operation mode other than the parallel boost mode, switching control described in the first to third embodiments cannot be applied. By selectively using a plurality of operation modes including the parallel boost mode depending on a state (SOC and a temperature) of DC power supplies B1 and B2 and a voltage region of voltage command value VH* (in particular, relation of magnitude as compared with V[1]+V[2]), however, energy stored in DC power supplies B1 and B2 can efficiently be made use of.

[Further Modification of Configuration of Power Converter]

In the present embodiment, an example in which "first semiconductor element SM1" to "fourth semiconductor element SM4" are implemented by pairs of switching elements S1 to S4 and anti-parallel diodes D1 to D4, respectively, has been described. In addition, an example in which "fifth semiconductor element SM5" is implemented by switching element S5 in which no anti-parallel diode is provided (the third embodiment) or by a pair of switching elements S5a and S5b for implementing a bidirectional switch (the first embodiment) has been shown. Namely, a configuration in which "first semiconductor element SM1" to "fifth semiconductor element SM5" each include a switching element which can control formation (on) and cut-off (off) of a current path has been exemplified. In such a configuration example, regenerative charging can be applied to both of DC power supplies B1 and B2.

In a configuration in which one or neither of DC power supplies B1 and B2 is regeneratively charged, however, some of "first semiconductor element SM1" to "fourth semiconductor element SM4" can be simplified in structure by omitting either a switching element or a diode. Namely, such a configuration that only some of "first semiconductor element SM1" to "fifth semiconductor element SM5" have switching elements is also possible in principle.

Figure 43:
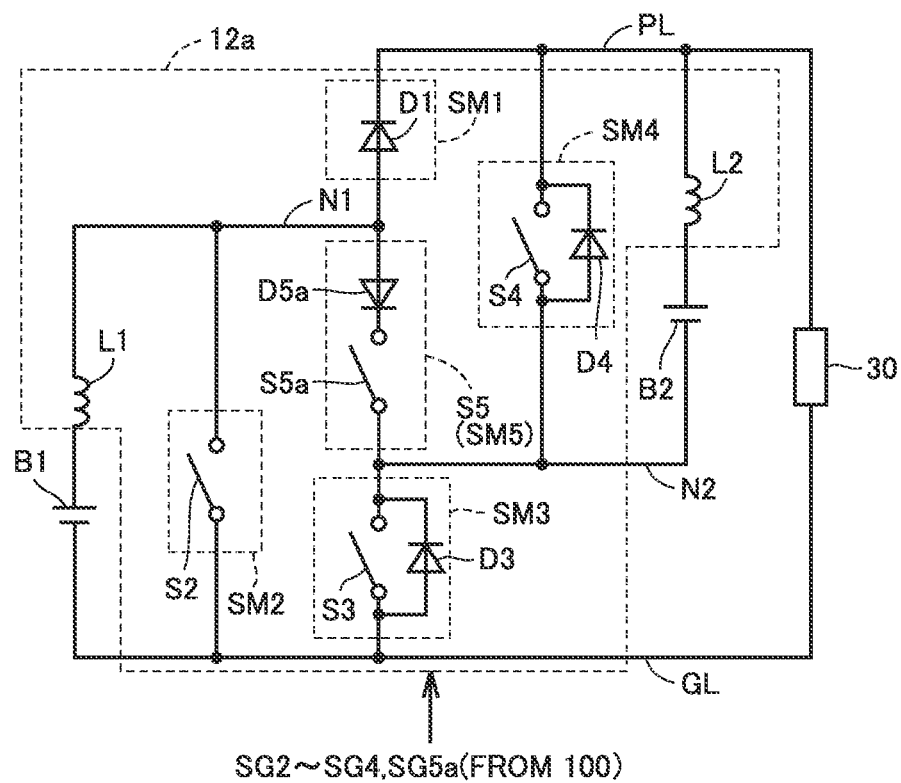
FIG. 43 is a circuit diagram showing a modification of the configuration of the power converter shown in FIG. 1 when a first DC power supply is not regeneratively charged.

For example, when DC power supply B1 is not regeneratively charged but used only for discharging (power running), a configuration of a power converter 12a shown in FIG. 43 can be employed instead of power converter 10 shown in FIG. 1.

Referring to FIG. 43, in power converter 12a, arrangement of switching element S1 for controlling regeneration to DC power supply B1 can be omitted as compared with power converter 10 shown in FIG. 1. Namely, "first semiconductor element SM1" between node N1 and power line PL can be implemented only by diode D1.

In power converter 10 in FIG. 1, in the series boost mode, if any one of DC power supplies B1 and B2 is unable to regenerate, the operation is limited to the power running operation and hence switching element S5b does not have to be provided. In the parallel boost mode as well, for example, if neither of DC power supplies B1 and B2 can regenerate and the operation is limited to the power running operation, a current is not generated in a direction of passage through switching element S5b. As shown in FIG. 42, a current flows through switching element S5 (switching elements S5a and S5b) in none of the B1 boost mode, the B2 boost mode, the B1 direct coupling mode, and the B2 direct coupling mode.

Therefore, when any one of DC power supplies B1 and B2 is incapable of regenerative charging in power converter 10 (FIG. 1) in the first embodiment, a current path from node N2 toward node N1 is unnecessary at all times and hence switching element S5b and diode D5b do not have to be provided. "Fifth semiconductor element SM5" can also be configured to have only a function to turn on and off a current path from node N1 toward node N2. Furthermore, in power converter 12a, diode D2 arranged mainly for securing a path for a regenerative current to DC power supply B1 can also be omitted.

Figure 44:
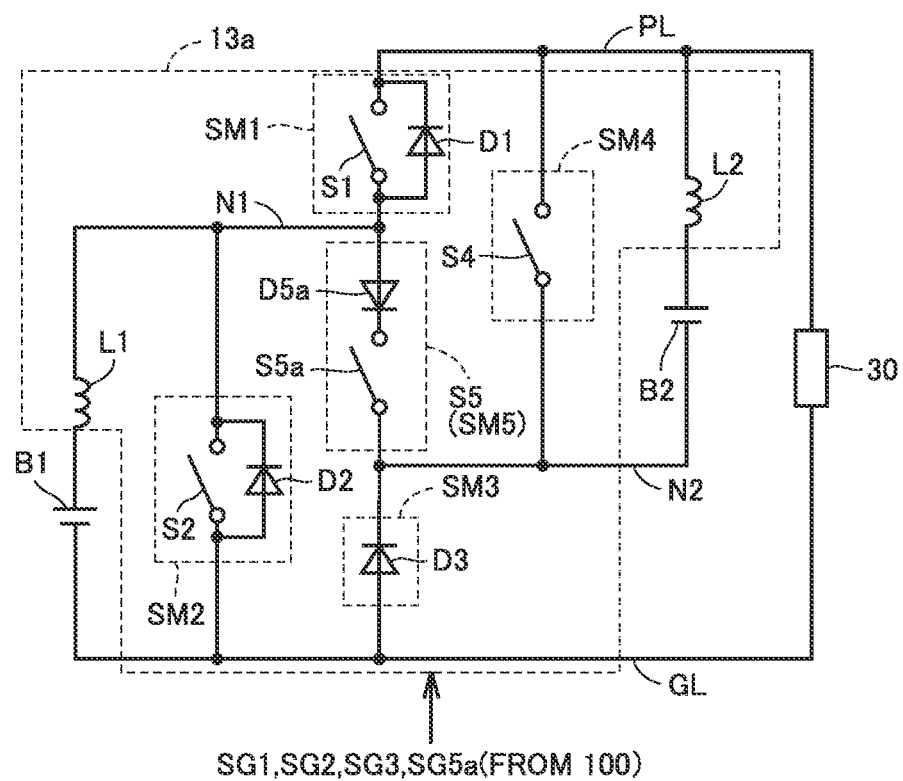
FIG. 44 is a circuit diagram showing a modification of the configuration of the power converter shown in FIG. 1 when a second DC power supply is not regeneratively charged.

Similarly, when DC power supply B2 is not regeneratively charged but used only for discharging (power running), a configuration of a power converter 13a shown in FIG. 44 can be employed.

Referring to FIG. 44, in power converter 13a, arrangement of switching element S3 for controlling regeneration to DC power supply B2 can be omitted as compared with power converter 10 shown in FIG. 1. Namely, "third semiconductor element SM3" between node N2 and power line GL can be implemented only by diode D3. Switching element S5b does not have to be arranged as in power converter 12a (FIG. 43). Furthermore, in power converter 13a, diode D4 arranged mainly for securing a path for a regenerative current to DC power supply B2 can also be omitted.

Figure 45:
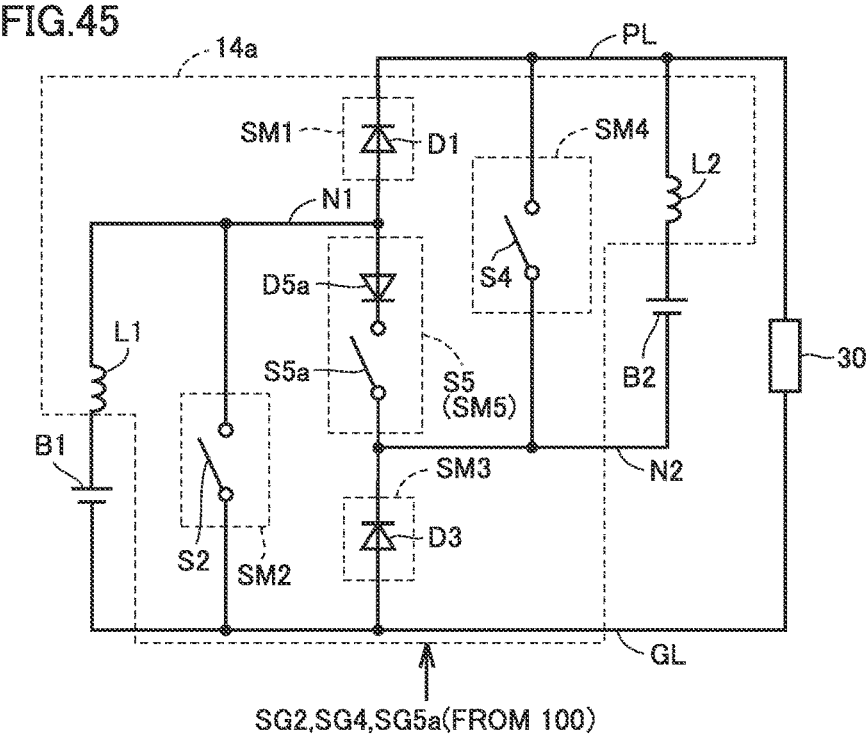
FIG. 45 is a circuit diagram showing a modification of the configuration of the power converter shown in FIG. 1 when the first and second DC power supplies are not regeneratively charged.

When neither of DC power supplies B1 and B2 is regeneratively charged but they are used only for discharging (power running), a configuration of a power converter 14a shown in FIG. 45 can be employed.

Referring to FIG. 45, in power converter 14a, arrangement of switching elements S1 and S3 for controlling regeneration to DC power supplies B1 and B2 can be omitted as compared with power converter 10 shown in FIG. 1. Namely, "first semiconductor element SM1" between node N1 and power line PL can be implemented only by diode D1 and "third semiconductor element SM3" between node N2 and power line GL can be implemented only by diode D3. Switching element S5b does not have to be arranged as in power converters 12a (FIG. 43) and 13a (FIG. 44). In power converter 14a, diodes D2 and D4 arranged mainly for securing a path for a regenerative current to DC power supplies B1 and B2 can also be omitted.

In each of power converters 12a to 14a as well, on and off of switching elements S2 to S5a is controlled in accordance with FIG. 12 (the parallel boost mode), FIG. 38 (the series boost mode), or FIG. 42 (other modes).

Similar modification to the circuit configuration is also applicable to power converter 11 according to the third embodiment. For example, when DC power supply B1 is not regeneratively charged but used only for discharging (power running), a configuration of a power converter 12b shown in FIG. 46 can be employed instead of power converter 11 shown in FIG. 30.

Figure 46:
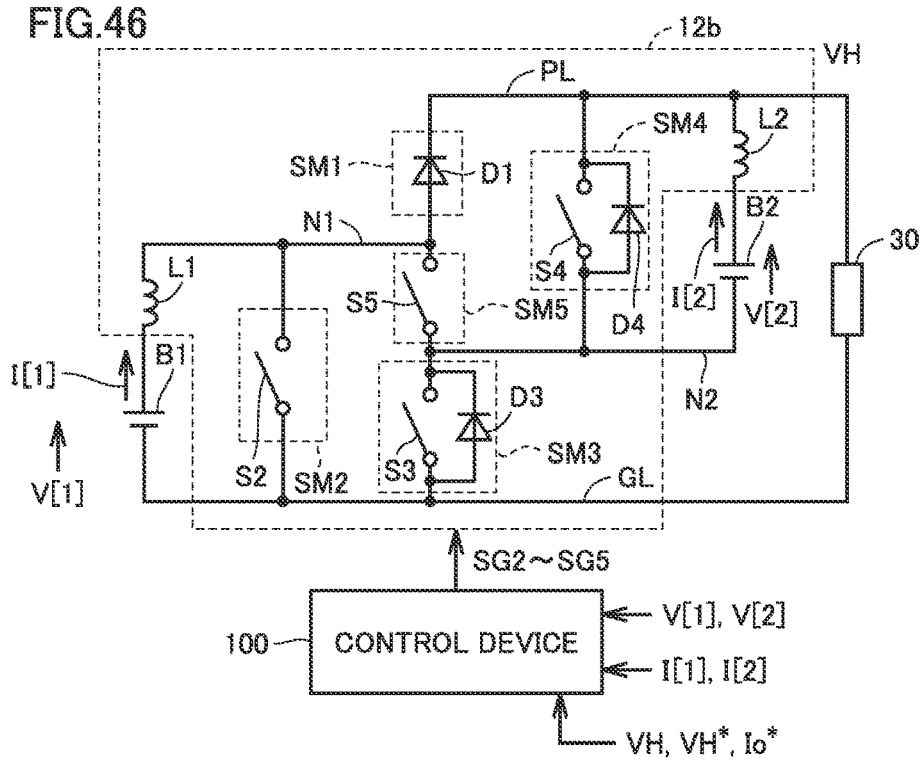
FIG. 46 is a circuit diagram showing a modification of the configuration of the power converter shown in FIG. 30 when the first DC power supply is not regeneratively charged.

Referring to FIG. 46, in power converter 12b, arrangement of switching element S1 for controlling regeneration to DC power supply B1 can be omitted as compared with power converter 11 shown in FIG. 30. "First semiconductor element SM1" between node N1 and power line PL can be implemented only by diode D1. In power converter 12b, diode D2 arranged mainly for securing a path for a regenerative current to DC power supply B1 can also be omitted.

Similarly, when DC power supply B2 is not regeneratively charged but used only for discharging (power running), a configuration of a power converter 13b shown in FIG. 47 can be employed.

Referring to FIG. 47, in power converter 13b, arrangement of switching element S3 for controlling regeneration to DC power supply B2 may be omitted as compared with power converter 11 shown in FIG. 30. "Third semiconductor element SM3" between node N2 and power line GL can be implemented only by diode D3. In power converter 13b, diode D4 arranged mainly for securing a path for a regenerative current to DC power supply B2 can also be omitted.

When neither of DC power supplies B1 and B2 is regeneratively charged but they are used only for discharging (power running), a configuration of a power converter 14b shown in FIG. 48 can be employed.

Referring to FIG. 48, in power converter 14b, arrangement of switching elements S1 and S3 for controlling regeneration to DC power supplies B1 and B2 can be omitted as compared with power converter 11 shown in FIG. 30. "First semiconductor element SM1" between node N1 and power line PL can be implemented only by diode D1 and "third semiconductor element SM3" between node N2 and power line GL can be implemented only by diode D3. In power converter 14a, diodes D2 and D4 arranged mainly for securing paths for regenerative currents to DC power supplies B1 and B2 can also be omitted.

In each of power converters 12b to 14b as well, on and off of switching elements S1, S2, S4, and S5 is controlled in accordance with FIG. 38 (the parallel boost mode), FIG. 41 (the series boost mode), or FIG. 42 (other modes).

In each of power converters 12a to 14a and 12b to 14b, on and off of switching elements S2 and S4 is controlled for the power running operation of DC power supplies B1 and B2. Therefore, by applying switching control to add an inflection point to a reactor current on the side of the low current described in the first embodiment, a difference in power loss between switching elements S2 and S4 can be suppressed and an amount of heat generation can be made uniform. By applying switching control described in the second embodiment, a difference in temperature between switching elements S2 and S4 can be suppressed.

By further providing switching element S1 in "first semiconductor element SM1" in the configuration of power converter 14a (FIG. 45) and power converter 14b (FIG. 48), DC power supply B1 can regeneratively be charged (FIGS. 44 and 47). In this case, as shown also in FIGS. 44 and 47, diode D2 is preferably connected in anti-parallel to switching element S2. By further providing switching element S3 in "third semiconductor element SM3" in the configuration of power converter 14a (FIG. 45) and power converter 14b (FIG. 48), DC power supply B2 can regeneratively be charged (FIGS. 43 and 46). In this case, as shown also in FIGS. 43 and 46, diode D4 is preferably connected in anti-parallel to switching element S4.

Regenerative charging can be applied to both of DC power supplies B1 and B2 by implementing each of "first semiconductor element SM1" to "fourth semiconductor element SM4" with a set of a switching element and a diode and having "fifth semiconductor element SM5" have a function to cut off a bidirectional current (a current from node N1 toward node N2 and a current from node N2 toward node N1) as in power converter 10 (FIG. 1) or power converter 11 (FIG. 43).

Though connection relation of switching elements S1 to S5 (S5a and S5b) and reactors L1 and L2 in the configuration of power converters 10 and 11 has been illustrated and described in the present embodiment, it is not intended to limit constituent elements of power converters 10 and 11 to these elements. Namely, in the present embodiment, the description constituent elements "being electrically connected" to each other encompasses the fact that other circuit elements or connector terminals are present between constituent elements and electrical connection between constituent elements is ensured via other circuit elements.

For example, when the configuration exemplified in FIG. 1 or 30 is configured such that a circuit portion (switching elements S3 to S5 (S5a and S5b)), diodes D3 and D4, reactor L2, and DC power supply B2 which remains in a general boost chopper circuit constituted of DC power supply B1, reactor L1, switching elements S1 and S2, and diodes D1 and D2 is made up as a separate unit and the unit is electrically connected to the boost chopper circuit through a connector terminal as well, the power converter and the power supply system according to the present embodiment are implemented so long as electrical connection relation among illustrated circuit elements is the same.

It is noted for confirmation purpose that load 30 can be implemented by any device in the present embodiment so long as the device operates with a DC voltage (output voltage VH). Namely, though an example in which load 30 is configured to include a traction motor of an electrically powered vehicle has been described in the present embodiment, application of the present invention is not limited to such a load. It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5 power supply system; 10, 11, 12a, 12b, 13a, 13b, 14a, 14b power converter; 30 load; 32 inverter; 35 motor generator; 36 power train; 37 drive wheel; 100 control device; 210, 220 controller; 230 PWM control unit; 240 carrier wave generation portion; 250 converter control unit; 252, 254 subtraction portion; B1, B2, PS DC power supply; CD1, CD2 transition condition; CH smoothing capacitor; CHP boost chopper circuit; CW, CW1, CW2 carrier wave; D1-D4, D5a, D5b, D1, Du diode; DT, DT1, DT2x, DT2 duty ratio; GL, PL power line; IL, ILL IL2 reactor current; L, L1, L2 reactor; N1, N2 node; S1-S5, S5a, S5b power semiconductor switching element; SD, SD1, SD2 control pulse signal; SG1-SG5, SG5a, SG5b, SG5 control signal (switching element); To switching period; Tx duration of inverted period; VH DC voltage (output voltage); and VH* voltage command value

The invention claimed is:

1. A power supply system which controls a DC voltage between a first power line on a high voltage side and a second power line on a low voltage side, comprising:
a first DC power supply;
a second DC power supply;
a power converter which carries out DC voltage conversion between the first and second DC power supplies and the first and second power lines; and
a control device which controls an operation of the power converter,
the power converter including a first semiconductor element electrically connected between the first power line and a first node,
a first reactor electrically connected in series with the first DC power supply, between the first node and the second power line,
a second semiconductor element electrically connected between the second power line and the first node,
a second reactor electrically connected in series with the second DC power supply, between a second node and the first power line,
a third semiconductor element electrically connected between the second node and the second power line,
a fourth semiconductor element electrically connected between the first power line and the second node, and
a fifth semiconductor element electrically connected between the first node and the second node,
at least some of the first to fifth semiconductor elements each including a switching element which is configured to control formation and cut-off of a current path in response to a signal from the control device,
each of a first reactor current which flows through the first reactor and a second reactor current which flows through the second reactor being controlled to have a plurality of inflection points in each control cycle as a result of control of on and off of the switching element in response to a control signal from the control device,
the control device including a first switching control mode in which the control signal for the switching element is generated such that a first current greater in absolute value of the first and second reactor currents has first and second inflection points representing any one and the other of a relative maximum point and a relative minimum point, respectively, in each control cycle and a second current smaller in absolute value of the first and second reactor currents has third and fourth inflection points representing any one and the other of the relative maximum point and the relative minimum point, respectively, in addition to the first and second inflection points representing any one and the other of the relative maximum point and the relative minimum point, respectively, in each control cycle, and
in the first switching control mode, the first inflection point of the first current and the first inflection point of the second current appearing at identical timing, and the second inflection point of the first current and the third inflection point of the second current appearing at identical timing.

2. The power supply system according to claim 1, wherein in the first switching control mode, during a period in which both of the first and second DC power supplies perform a power running operation or a regeneration operation, any one and the other of the first inflection points of the first and second currents are the relative maximum point and the relative minimum point, respectively, and any one and the other of the second inflection point of the first current and the third inflection point of the second current are the relative maximum point and the relative minimum point, respectively.

3. The power supply system according to claim 2, wherein the control device further has a second switching control mode in which the control signal for the switching element is generated such that each of the first and second reactor currents has first and second inflection points representing any one and the other of the relative maximum point and the relative minimum point, respectively, in each control cycle, and the control device generates the control signal for the switching element such that the first and second switching control modes are alternately applied.

4. The power supply system according to claim 1, wherein the control device further has a second switching control mode in which the control signal for the switching element is generated such that each of the first and second reactor currents has first and second inflection points representing any one and the other of the relative maximum point and the relative minimum point, respectively, in each control cycle, and the control device generates the control signal for the switching element such that the first and second switching control modes are alternately applied.

5. The power supply system according to claim 1, wherein the control device generates the control signal for the switching element such that the first and second inflection points appear in the first reactor current in accordance with comparison between a first output duty ratio with which an output from the first DC power supply is controlled and a first carrier wave having a voltage width corresponding to a maximum value of the first output duty ratio and the first and second inflection points appear in the first reactor current in accordance with comparison between a second output duty ratio with which an output from the second DC power supply is controlled and a second carrier wave having a voltage width corresponding to a maximum value of the second output duty ratio.

6. The power supply system according to claim 1, wherein each of the first to fourth semiconductor elements includes
the switching element for selectively forming an on state in which a current path is formed and an off state in which the current path is cut off, in response to the signal from the control device, and
a diode connected in anti-parallel to the switching element, for forming a current path during forward biasing, and the fifth semiconductor element includes the switching element for controlling formation and cut-off of a current path between the first node and the second node.

7. The power supply system according to claim 1, wherein each of the first to fourth semiconductor elements includes
the switching element for selectively forming an on state in which a current path is formed and an off state in which the current path is cut off, in response to the signal from the control device, and
a diode connected in anti-parallel to the switching element, for forming a current path during forward biasing, and the fifth semiconductor element includes the switching element for controlling formation and cut-off of a current path from the first node to the second node and the switching element for controlling formation and cut-off of a current path from the second node to the first node.

8. The power supply system according to claim 1, wherein the switching element is provided in each of the second and fourth semiconductor elements,
a diode connected to have a direction from the first node toward the first power line as a forward direction and a diode connected to have a direction from the second power line toward the second node as the forward direction are provided in the first and third semiconductor elements, respectively, and
the switching element for controlling formation and cut-off of at least a current path from the first node to the second node is provided in the fifth semiconductor element.

9. The power supply system according to claim 8, wherein the switching element connected in parallel with the diode is further provided in any one of the first and third semiconductor elements.

* * * * *